[12] United States Patent
Katsuta et al.

(10) Patent No.: US 10,168,569 B2
(45) Date of Patent: Jan. 1, 2019

(54) DISPLAY DEVICE, ADHESIVE-LAYER-INCLUDING LIGHT-DIFFUSION MEMBER, AND METHOD OF MANUFACTURING THE LIGHT-DIFFUSION MEMBER

(71) Applicant: Sharp Kabushiki Kaisha, Sakai, Osaka (JP)

(72) Inventors: Shohei Katsuta, Sakai (JP); Yasushi Asaoka, Sakai (JP); Sho Ochi, Sakai (JP); Hideomi Yui, Sakai (JP); Tsuyoshi Maeda, Sakai (JP); Emi Yamamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/535,015

(22) PCT Filed: Dec. 10, 2015

(86) PCT No.: PCT/JP2015/084641
§ 371 (c)(1),
(2) Date: Jun. 9, 2017

(87) PCT Pub. No.: WO2016/093307
PCT Pub. Date: Jun. 16, 2016

(65) Prior Publication Data
US 2017/0363905 A1 Dec. 21, 2017

(30) Foreign Application Priority Data

Dec. 12, 2014 (JP) ................. 2014-252075

(51) Int. Cl.
G02F 1/1335 (2006.01)
G02B 5/00 (2006.01)
(Continued)

(52) U.S. Cl.
CPC ......... *G02F 1/133504* (2013.01); *G02B 5/00* (2013.01); *G02B 5/02* (2013.01);
(Continued)

(58) Field of Classification Search
None
See application file for complete search history.

(56) References Cited

U.S. PATENT DOCUMENTS 5,706,134 A * 1/1998 Konno ................. G02B 5/0226
359/452
6,104,457 A * 8/2000 Izumi .................. G02F 1/13336
349/153
(Continued)

FOREIGN PATENT DOCUMENTS

JP h11-002805 A 1/1999
JP 2000-352608 A 12/2000
(Continued)

*Primary Examiner* — Ashok Patel
(74) *Attorney, Agent, or Firm* — ScienBiziP, P.C.

(57) ABSTRACT

A light-diffusion member (7) includes: a substrate (39) having light-transmitting properties; a light-diffusion portion (40) on a face of the substrate (39) facing a display medium (6); and a light-blocking layer (41) on a part of the face of the substrate (39) facing the display medium (6) other than where the light-diffusion portion (40) is provided. The light-diffusion portion (40) includes: a light-emitting end face (40a) in contact with the substrate (39); and a light-incident end face (40b) facing, and being larger in area than, the light-emitting end face (40a). The adhesive layer (42) adheres to light-incident end face (40a) and partly (42a) encroaches into a space (43) between the light-diffusion portion (40) and light-blocking layer (41).

15 Claims, 34 Drawing Sheets

(51) Int. Cl.
*G02B 5/02* (2006.01)
*G09F 9/00* (2006.01)

(52) U.S. Cl.
CPC .......... *G02F 1/133512* (2013.01); *G09F 9/00* (2013.01); *G02F 1/133528* (2013.01); *G02F 2201/50* (2013.01); *G02F 2202/28* (2013.01)

(56) References Cited

U.S. PATENT DOCUMENTS

| | | | |
|---|---|---|---|
| 2013/0265774 A1* | 10/2013 | Umeda | G02F 1/133504 362/311.01 |
| 2013/0329401 A1* | 12/2013 | Yamamoto | F21V 13/02 362/97.2 |
| 2014/0111862 A1* | 4/2014 | Yamamoto | G02F 1/133504 359/599 |
| 2014/0160410 A1* | 6/2014 | Yamamoto | B29D 11/00798 349/112 |
| 2015/0042935 A1 | 2/2015 | Yamamoto et al. | |

FOREIGN PATENT DOCUMENTS

| | | |
|---|---|---|
| JP | 2006-339433 A | 12/2006 |
| JP | 2014-106249 A | 6/2014 |
| WO | WO2012118137 * | 9/2012 |
| WO | 2013/146353 A1 | 10/2013 |

\* cited by examiner

FIG. 9C
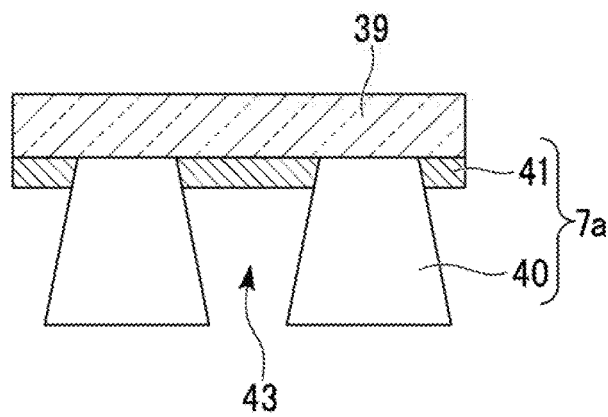
FIG. 10A
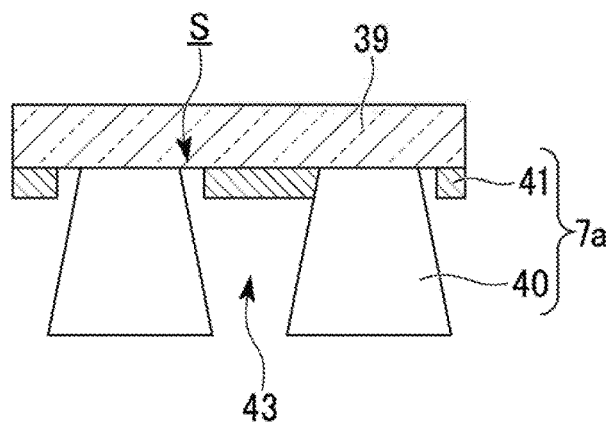
FIG. 10B

DISPLAY DEVICE, ADHESIVE-LAYER-INCLUDING LIGHT-DIFFUSION MEMBER, AND METHOD OF MANUFACTURING THE LIGHT-DIFFUSION MEMBER

TECHNICAL FIELD

The present invention relates to display devices, adhesive-layer-including light-diffusion members, and methods of manufacturing such light-diffusion members.

The present application claims priority to Patent Application No. 2014-252075 filed in Japan on Dec. 12, 2014, which is hereby incorporated herein by reference in its entirety.

BACKGROUND ART

Liquid crystal display devices are used in a broad range of applications such as mobile phone handsets and other like mobile electronic devices as well as displays for television systems and personal computers. The liquid crystal display device generally delivers excellent visibility when viewed from the front, but has narrow viewing angles.

Various improvements have therefore been made to liquid crystal display devices to increase the viewing angle. One of such improvements is to attach a light-diffusion member onto the viewing side of a liquid crystal panel (display medium) so that the light-diffusion member can diffuse the light emitted from the viewing side of the liquid crystal panel (see, for example, Patent Literature 1).

Patent Literature 1 identified below discloses a light-diffusion sheet (light-diffusion member) including a light-diffusion layer having formed therein grooves with a V-shaped cross-section, wherein there is provided a light-absorption layer in a part of each groove. In the light-diffusion sheet, transparent sheets made primarily of polyethylene terephthalate (PET) are disposed, one on the light-incident side of the light-diffusion layer and another on the light-emitting side thereof. In this configuration, part of the light perpendicularly incident from the light-incident side to the light-diffusion layer undergoes total reflection on the wall faces of the grooves before being emitted in a diffused state from the light-emitting side.

To totally reflect light on the wall faces of the grooves in the light-diffusion sheet, there is preferably a large difference in refractive index between the interior and exterior of the grooves. Because the light-diffusion sheet has a space (air layer) between adjacent grooves, the refractive index difference can be maximized between the transparent sheet (high refractive index) and the air layer (low refractive index).

CITATION LIST

Patent Literature

Patent Literature 1: Japanese Unexamined Patent Application Publication No. 2000-352608

SUMMARY OF INVENTION

Technical Problem

To attach the light-diffusion sheet to the liquid crystal panel, an adhesive layer is disposed between the light-diffusion sheet and the liquid crystal panel, and the face of the light-diffusion layer where the grooves are provided is attached to the liquid crystal panel via the adhesive layer. In this light-diffusion sheet, the light-diffusion layer has a small adhesion area for the liquid crystal panel due to the presence of the grooves. Therefore, the adhesion strength of the light-diffusion sheet for the liquid crystal panel is reduced in comparison to when a flat face is attached to the liquid crystal panel. This is undesirable.

Some aspects of the present invention, proposed in view of this situation, have an object to provide a display device, an adhesive-layer-including light-diffusion member, and a method of manufacturing such a light-diffusion member, wherein the light-diffusion member, when attached to a display medium via an adhesive layer, exhibits an improved adhesion strength for the display medium.

Solution to Problem

To achieve the object, some aspects of the present invention employ the following means.

(1) A first aspect of the present invention is directed to a display device including: a display medium; a light-diffusion member on a viewing side of the display medium, the light-diffusion member receiving light entering from the display medium and emitting light that exhibits a wider angular distribution than does the light before the entrance; and an adhesive layer between the display medium and the light-diffusion member, wherein the light-diffusion member includes: a substrate having light-transmitting properties; a light-diffusion portion on a face of the substrate facing the display medium, the light-diffusion portion having a predetermined height; and a light-blocking layer on a part of the face of the substrate facing the display medium other than where the light-diffusion portion is provided, the light-blocking layer having a thickness smaller than the predetermined height of the light-diffusion portion, the light-diffusion portion including: a light-emitting end face in contact with the substrate; and a light-incident end face facing, and being larger in area than, the light-emitting end face, the adhesive layer adheres to the light-incident end face and partly encroaches into a space between the light-diffusion portion and the light-blocking layer, and the face of the substrate facing the display medium is separated by a shorter distance from a surface of the adhesive layer inside the space than from the light-incident end face.

(2) A second aspect of the present invention is directed to a display device including: a display medium; a light-diffusion member on a viewing side of the display medium, the light-diffusion member receiving light entering from the display medium and emitting light that exhibits a wider angular distribution than does the light before the entrance; and an adhesive sheet between the display medium and the light-diffusion member, wherein the light-diffusion member includes: a substrate having light-transmitting properties; a light-diffusion portion on a face of the substrate facing the display medium, the light-diffusion portion having a predetermined height; and a light-blocking layer on a part of the face of the substrate facing the display medium other than where the light-diffusion portion is provided, the light-blocking layer having a thickness smaller than the predetermined height of the light-diffusion portion, the light-diffusion portion includes: a light-emitting end face in contact with the substrate; and a light-incident end face facing, and being larger in area than, the light-emitting end face, the adhesive sheet includes: a substrate having light-transmitting properties; and adhesive layers, one on each of two faces of the substrate, one of the adhesive layers in the adhesive sheet adheres to the light-incident end face and partly encroaches into a space between the light-diffusion portion and the light-blocking layer, and the face of the substrate facing the display medium is separated by a shorter distance from a surface of that one of the adhesive layers inside the space than from the light-incident end face.

(3) In the display device described in (2) above, the one of the adhesive layers in the adhesive sheet may have a smaller thickness than the other one of the adhesive layers.

(4) In the display device described in any one of (1) to (3) above, the adhesive layer adhering to the light-incident end face may have a thickness smaller than a distance from the light-blocking layer inside the space to the light-incident end face.

(5) In the display device described in any one of (1) to (4) above, the light-incident end face may have a plurality of concave portions or convex portions.

(6) In the display device described in any one of (1) to (4) above, the light-incident end face may be convexly curved.

(7) In the display device described in any one of (1) to (4) above, the light-incident end face may be concavely curved.

(8) In the display device described in any one of (1) to (7) above, the adhesive layer may include an adhesive that cures under radiation of activation energy.

(9) In the display device described in any one of (1) to (8) above, the light-diffusion portion may have a side face between the light-emitting end face and the light-incident end face, and the light-diffusion member may exhibit such azimuthal anisotropy that the light-diffusion member diffuse more light in a direction in which the side face decreases in area than in a direction in which the side face increases in area.

(10) In the display device described in (9) above, the light-diffusion member may include another light-diffusion portion exhibiting azimuthal anisotropy having a different azimuthal direction.

(11) In the display device described in any one of (1) to (10) above, the light-diffusion portion in the light-diffusion member may include a plurality of light-diffusion portions arranged randomly as viewed normal to a primary face of the substrate, and the light-blocking layer may be contiguous where none of the light-diffusion portions are provided.

(12) In the display device described in any one of (1) to (10) above, the light-blocking layer in the light-diffusion member may include a plurality of light-blocking layers arranged randomly as viewed normal to a primary face of the substrate, and the light-diffusion portion may be contiguous where none of the light-blocking layers are provided.

(13) A third aspect of the present invention is directed to an adhesive-layer-including light-diffusion member including: a light-diffusion member on a viewing side of a display medium, the light-diffusion member receiving light entering from the display medium and emitting light that exhibits a wider angular distribution than does the light before the entrance; and an adhesive layer between the display medium and the light-diffusion member, wherein the light-diffusion member includes: a substrate having light-transmitting properties; a light-diffusion portion on a face of the substrate facing the display medium, the light-diffusion portion having a predetermined height; and a light-blocking layer on a part of the face of the substrate facing the display medium other than where the light-diffusion portion is provided, the light-blocking layer having a thickness smaller than the predetermined height of the light-diffusion portion, the light-diffusion portion includes: a light-emitting end face in contact with the substrate; and a light-incident end face facing, and being larger in area than, the light-emitting end face, the adhesive layer adheres to the light-incident end face and partly encroaches into a space between the light-diffusion portion and the light-blocking layer, and the face of the substrate facing the display medium is separated by a shorter distance from a surface of the adhesive layer inside the space than from the light-incident end face.

(14) A fourth aspect of the present invention is directed to an adhesive-layer-including light-diffusion member including: a light-diffusion member on a viewing side of a display medium, the light-diffusion member receiving light entering from the display medium and emitting light that exhibits a wider angular distribution than does the light before the entrance; and an adhesive sheet between the display medium and the light-diffusion member, wherein the light-diffusion member includes: a substrate having light-transmitting properties; a light-diffusion portion on a face of the substrate facing the display medium, the light-diffusion portion having a predetermined height; and a light-blocking layer on a part of the face of the substrate facing the display medium other than where the light-diffusion portion is provided, the light-blocking layer having a thickness smaller than the predetermined height of the light-diffusion portion, the light-diffusion portion includes: a light-emitting end face in contact with the substrate; and a light-incident end face facing, and being larger in area than, the light-emitting end face, the adhesive sheet includes: a substrate having light-transmitting properties; and adhesive layers, one on each of two faces of the substrate, one of the adhesive layers in the adhesive sheet adheres to the light-incident end face and partly encroaches into a space between the light-diffusion portion and the light-blocking layer, and the face of the substrate facing the display medium is separated by a shorter distance from a surface of that one of the adhesive layers inside the space than from the light-incident end face.

(15) The adhesive-layer-including light-diffusion member described in (13) or (14) above may further include either a surface protection sheet detachably attached to a face of either the adhesive layer or the other adhesive layer adhering to the display medium or a polarizing plate attached to the face of either the adhesive layer or the other adhesive layer adhering to the display medium.

(16) In the adhesive-layer-including light-diffusion member described in any one of (13) to (15) above, the light-diffusion portion in the light-diffusion member may include a plurality of light-diffusion portions arranged randomly as viewed normal to a primary face of the substrate, and the light-blocking layer may be contiguous where none of the light-diffusion portions are provided.

(17) In the adhesive-layer-including light-diffusion member described in any one of (13) to (15) above, the light-blocking layer in the light-diffusion member may include a plurality of light-blocking layers arranged randomly as viewed normal to a primary face of the substrate, and the light-diffusion portion may be contiguous where none of the light-blocking layers are provided.

(18) A fifth aspect of the present invention is directed to a method of manufacturing an adhesive-layer-including light-diffusion member including: a substrate having light-transmitting properties; a light-diffusion portion on a face of the substrate, the light-diffusion portion having a predetermined height; a light-blocking layer on a part of the face of the substrate other than where the light-diffusion portion is provided, the light-blocking layer having a thickness smaller than the predetermined height of the light-diffusion portion; and either an adhesive layer on a face of the light-diffusion portion opposite from the substrate or an adhesive sheet including a substrate having light-transmitting properties and adhesive layers, one on each of two faces of the substrate, the method including: forming the light-blocking layer on an elongate substrate sheet that will become the substrate; forming the light-diffusion portion on the substrate sheet having formed thereon the light-blocking layer, attaching either the adhesive layer or an elongate adhesive-layer-including sheet that will become the adhesive sheet onto the substrate sheet having formed thereon the light-diffusion portion; and winding the substrate sheet having attached thereonto the adhesive-layer-including sheet Advantageous Effects of Invention As described in the foregoing, some aspects of the present invention can provide a display device, an adhesive-layer-including light-diffusion member, and a method of manufacturing such a light-diffusion member, wherein the light-diffusion member, when attached to a display medium via an adhesive layer, exhibits an improved adhesion strength for the display medium.

BRIEF DESCRIPTION OF DRAWINGS

FIG. 9C is a third diagram illustrating an arrangement of light-diffusion portions in the light-diffusion member.

FIG. 10A is a first cross-sectional view illustrating one of steps of fabricating the light-diffusion portions.

FIG. 10B is a second cross-sectional view illustrating one of steps of fabricating the light-diffusion portions.

DESCRIPTION OF EMBODIMENTS

The following will describe in detail embodiments of the present invention in reference to drawings.

Throughout the drawings, different scales may be applied to different elements to draw the elements in readily recognizable dimensions.

Liquid Crystal Display Device

Figure 1A:
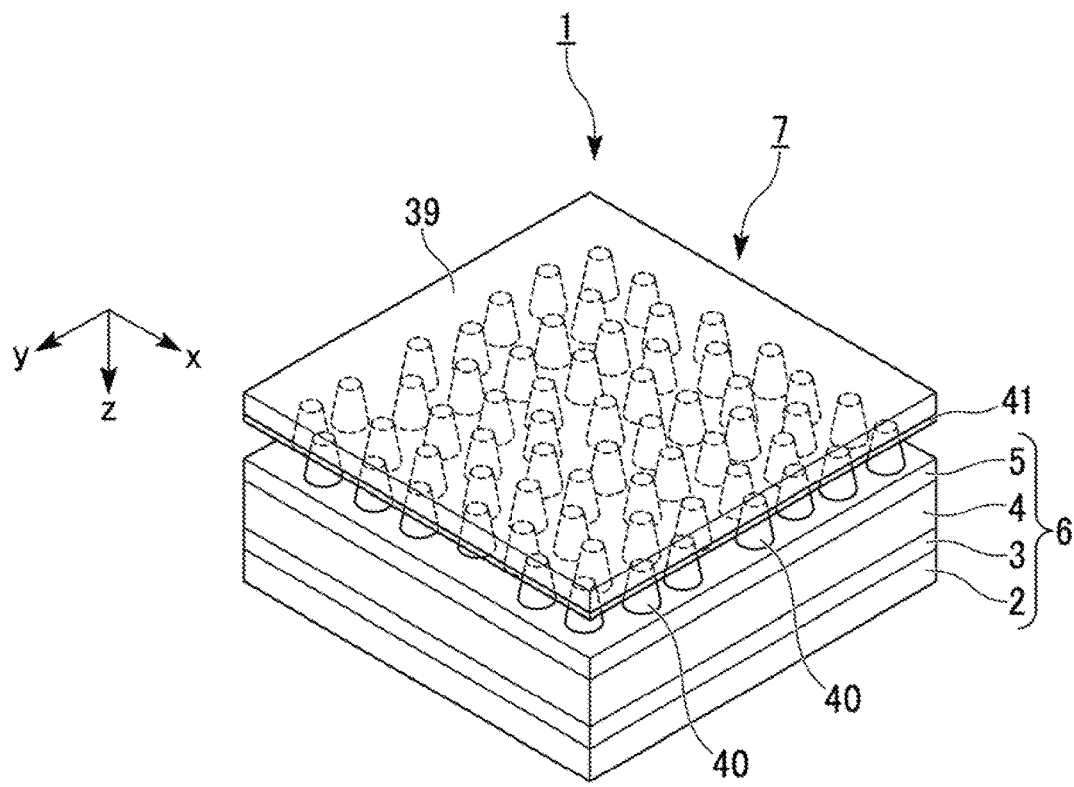
FIG. 1A is a first perspective view of a liquid crystal display device in accordance with an embodiment of the present invention.

First, a liquid crystal display device 1 shown in FIGS. 1A, 1B, and 2 will be described as an embodiment of the present invention. FIG. 1A is a perspective view of the liquid crystal display device 1 as viewed from above.

Figure 1B:
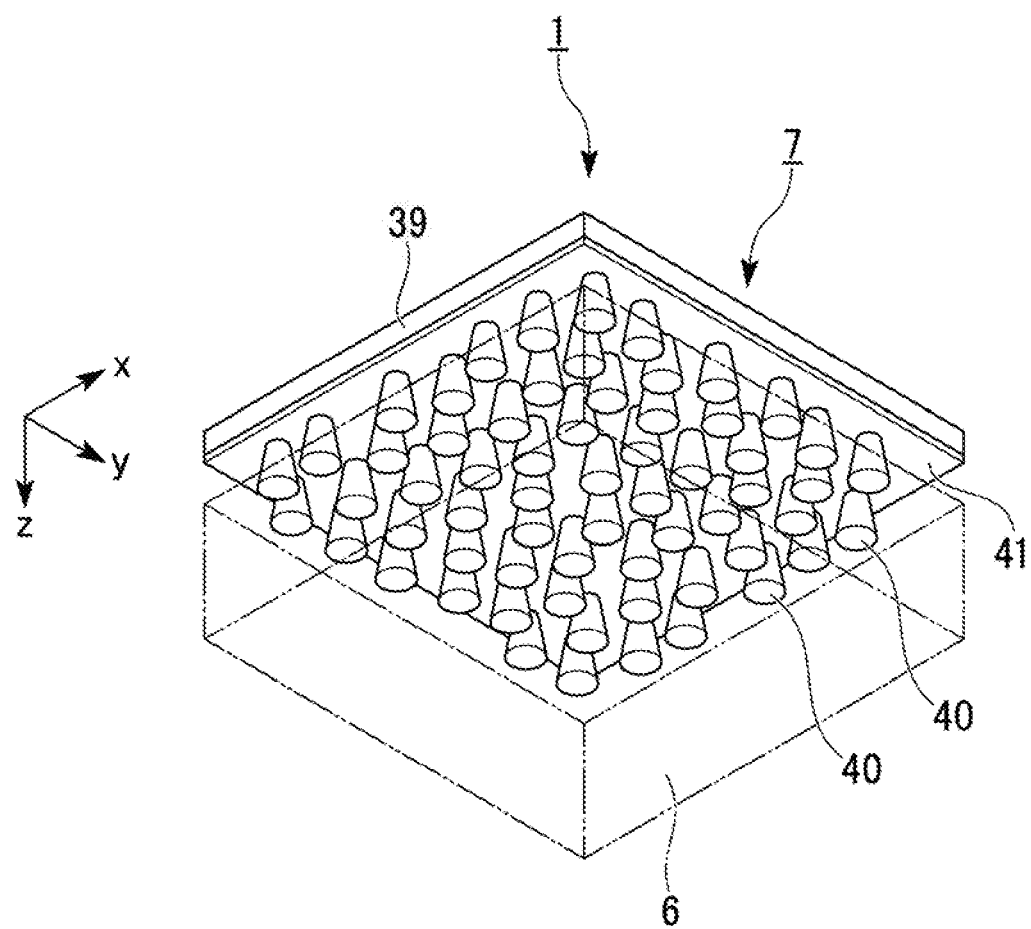
FIG. 1B is a second perspective view of the liquid crystal display device in accordance with the embodiment of the present invention.

FIG. 1B is a perspective view of the liquid crystal display device 1 as viewed from below. FIG. 2 is a schematic cross-sectional view of a configuration of the liquid crystal display device 1.

Figure 2:
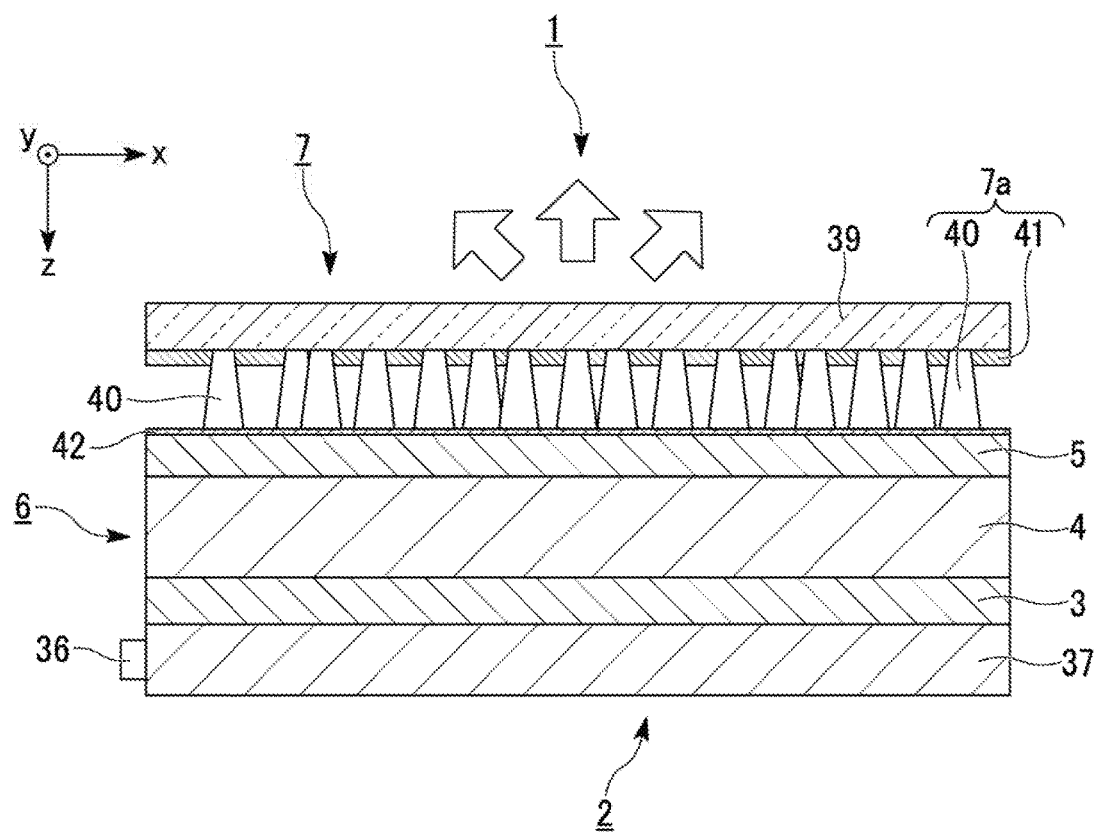
FIG. 2 is a schematic cross-sectional view of a configuration of the liquid crystal display device.

The liquid crystal display device 1, as shown in FIGS. 1A, 1B, and 2, includes among others a backlight 2, a first polarizing plate 3, a liquid crystal panel 4, a second polarizing plate 5, and a light-diffusion member 7. Among these elements, the backlight 2, the first polarizing plate 3, the liquid crystal panel 4, and the second polarizing plate 5, to the exclusion of the light-diffusion member 7, are components of a liquid crystal display medium 6. Throughout the following description, the side of an element facing the light-diffusion member 7 will be referred to as the "viewing" side, whilst the side thereof facing the backlight 2 will be referred to as the "rear" side (or backside).

The backlight 2 includes a light source 36 and a light-guiding plate 37. The light source 36 is built around, for example, light-emitting diodes or a cold cathode tube. The light-guiding plate 37 emits light in the direction of the liquid crystal panel 4 by relying on the internal reflection of the light emitted from the light source 36. The light source 36 is disposed on an end face of the light-guiding medium 37 (so-called "edge-light type"). Alternatively, the light source 36 may be disposed right below the light-guiding medium 37 (so-called "direct type").

The backlight 2 is preferably directional in the present embodiment. The backlight 2, being directional, enables control of the direction of exiting light so that collimated or substantially collimated light can enter the light-diffusion member 7. This (substantial) collimation improves light focusing and increases light use efficiency. The backlight 2 can be rendered directional by optimizing, for example, the shape and position of reflection patterns in the light-guiding plate 37.

The first polarizing plate 3, serving as a polarizer, is disposed between the backlight 2 and the liquid crystal panel 4. On the other hand, the second polarizing plate 5, serving as a light-detecting element, is disposed between the liquid crystal panel 4 and the light-diffusion member 7.

The liquid crystal panel 4 is, for example, of a transmissive type. The liquid crystal panel 4 is not necessarily of a transmissive type and may be of a transflective type (transmissive-reflective type) or of a reflective type. The liquid crystal panel 4 is of an active matrix type and includes thin film transistors (TFTs) as switching elements that switch pixels between different operations. The liquid crystal panel 4 is not necessarily of an active matrix type and may be of a simple matrix type with no switching elements.

The light-diffusion member (viewing-angle-expanding film) 7 diffuses light emitted from the viewing side of the liquid crystal panel 4 to expand viewing angle and is disposed (on the second polarizing plate 5) on the viewing side of the liquid crystal panel 4.

In the liquid crystal display device 1 configured as above, the light emitted from the backlight 2 is modulated by the liquid crystal panel 4 so that predetermined images, text, and the like become visible by the modulated light. In addition, as the light emitted from the liquid crystal panel 4 is transmitted through, and then emitted from, the light-diffusion member 7, the light exhibits a wider angular distribution upon the emission than before the entrance to the light-diffusion member 7. This configuration offers the viewer a display with a wide viewing angle.

Liquid Crystal Panel

Figure 3:
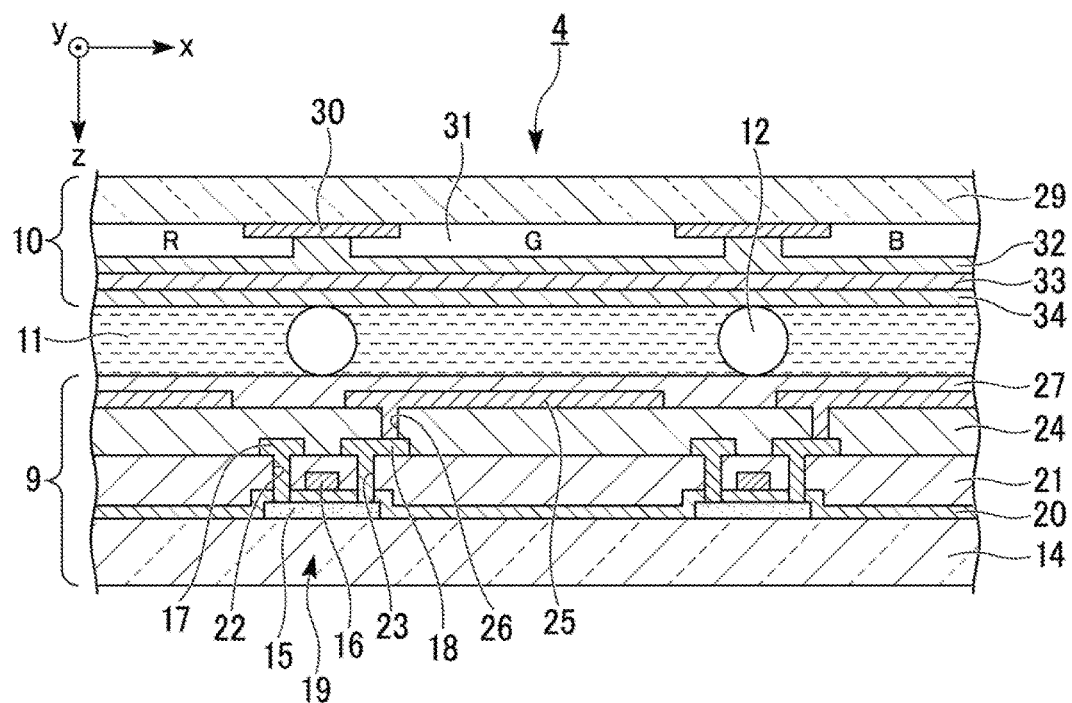
FIG. 3 is a schematic cross-sectional view of a configuration of a liquid crystal panel in the liquid crystal display device.

Next, a configuration of the liquid crystal panel 4 will be specifically described in reference to FIG. 3, which is a schematic cross-sectional view of the configuration of the liquid crystal panel 4.

The liquid crystal panel 4, as shown in FIG. 3, includes among others a TFT substrate (alternatively referred to as an "element substrate") 9, a color filter substrate (alternatively referred to as an "opposing substrate") 10 disposed opposite the TFT substrate 9, and a liquid crystal layer 11 disposed between the TFT substrate 9 and the color filter substrate 10.

The liquid crystal layer 11 is sandwiched between the TFT substrate 9 and the color filter substrate 10 by sealing a gap between the TFT substrate 9 and the color filter substrate 10 with a sealing member (not shown) and injecting liquid crystal into the gap. Spherical spacers 12 are also disposed between the TFT substrate 9 and the color filter substrate 10 in order to maintain a fixed distance that separates the TFT substrate 9 from the color filter substrate 10.

The liquid crystal panel 4 of the present embodiment produces a display in, for example, VA (vertical alignment) mode. The liquid crystal layer 11 contains vertically aligned liquid crystal that exhibits negative dielectric anisotropy. The display mode is not necessarily VA mode and may be, for example, TN (twisted nematic) mode, STN (super twisted nematic) mode, or IPS (in-plane switching) mode.

The TFT substrate 9 carries thereon a plurality of pixels (not shown) arranged in a matrix. A pixel is a minimum, unitary display area. The TFT substrate 9 has formed thereon a plurality of parallel source bus lines (not shown) and a plurality of parallel gate bus lines (not shown) perpendicular to the source bus lines. Therefore, the TFT substrate 9 has formed thereon a lattice of the source bus lines and the gate bus lines so that each rectangular region delineated by the adjacent source bus lines and the adjacent gate bus lines forms a single pixel. The source bus lines are connected to the source electrodes of the TFTs (detailed later), whilst the gate bus lines are connected to the gate electrodes of the TFTs.

A transparent substrate 14, which is a part of the TFT substrate 9, carries TFTs 19 formed on a face thereof facing the liquid crystal layer 11. Each TFT 19 includes a semiconductor layer 15, a gate electrode 16, a source electrode 17, and a drain electrode 18.

The transparent substrate 14 may be, for example, a glass substrate. On the transparent substrate 14 is provided the semiconductor layer 15 composed primarily of a semiconductor material such as CGS (continuous grain silicon), LPS (low-temperature polysilicon), or α-Si (amorphous silicon). A gate-insulating film 20 is also provided on the transparent substrate 14 in such a manner as to cover the semiconductor layer 15. The gate-insulating film 20 is made of such a material as a silicon oxide film, a silicon nitride film, or a laminate of these films. On the gate-insulating film 20, the gate electrodes 16 are formed facing the semiconductor layer 15. The gate electrodes 16 are made of such a material as a W (tungsten)/TaN (tantalum nitride) laminate film, Mo (molybdenum), Ti (titanium), or Al (aluminum).

A first interlayer insulating film 21 is provided on the gate-insulating film 20 in such a manner as to cover the gate electrodes 16. The first interlayer insulating film 21 is made of such a material as a silicon oxide film, a silicon nitride film, or a laminate of these films. The source electrodes 17 and the drain electrodes 18 are provided on the first interlayer insulating film 21. Each source electrode 17 is connected to a source region of the semiconductor layer 15 via a contact hole 22 that runs through the first interlayer insulating film 21 and the gate-insulating film 20. Likewise, each drain electrode 18 is connected to a drain region of the semiconductor layer 15 via a contact hole 23 that runs through the first interlayer insulating film 21 and the gate-insulating film 20. The source electrodes 17 and the drain electrodes 18 are made of such an electrically conductive material as the materials listed above in relation to the gate electrodes 16. A second interlayer insulating film 24 is provided on the first interlayer insulating film 21 in such a manner as to cover the source electrodes 17 and the drain electrodes 18. The second interlayer insulating film 24 is made of either such a material as the materials listed above in relation to the first interlayer insulating film 21 or an organic insulating material.

The second interlayer insulating film 24 has pixel electrodes 25 formed thereon. Each pixel electrode 25 is connected to one of the drain electrodes 18 via a contact hole 26 that runs through the second interlayer insulating film 24, which means that the pixel electrode 25 is connected to the drain region of the semiconductor layer 15 using that one of the drain electrodes 18 as a relay electrode. The pixel electrodes 25 are made of such a transparent conductive material as ITO (indium tin oxide) or IZO (indium zinc oxide). This configuration enables image signals supplied to the source electrodes 17 via the source bus lines to be fed to the pixel electrodes 25 via the semiconductor layer 15 and the drain electrodes 18 when the TFTs 19 are turned on by scan signals fed via the gate bus lines. An alignment film 27 is formed on the second interlayer insulating film 24 across the entire face thereof, covering the pixel electrodes 25. The alignment film 27 is capable of alignment regulation by which liquid crystal molecules in the liquid crystal layer 11 are vertically aligned. The TFT structure may be top gated (see FIG. 3) and may be bottom gated.

In contrast, a transparent substrate 29, which is a part of the color filter substrate 10, carries on a face thereof facing the liquid crystal layer 11 a black matrix 30, color filters 31, a planarization layer 32, a counter electrode 33, and an alignment film 34 arranged in this sequence. The black matrix 30 serves to inhibit light transmission through regions between pixels and is made of either metal, such as Cr (chromium) or a Cr/Cr oxide multilayer film, or photoresist in which carbon particles are dispersed in a photosensitive resin. The color filters 31 include red (R), green (G), and blue (B) pigments. A red, green, or blue one of the color filters 31 is disposed facing each pixel electrode 25 on the TFT substrate 9. The color filters 31 may include those of color types other than these three (R, G, and B) colors. The planarization layer 32 is composed of an insulating film that covers the black matrix 30 and the color filters 31 and serves to lessen steps caused by the black matrix 30 and the color filters 31 for planarization. The counter electrode 33 is provided on the planarization layer 32 and made of such a transparent conductive material as the materials listed above in relation to the pixel electrodes 25. The alignment film 34, capable of vertical alignment regulation, is formed on the counter electrode 33 across the entire face thereof.

Light-Diffusion Member

Figure 4A:
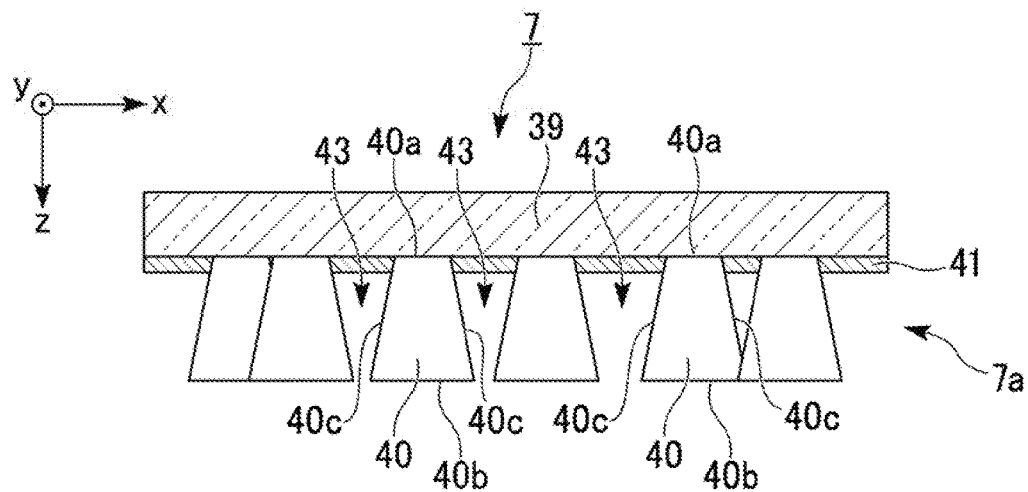
FIG. 4A is a schematic first illustration of a configuration of a light-diffusion member in the liquid crystal display device.
Figure 4B:
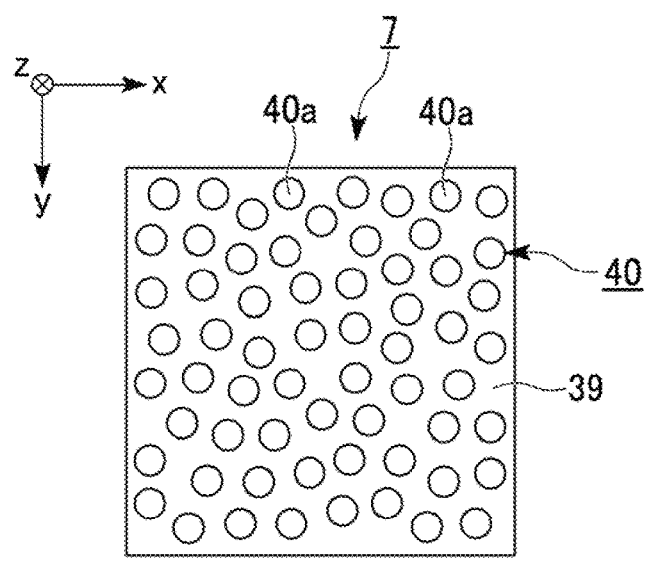
FIG. 4B is a schematic second illustration of the configuration of the light-diffusion member in the liquid crystal display device.
Figure 4C:
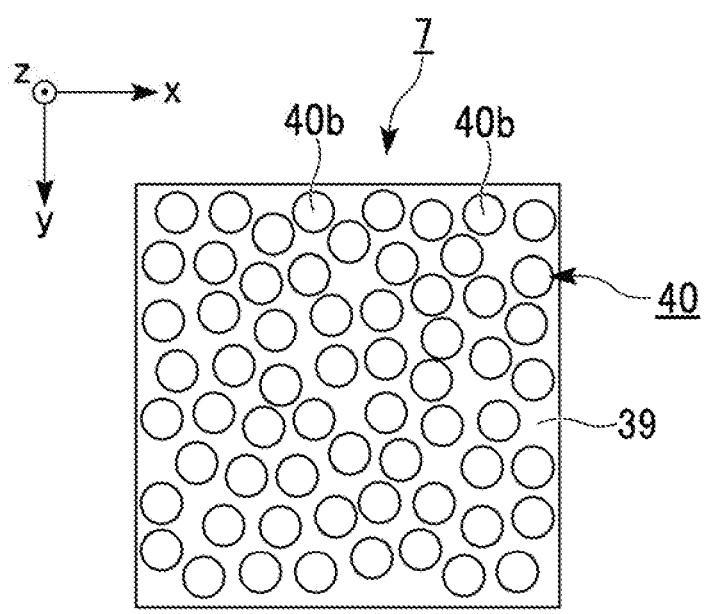
FIG. 4C is a schematic third illustration of the configuration of the light-diffusion member in the liquid crystal display device.

Next, a configuration of the light-diffusion member 7 will be specifically described in reference to FIGS. 4A to 4C.

FIG. 4A is a schematic cross-sectional view of the configuration of the light-diffusion member 7. FIG. 4B is a plan view of the light-diffusion member 7 as viewed from the viewing side thereof. FIG. 4C is a plan view of the light-diffusion member 7 as viewed from the rear side thereof. In FIGS. 4A to 4C, the x-axis indicates a horizontal direction for the screen of the liquid crystal panel 4, the y-axis indicates a vertical direction for the screen of the liquid crystal panel 4, and the z-axis indicates a thickness direction for the liquid crystal display device 1.

The light-diffusion member 7, as shown in FIGS. 4A to 4C, includes among others: a substrate 39 having light-transmitting properties; and a light-control layer 7a formed on a face of the substrate 39 opposite from the viewing side thereof. The light-control layer 7a diffuses light received from the liquid crystal panel 4 to control directions in which the light is emitted and includes: a plurality of light-diffusion portions 40 on a face of the substrate 39 opposite from the viewing side thereof; and a light-blocking layer (light-absorption portion) 41.

Preferably, the substrate 39 is a transparent resin film such as a triacetyl cellulose (TAC) film, polyethylene terephthalate (PET), polycarbonate (PC), polyethylene naphthalate (PEN), or a polyethersulfone (PES) film. The substrate 39 will serve as an underlayer when materials for the light-blocking layer 41 and the light-diffusion portions 40 are applied in a manufacturing process described later and needs to have sufficient heat resistance and mechanical strength for a heat treating step in the manufacturing process. Therefore, the substrate 39 may be made of glass, as well as resin. Note however that the substrate 39 is preferably as thin as possible provided that the reduced thickness still provides sufficient heat resistance, mechanical strength, and other required properties, because the resultant displays would likely be increasingly out of focus if the substrate 39 is reduced in thickness. In the present embodiment, the substrate 39 is a 100-μm thick transparent resin film as an example. The substrate 39 preferably has a total light transmittance of 90% or greater as measured in accordance with JIS K7361-1, which gives sufficient transparency.

The light-diffusion portions 40 are those parts of the light-diffusion member 7 which contribute to transmission of light and arranged randomly as viewed normal to the primary face of the substrate 39. The light-diffusion portions 40 are made of a transparent and photosensitive organic material such as an acrylic resin or an epoxy resin. The light-diffusion portions 40 preferably have a total light transmittance of 90% or greater as measured in accordance with JIS K7361-1, which gives sufficient transparency.

Each light-diffusion portion 40 has a circular horizontal cross-section (xy cross-section). The horizontal cross-section is smallest in area on a face ("light-emitting end face") 40a facing the substrate 39 and largest in area on a face ("light-incident end face") 40b opposite from the substrate 39, gradually growing in area from the face facing the substrate 39 to the face opposite from the substrate 39. Therefore, the light-diffusion portion 40 has a frustum shape with a side face 40c inclining (reverse-tapered) from the face facing the substrate 39 to the face opposite from the substrate 39.

The angle of inclination of the side face 40c of the light-diffusion portion 40 (the angle made by the light-incident end face 40b and the side face 40c) is approximately 80 as an example. The angle of inclination of the side face 40c of the light-diffusion portion 40 is however not limited in any particular manner provided that incident light is sufficiently diffused upon exiting the light-diffusion member 7.

The light-blocking layer 41 blocks (absorbs) the light leaking out of the side faces 40c of the light-diffusion portions 40 and is formed contiguously on parts of the face of the substrate 39 on which the light-diffusion portions 40 are formed to the exclusion of parts of that face where the light-diffusion portions 40 are formed.

The language that the light-blocking layer 41 is formed contiguously to the exclusion of parts of the face where the light-diffusion portions 40 are formed encompasses the light-blocking layer 41 formed practically on parts of the face to the exclusion of those parts where the light-diffusion portions 40 are formed. The language that the light-blocking layer 41 is formed practically on parts of the face to the exclusion of those parts where the light-diffusion portions 40 are formed encompasses the light-diffusion portions 40 formed partially overlapping the light-blocking layer 41. In other words, the latter language encompasses those cases where parts of the light-diffusion portions 40 are formed slightly overlapping the light-blocking layer 41 on the edges of the openings in the light-blocking layer 41.

The light-blocking layer 41 is composed primarily of a black resist or other like light-absorbing and photosensitive organic material as an example. Alternatively, the light-blocking layer 41 may be, for example, a Cr (chromium) or other metal film or a Cr/Cr oxide multilayer film.

The light-blocking layer 41 has a thickness specified to be smaller than the height of the light-diffusion portion 40 (from the light-incident end face 40b to the light-emitting end face 40a). In the present embodiment, the light-blocking layer 41 is approximately 150 nm thick as an example, and the height of the light-diffusion portion 40 from the light-incident end face 40b to the light-emitting end face 40a is approximately 25 μm as an example. Therefore, there are formed spaces 43 between the light-diffusion portions 40 and the light-blocking layer 41. The spaces 43 include an air layer.

The substrate 39 and the light-diffusion portions 40 preferably have practically equal refractive indices for the following reasons. For example, if the substrate 39 and the light-diffusion portions 40 have much different refractive indices, the light entering through the light-incident end faces 40b undergoes unnecessary refraction and reflection at the interfaces of the light-diffusion portions 40 and the substrate 39 when the light is to exit the light-diffusion portions 40. That could in turn lead to inconveniences such as a failure to obtain a desired viewing angle and a decrease in the amount of exiting light.

The light-diffusion member 7, configured as above, is disposed on the viewing side of the liquid crystal display medium 6 as shown in FIG. 2. More specifically, the light-diffusion portions 40 are attached to the second polarizing plate 5 via an adhesive layer 42 with the other face of the substrate 39 facing the viewing side.

In the liquid crystal display device 1, since the light-diffusion member 7 described above is disposed on the viewing side of the liquid crystal display medium 6, the viewing angle can be increased, and simultaneously the light emitted from the viewing side of the liquid crystal panel 4 can be diffused.

Now, optical paths of light transmitted through the light-diffusion portions 40 in the light-diffusion member 7 will be described in reference to FIG. 5A, which is a cross-sectional view illustrating optical paths of light transmitted through the light-diffusion portions 40 in the light-diffusion member 7.

Figure 5A:
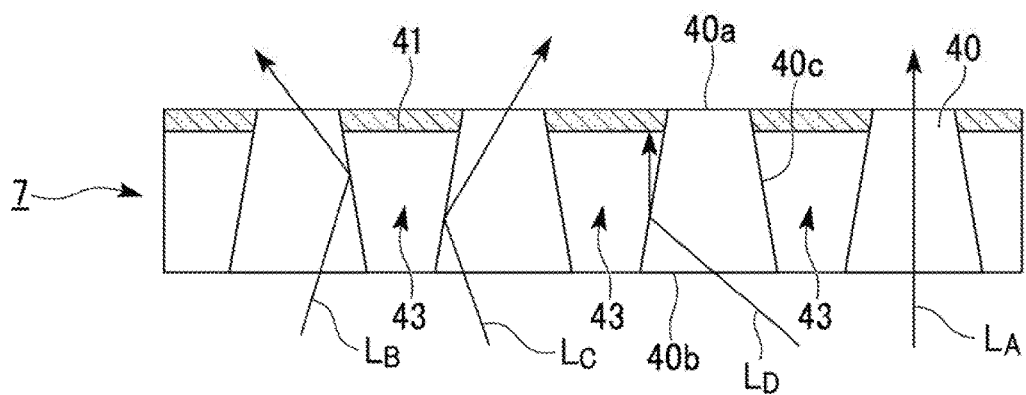
FIG. 5A is a first cross-sectional view illustrating optical paths of light transmitted through light-diffusion portions in the light-diffusion member.

Referring to FIG. 5A, of rays of light LA, LB, LC, and LD entering the light-diffusion portion 40 through the light-incident end face 40b, the rays of light LB and LC incident on the side face 40c at angles exceeding the critical angle undergo total reflection on the side face 40c while traveling through the light-diffusion portion 40 and exit the light-diffusion portion 40 through the light-emitting end face 40a. The incident ray of light LA, not incident on the side face 40c, travels through the light-diffusion portion 40 without being reflected by any member and exits the light-diffusion portion 40 through the light-emitting end face 40a.

The incident ray of light LD incident on the side face 40c at an angle less than or equal to the critical angle exits the light-diffusion portion 40 through the side face 40c without undergoing total reflection at the side face 40c and thereafter is absorbed by the light-blocking layer 41. This configuration can prevent displays from going out of focus and the contrast from decreasing.

However, if the light transmitted through the side face 40c increases, there occurs a loss in the amount of light, which will lead to a failure to obtain high luminance images. Accordingly, in the liquid crystal display device 1, light is caused to be incident on the side face 40c at an angle exceeding the critical angle, by using the above-described directional backlight 2.

Figure 5B:
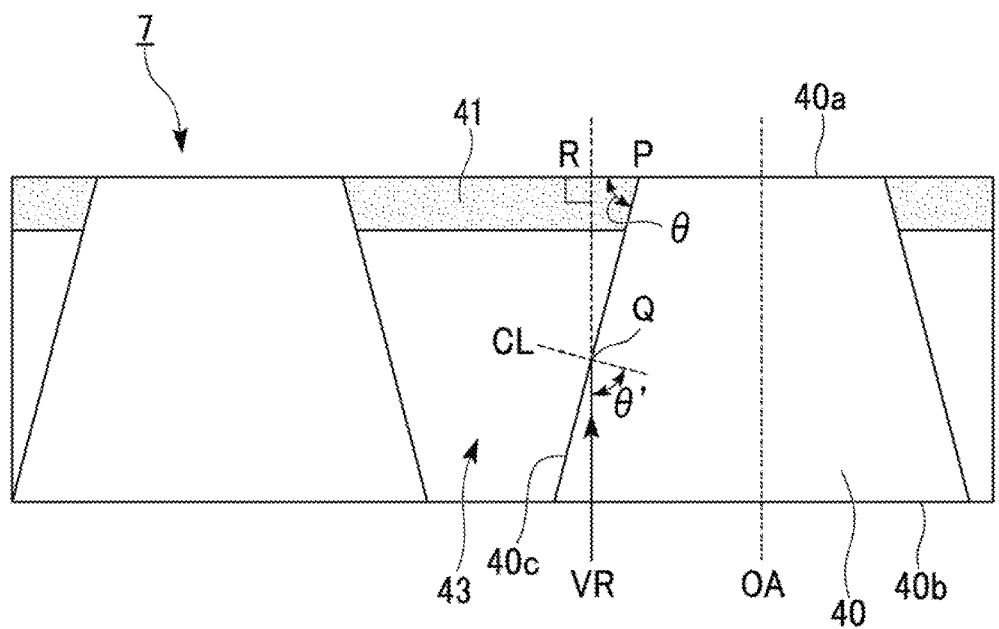
FIG. 5B is a second cross-sectional view illustrating optical paths of light transmitted through the light-diffusion portions in the light-diffusion member.

The angle of inclination of the side face 40c required to cause light to be incident on the side face 40c at an angle exceeding the critical angle will be specifically described in reference to FIG. 5B, which is an enlarged cross-sectional view of the light-diffusion portions 40 in the light-diffusion member 7 shown in FIG. 5A.

Referring to FIG. 5B, the angle made by the side face 40c and the light-emitting end face 40a of the light-diffusion portion 40 is specified to be equal to an angle θ' (°) exceeding the critical angle with respect to a normal CL to the side face 40c of the light-diffusion portion 40 so that the side face 40c totally reflects incident light that is parallel or substantially parallel to an optical axis OA.

The angle θ made by the side face 40c of the light-diffusion portion 40 and the light-emitting end face 40a of the light-diffusion portion 40 which is perpendicular to the optical axis OA is denoted as an angle QPR, where P is the point at which the side face 40c of the light-diffusion portion 40 meets the light-emitting end face 40a of the light-diffusion portion 40, Q is the point at which incident light VR parallel to the optical axis OA strikes the side face 40c, and R is the point at which one of the perpendiculars to the light-emitting end face 40a that passes through the point Q meets the light-emitting end face 40a.

Because an angle PQR is equal to (90-θ)°, the angle of inclination θ of the side face 40c of the light-diffusion portion 40 is equal to the angle of incidence θ' of the incident light VR at point Q. Therefore, the angle of inclination θ of the side face 40c of the light-diffusion portion 40 exceeds the above-mentioned critical angle.

Since there exists the air layer (spaces 43) between the adjacent light-diffusion portions 40 in the light-diffusion member 7, if the light-diffusion portions 40 are made of, for example, a transparent acrylic resin, the side face 40c of the light-diffusion portions 40 is an interface between the transparent acrylic resin and the air layer. Even if another low-refractive-index material fills around the light-diffusion portions 40, the refractive index difference at the interface of the interior and exterior of the light-diffusion portions 40 becomes greater when there is an air layer in the exterior than when there is any other matter in the exterior, no matter how low the refractive index of that matter is. Therefore, Snell's law dictates that in the light-diffusion member 7, the critical angle becomes a minimum and also that the range of angles of incidence at which light undergoes total reflection at the side face 40c of the light-diffusion portion 40 becomes broadest. As a result, the loss of light is reduced, and a high luminance can be obtained.

Figure 6A:
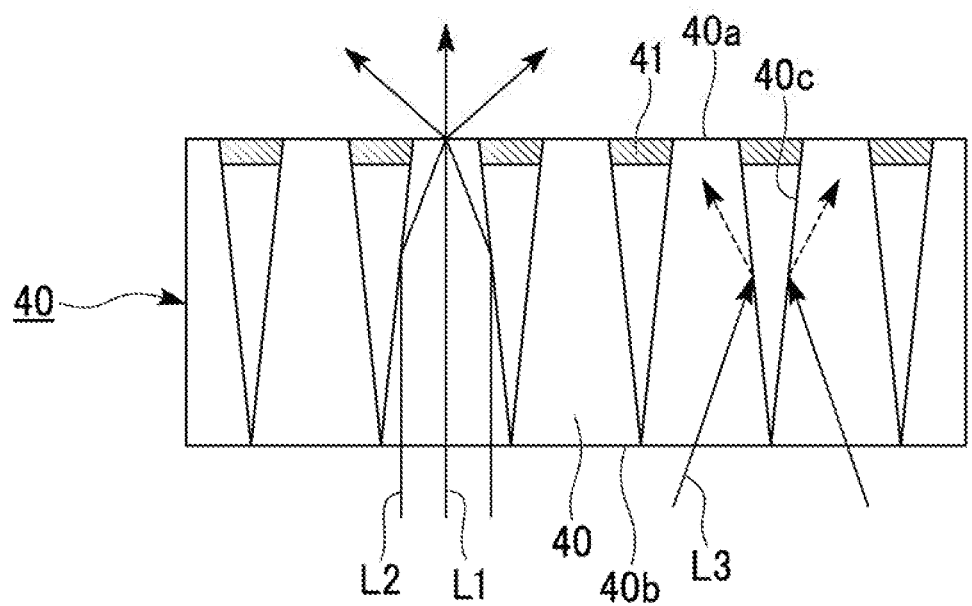
FIG. 6A is a first diagram illustrating a viewing angle expanding effect of the light-diffusion member.
Figure 6B:
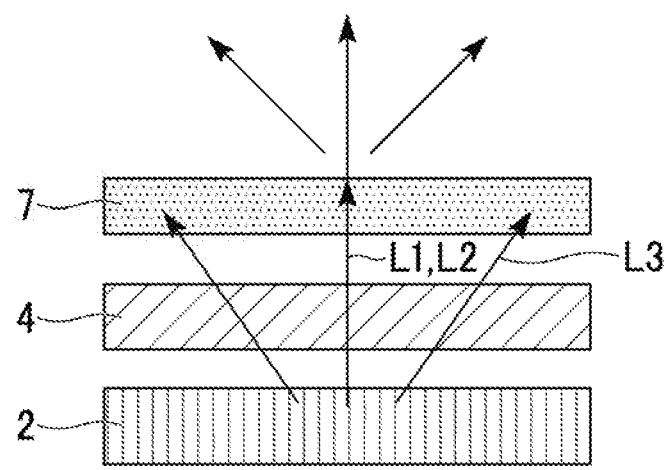
FIG. 6B is a second diagram illustrating the viewing angle expanding effect of the light-diffusion member.

Now, a viewing angle expanding effect of the light-diffusion member 7 will be described in reference to FIGS. 6A and 6B. FIG. 6A is a cross-sectional view illustrating optical paths of light transmitted through the light-diffusion portions 40 in the light-diffusion member 7. FIG. 6B is a schematic view illustrating diffusion of light that enters the light-diffusion member 7 substantially perpendicular thereto after being emitted from the backlight 2 and passing through the liquid crystal panel 4.

Referring to FIG. 6A, of the rays of light incident to the light-diffusion portion 40 through the light-incident end face 40b, a ray of light L1 substantially perpendicularly incident on the light-incident end face 40b near the center of the light-diffusion portion 40 does not undergo total reflection at the side face 40c of the light-diffusion portion 40 and straightly travels and passes through the light-diffusion portion 40.

A ray of light L2 substantially perpendicularly incident on the light-incident end face 40b in a peripheral part of the light-diffusion portion 40 strikes the side face 40c of the light-diffusion portion at an angle of incidence larger than the critical angle and therefore undergoes total reflection at the side face 40c of the light-diffusion portion 40. The totally reflected light is refracted by the light-emitting end face 40a of the light-diffusion portion 40 and emitted in a direction that makes a large angle to the normal to the light-emitting end face 40a.

Meanwhile, a ray of light L3 obliquely incident on the light-incident end face 40b of the light-diffusion portion 40 strikes the side face 40c of the light-diffusion portion 40 at an angle of incidence smaller than the critical angle, therefore passes through the side face 40c of the light-diffusion portion 40, and is absorbed by the light-blocking layer 41.

Owing to this mechanism, the rays of light L1 and L2, substantially perpendicularly incident to the light-diffusion member 7 after being emitted from the backlight 2 and passing through the liquid crystal panel 2, are emitted from the light-diffusion member 7 with a wider angular distribution than before entering the light-diffusion member 7 as shown in FIG. 6B. Therefore, when the viewer moves his/her line of sight away from the frontal direction (normal direction) of the liquid crystal display device 1, he/she can still enjoy good displays.

In particular, in the present embodiment, since the light-diffusion portion 40 is circular in a plan view, the angular distribution hence spans across all directions above and below the normal to the screen of the liquid crystal display device 1. The viewer can therefore enjoy good displays in all directions. In other words, the use of the light-diffusion member 7 can expand the viewing angle of the liquid crystal display device 1.

Meanwhile, the ray of light L3, obliquely incident to the light-diffusion member 7, has been obliquely transmitted through the liquid crystal panel 4 and therefore exhibits a different retardation from desired retardation and could be a factor that would decrease the so-called display contrast. The light-diffusion member 7 can increase the display contrast by cutting out such light by means of the light-blocking layer 41.

It is known that moire generally becomes visible when regular patterns, such as stripes and lattices, with slightly different cycles are superimposed on each other. As an example, if a light-diffusion member in which a plurality of light-diffusion portions is arranged in a matrix and a liquid crystal panel in which a plurality of pixels is arranged in a matrix are superimposed, moire is produced between the cyclic pattern of the light-diffusion portions in the light-diffusion member and the cyclic pattern of the pixels in the liquid crystal panel, which could lower display quality.

In contrast, in the liquid crystal display device 1 in which the light-diffusion member 7 of the present embodiment is used, the light-diffusion portions 40 are randomly arranged in a plan view and therefore do not cause moire through interference with the regular arrangement of the pixels in the liquid crystal panel 4, which maintains good display quality.

Method of Manufacturing Light-Diffusion Member

Next, a method of manufacturing the light-diffusion member 7 will be described in reference to FIGS. 7 to 10B.

Figure 7:
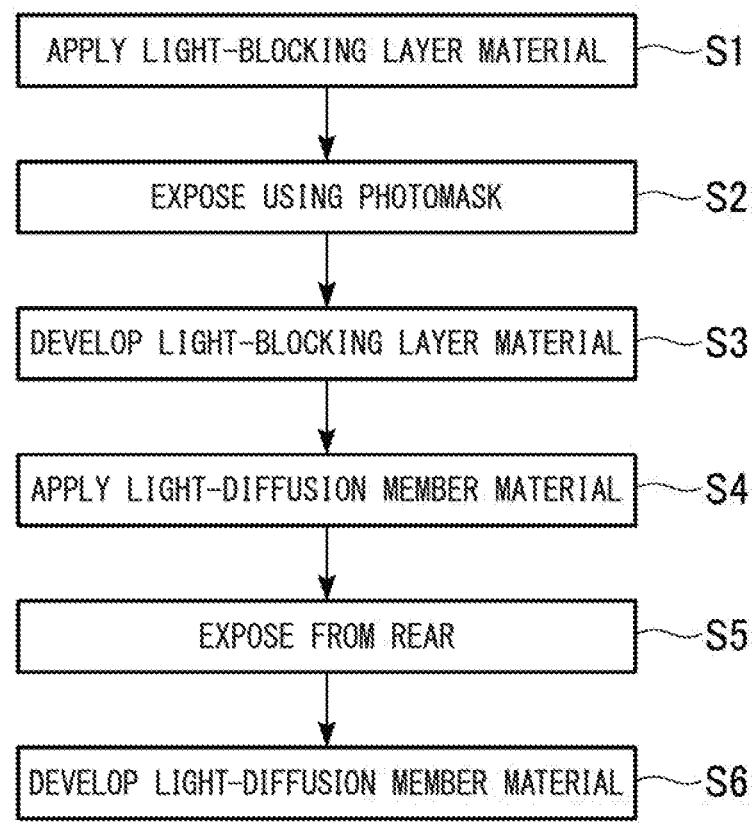
FIG. 7 is a flow chart depicting steps of manufacturing the light-diffusion member.
Figure 8A:
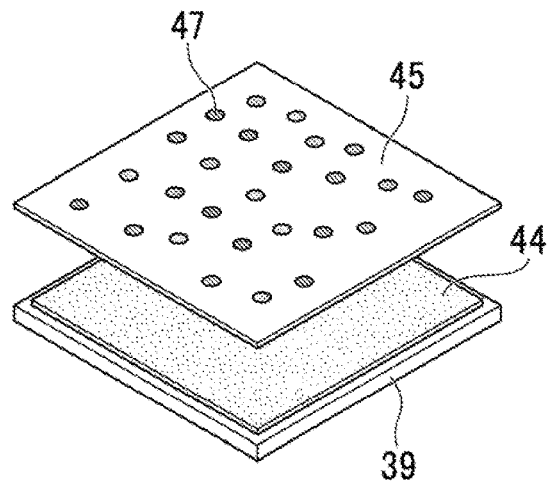
FIG. 8A is a first perspective view illustrating one of sequential steps of manufacturing the light-diffusion member.
Figure 8B:
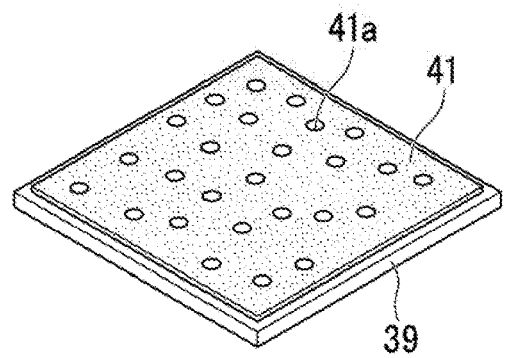
FIG. 8B is a second perspective view illustrating one of sequential steps of manufacturing the light-diffusion member.
Figure 8C:
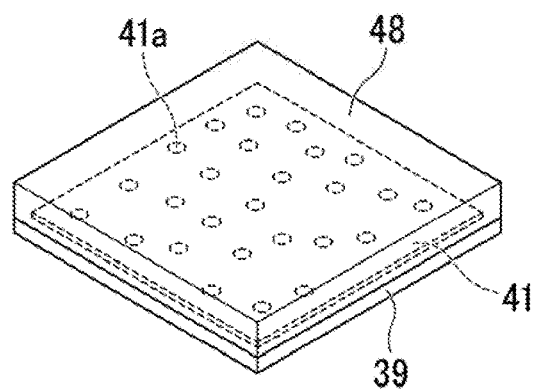
FIG. 8C is a third perspective view illustrating one of sequential steps of manufacturing the light-diffusion member.
Figure 8D:
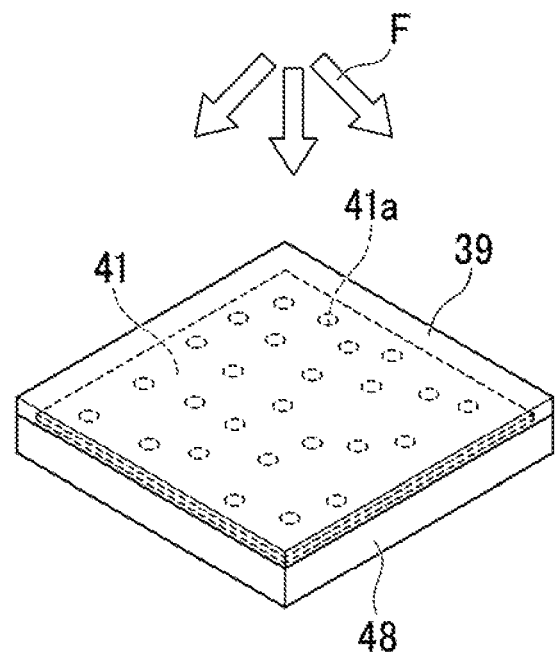
FIG. 8D is a fourth perspective view illustrating one of sequential steps of manufacturing the light-diffusion member.
Figure 8E:
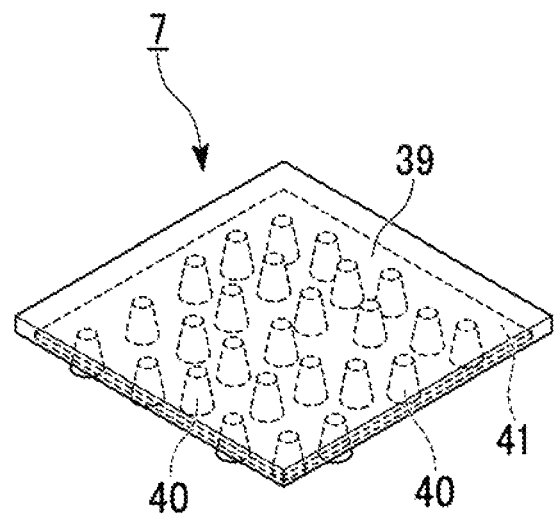
FIG. 8E is a fifth perspective view illustrating one of sequential steps of manufacturing the light-diffusion member.
Figure 9A:
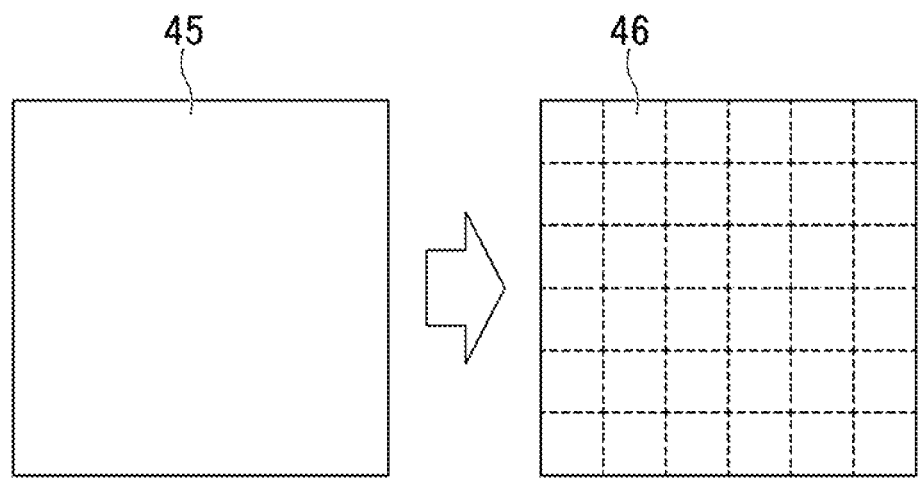
FIG. 9A is a first diagram illustrating an arrangement of light-diffusion portions in the light-diffusion member.
Figure 9B:
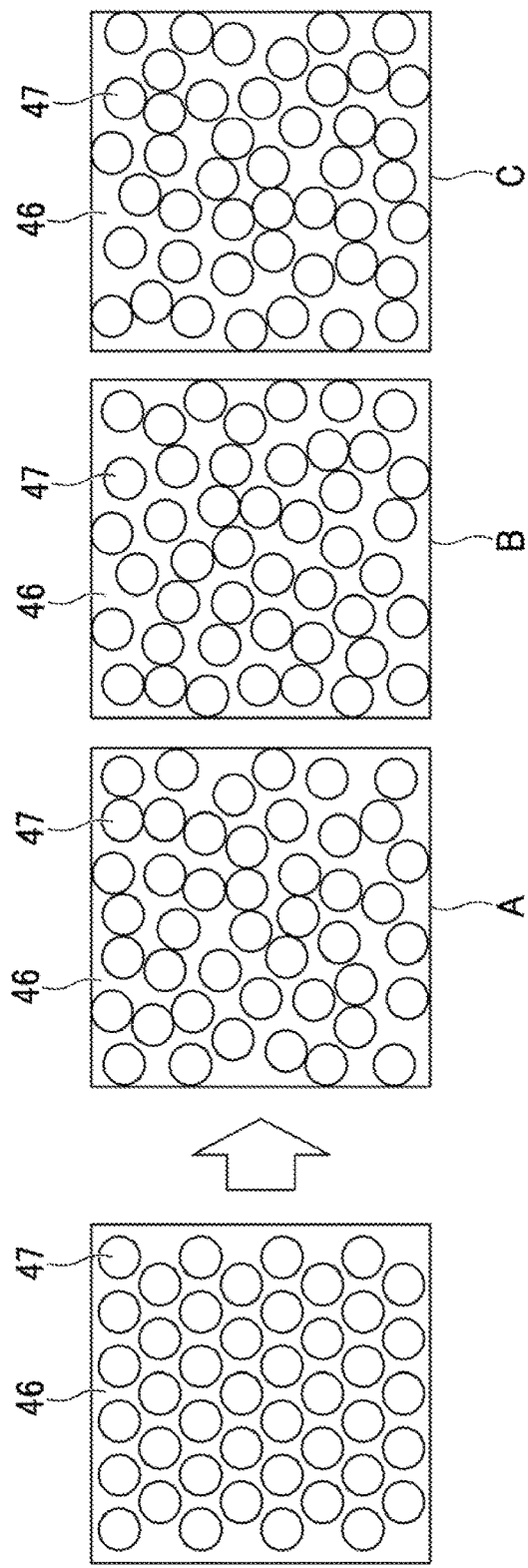
FIG. 9B is a second diagram illustrating an arrangement of light-diffusion portions in the light-diffusion member.

FIG. 7 is a flow chart depicting steps of manufacturing the light-diffusion member 7. FIGS. 8A to 8E are perspective views sequentially illustrating steps of manufacturing the light-diffusion member 7. FIGS. 9A to 9C are diagrams illustrating an arrangement of the light-diffusion portions 40 in the light-diffusion member 7. FIGS. 10A and 10B are cross-sectional views illustrating steps of fabricating the light-diffusion portions 40.

To manufacture the light-diffusion member 7, first of all, a light-blocking-layer material is applied to a face of the substrate 39 in step S1 in FIG. 7. Specifically, the substrate 39, made of triacetyl cellulose, is prepared as shown in FIG.

8A. The substrate 39 measures, for example, 10 cm in length by 10 cm in width by 100 μm in thickness. That face of the substrate 39 is then spin-coated with a black negative resist containing carbon as a light-blocking-layer material to form a coating film 44 with a thickness of 150 nm. Thereafter, the substrate 39 having formed thereon the coating film 44 is placed on a hotplate to subject the coating film 44 to prebaking at a temperature of 90° C. The prebaking volatilizes the solvent components of the black negative resist.

Next, in step S2 in FIG. 7, the coating film 44 is exposed to light using a photomask. Specifically, the coating film 44 is exposed, as shown in FIG. 8A, using a photomask 45 on which a plurality of light-blocking patterns 47 is randomly arranged.

The exposure is done using combined light of wavelengths of 365 nm (i-line), 404 nm (h-line), and 436 nm (g-line). The exposure doze is specified to 100 ml/cm$^2$. In the present embodiment, a transparent negative resist is exposed to light using the light-blocking layer 41 as a mask in the next step to fabricate the light-diffusion portions 40. Therefore, the positions of the light-blocking patterns 47 on the photomask 45 match the positions of the light-diffusion portions 40 formed.

All the light-blocking patterns 47 are circular, have a diameter of 20 μm, and are randomly arranged. The adjacent light-blocking patterns 47 are therefore separated by a distance ("pitch") that is not fixed. The average distance between the adjacent light-blocking patterns 47 is 25 μm.

The average distance between the light-blocking patterns 47 and the size of the light-blocking patterns 47 are preferably smaller than the distance (pitch) between the pixels in the liquid crystal panel 4. In this preferred configuration, each pixel contains at least one of the light-diffusion portions 40. Therefore, wide viewing angles can be achieved when this configuration is combined with liquid crystal panels with small pixel pitches used in, for example, mobile devices.

Now, an exemplary technique to design the photomask 45 on which the light-blocking patterns 47 are randomly arranged will be described in reference to FIGS. 9A to 9C.

To design the photomask 45, first of all, the whole photomask 45 is divided into m (e.g., 6) regions in length and n (e.g., 6) regions in width, that is, m×n (e.g., 36) regions 46 as shown in FIG. 9A.

Next, as shown in the leftmost side of FIG. 9B, a pattern is fabricated in which circles that correspond to the shape of the light-blocking patterns 47 are arranged as densely as possible in each divided region 46.

Next, as shown in the three right-side diagrams of FIG. 9B, fluctuations are given to reference position data for the circle positions, for example, the coordinates of the centers of the circles, by using random functions to create two or more sets of position data (e.g., three sets of patterns, namely set A, set B, and set C).

Next, as shown in FIG. 9C, the created position data sets A, B, and C are randomly assigned to the m×n regions. For example, the position data sets A, B, and C are assigned to the regions 46 so that the position data sets A, B, and C appear randomly in the 36 regions 46.

Therefore, in each region 46 of the photomask 45, the arrangement of the light-blocking patterns 47 in the region 46 matches one of the patterns, namely, the position data set A, the position data set B, or the position data set C. Therefore, the light-blocking pattern 47 in each region is not totally randomly arranged. However, if the photomask 45 is viewed as a whole, the light-blocking patterns 47 are randomly arranged across the photomask 45.

Next, in step S3 in FIG. 7, the exposed coating film 44 is developed. Specifically, the coating film 44, composed of a black negative resist, is developed using a purpose-made developer and thereafter dried at 100° C. as shown in FIG. 8B. Thus, the light-blocking layer 41 is fabricated which has a plurality of circular openings 41a on a face of the substrate 39.

The openings 41a correspond to regions where the light-diffusion portions 40 are formed in the next step. In the present embodiment, the light-blocking layer 41 is formed by photolithography using a black negative resist. An alternative process using a photomask in which the light-blocking patterns 47 of the present embodiment and light-transmitting regions are reversed may be used with a positive resist. As a further alternative, the light-blocking layer 41 may be fabricated by vapor deposition, printing, or like technology.

Next, in step S4 in FIG. 7, a light-diffusion-member material is applied to a face of the substrate 39. Specifically, as shown in FIG. 8C, the top face of the light-blocking layer 41 is spin-coated with a transparent negative resist composed of acrylic resin as a light-diffusion-member material, to form a coating film 48 with a thickness of 25 μm. Thereafter, the substrate 39 having formed thereon the coating film 48 is placed on a hotplate to subject the coating film 48 to prebaking at a temperature of 95° C. The prebaking volatilizes the solvent components of the transparent negative resist.

Next, the coating film 48 is exposed from the backside thereof in step S5 in FIG. 7. Specifically, as shown in FIG. 8D, the substrate 39 is flipped, and the coating film 48 is exposed to diffused light F from the side facing the substrate 39 using the light-blocking layer 41 as a mask.

The exposure is done using combined light of wavelengths of 365 nm (i-line), 404 nm (h-line), and 436 nm (g-line). The exposure doze is specified to 500 mJ/cm$^2$. The diffused light F can be generated by, for example, disposing a diffusion plate that exhibits a haze of approximately 50 in the optical path of parallel light emitted from an exposure unit. Thereafter, the substrate 39 carrying the coating film 48 thereon is placed on a hotplate to subject the coating film 48 to post-exposure baking (PEB) at a temperature of 95° C.

Next, in step S6 in FIG. 7, the exposed coating film 48 is developed. Specifically, the coating film 48, composed of a transparent negative resist, is developed using a purpose-made developer and thereafter postbaked at 100° C. as shown in FIG. 8E. The light-diffusion portions 40 are thus fabricated on a face of the substrate 39.

The light-diffusion member 7 is obtained by these steps. The light-diffusion member 7 preferably has a total light transmittance of 90% or greater. With a total light transmittance of 90% or greater, the light-diffusion member has sufficient transparency and sufficiently exhibits a required light diffusion capability. The total light transmittance is measured in accordance with JIS K7361-1.

In the present embodiment, light is shone from the rear side of the substrate 39 using the light-blocking layer 41 as a mask in the step of forming the light-diffusion portions 40. Therefore, the light-diffusion portions 40 are formed self-aligned with the positions of the openings 41a in the light-blocking layer 41. As a result, as shown in FIG. 10A, the light-diffusion portions 40 are in intimate contact with the light-blocking layer 41. No gaps form between the light-diffusion portions 40 and the light-blocking layer 41, which reliably maintains contrast.

On the other hand, if light is shone from the side of the coating film 48 composed of a transparent negative resist using a photomask in the step of forming the light-diffusion portions 40, it is highly difficult to regulate the alignment of the photomask and the substrate 39 having formed thereon the fine-sized light-blocking layer 41. That will inevitably lead to misalignment. As a result, a gap S will develop between the light-diffusion portions 40 and the light-blocking layer 41 as shown in FIG. 10B. Contrast will decrease due to the light leaking through the gap S.

If the light-blocking layer 41 is not provided on the substrate 39, external light incident to the light-diffusion member 7 is also scattered. The scattering of external light lowers visibility in bright places, and in addition, "washed-out black" occurs in which black appears whitish in black display. This in turn lowers contrast. Images therefore cannot be observed in a desirable manner. The light-blocking layer 41 is disposed on the substrate 39 to prevent these from happening.

In the present embodiment, the substrate 39 is flipped before the coating film 48 is exposed to light. Depending on the manufacturing equipment, the coating film 48 may be exposed from the side thereof facing the substrate 39, without flipping the substrate 39.

In the present embodiment, a liquid resist is applied to fabricate the light-blocking layer 41 and the light-diffusion portions 40. Alternatively, a film resist may be attached onto a face of the substrate 39.

The fabricated light-diffusion member 7 is attached to the liquid crystal display medium 6 as shown in FIG. 2. Specifically, the light-diffusion member 7 is attached to the second polarizing plate 5 via the adhesive layer 42 formed on a face of the second polarizing plate 5, with the substrate 39 positioned to face the viewing side and the light-diffusion portions 40 positioned to face the second polarizing plate 5. Alternatively, the light-diffusion member 7 is attached to the second polarizing plate 5 via the adhesive layer 42 formed in advance on a face of the light-diffusion member 7 facing the light-incident end face 40b, with the substrate 39 positioned to face the viewing side and the light-diffusion portions 40 positioned to face the second polarizing plate 5.

The liquid crystal display device 1 is fabricated by these steps.

The manufacture of the liquid crystal display medium 6 starts off with separate fabrication of the TFT substrate 9 and the color filter substrate 10. Thereafter, the TFT substrate 9 and the color filter substrate 10 are disposed in such a manner that the face of the TFT substrate 9 on which the TFTs 19 are formed is placed opposite the face of the color filter substrate 10 on which the color filters 31 are formed. The TFT substrate 9 and the color filter substrate 10 are then attached to each other using a sealing member. Thereafter, liquid crystal is injected into a space surrounded by the TFT substrate 9, the color filter substrate 10, and the sealing member. The first polarizing plate 3 and the second polarizing plate 5 are then attached to the respective sides of the liquid crystal panel 4 prepared as above, by using an optical adhesive or the like. The liquid crystal display medium 6 is fabricated by these steps.

The TFT substrate 9 and the color filter substrate 10 are manufactured by a publicly known, conventional method, description of which is omitted.

Machine for Manufacturing Light-Diffusion Member

Next, exemplary manufacturing equipment 50 for the light-diffusion member 7 shown in FIGS. 11, 12A, and 12B will be described.

Figure 11:
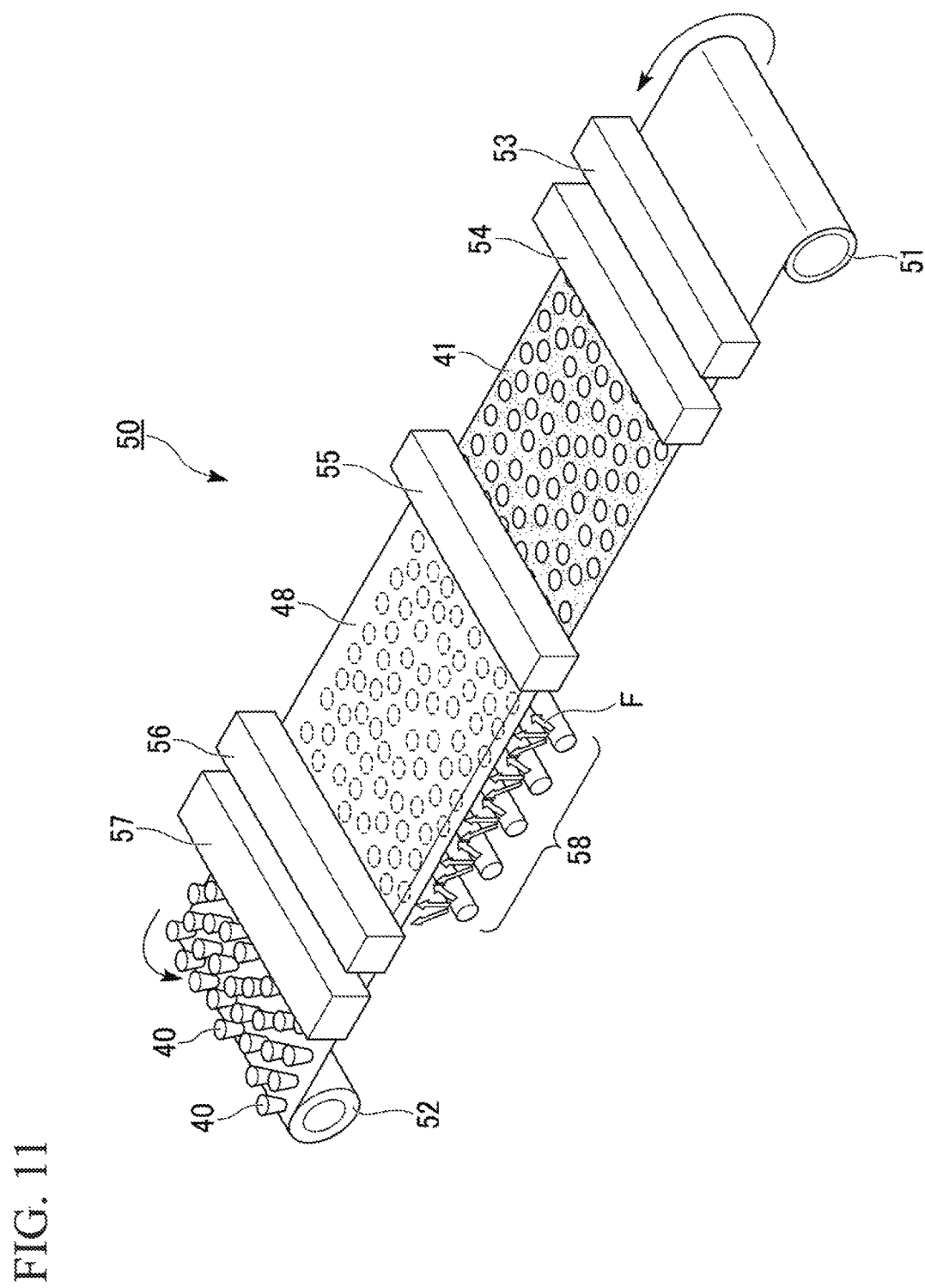
FIG. 11 is a perspective view of exemplary manufacturing equipment for the light-diffusion member.

FIG. 11 is a perspective view of a configuration of the manufacturing equipment 50. FIGS. 12A and 12B are perspective views of a major part of the manufacturing equipment 50.

Referring to FIG. 11, the manufacturing equipment 50 performs various processing while transporting the elongate substrate 39 roll-to-roll. The manufacturing equipment 50 fabricates the light-blocking layer 41 by printing instead of photolithography using the photomask 45.

The manufacturing equipment 50 includes a feed roller 51 on one end thereof and a winding roller 52 on the other end thereof. The feed roller 51 feeds the substrate 39. The winding roller 52 winds up the substrate 39. The manufacturing equipment 50 thereby moves the substrate 39 from the end where the feed roller 51 is provided to the end where the winding roller 52 is provided.

The manufacturing equipment 50 includes, above the substrate 39, a printing unit 53, a first drying unit 54, a coating unit 55, a developing unit 56, and a second drying unit 57 disposed in this sequence when viewed from the end where the feed roller 51 is provided toward the end where the winding roller 52 is provided.

The printing unit 53 prints the light-blocking layer 41 on the substrate 39. The first drying unit 54 dries the printed light-blocking layer 41. The coating unit 55 applies a transparent negative resist to the light-blocking layer 41. The developing unit 56 develops an exposed transparent negative resist with a developer. The second drying unit 57 dries the substrate 39 carrying thereon the light-diffusion portions 40 composed of the developed transparent resist. Thereafter, the substrate 39 carrying thereon the light-diffusion portions 40 may be attached to the second polarizing plate 5 to integrate the light-diffusion member 7 with the polarizing plate.

An exposure unit 58 is disposed below the substrate 39. The exposure unit 58 exposes the coating film 48 composed of a transparent negative resist from the side thereof facing the substrate 39. FIGS. 12A and 12B are diagrams illustrating only the exposure unit 58 and related components in the manufacturing equipment 50.

Figure 12A:
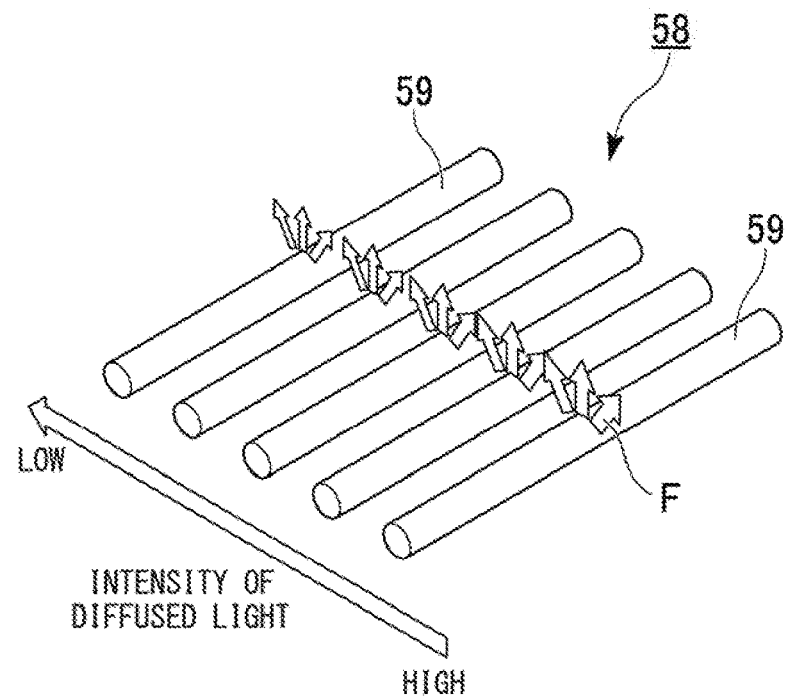
FIG. 12A is a first perspective view of a major part of the manufacturing equipment.
Figure 12B:
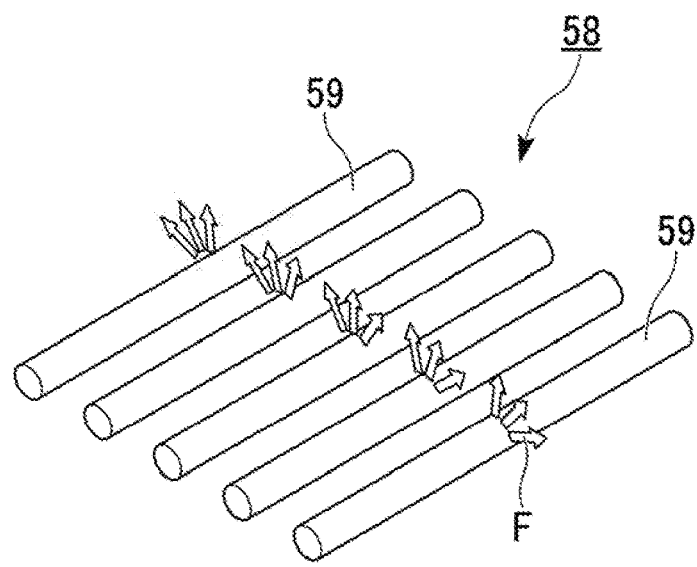
FIG. 12B is a second perspective view of the major part of the manufacturing equipment.

The exposure unit 58 includes a plurality of light sources 59 as shown in FIG. 12A. As the substrate 39 is moved along, the diffused light F from the light sources 59 in the exposure unit 58 may decrease gradually, or vary otherwise, in intensity. The diffused light F from the light sources 59 in the exposure unit 58 may also gradually change in emission angle as shown in FIG. 12B as the substrate 39 is moved along. Use of the exposure unit 58 described here enables control of the angle of inclination of the side faces 40c of the light-diffusion portions 40 to a desired angle.

First Embodiment

Figure 13:
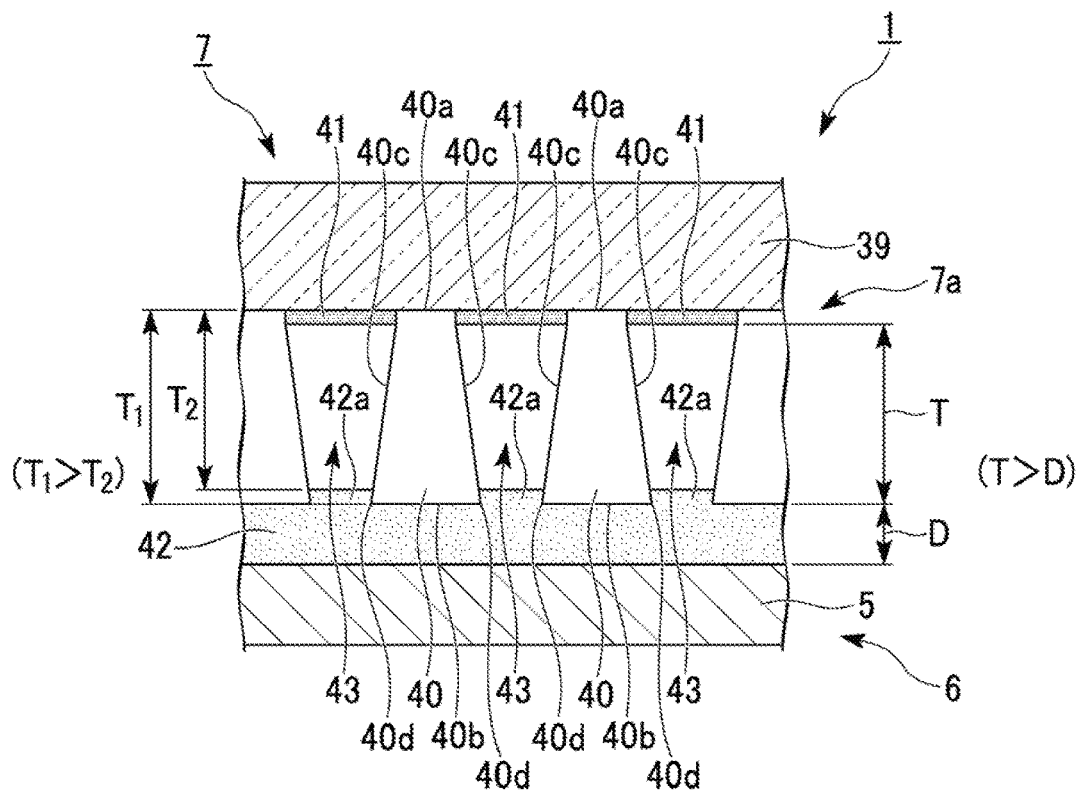
FIG. 13 is a cross-sectional view of a liquid crystal display device in accordance with a first embodiment of the present invention.

The liquid crystal display device 1 will be now described which is shown in FIG. 13 as a first embodiment of the present invention.

FIG. 13 is a cross-sectional view of the liquid crystal display device 1 in which the light-diffusion member 7 is attached to the liquid crystal display medium 6 via the adhesive layer 42.

In the liquid crystal display device 1 shown in FIG. 13, the adhesive layer 42 adheres to the light-incident end face 40b and partly encroaches into the spaces 43 formed between the light-diffusion portions 40 and the light-blocking layer 41. Each encroaching part of the adhesive layer 42 will be hereinafter referred to as an encroachment portion 42a. This configuration renders a distance $T_2$ from the face of the substrate 39 facing the liquid crystal display medium 6 to the surface of the adhesive layer 42 inside the space 43 shorter than a distance $T_1$ from the face of the substrate 39 facing the liquid crystal display medium 6 to the light-incident end face 40b ($T_1 > T_2$).

In this configuration, each encroachment portion 42a of the adhesive layer 42 that encroaches into the space 43 is anchored between the reverse-tapered side faces 40c of the adjacent light-diffusion portions 40 ("anchoring effect"). In addition, the encroachment portion 42a of the adhesive layer 42 that encroaches into the space 43 adds to the area of adhesion of the adhesive layer 42 to the light-diffusion portion 40. The configuration can hence increase adhesion strength between the adhesive layer 42 and the light-diffusion portion 40.

Therefore, in the liquid crystal display device 1 of the present embodiment, the adhesion strength of the light-diffusion member 7 to the liquid crystal display medium 6 is enhanced when the light-diffusion portions 40 (light-diffusion member 7) are attached to the second polarizing plate 5 (liquid crystal display medium 6) via the adhesive layer 42. This enhanced adhesion strength allows for further improvement in display quality and reliability.

Note that the face of the substrate 39 facing the liquid crystal display medium 6 is the face of the substrate 39 on which the light-blocking layer 41 is formed and also that the light-incident end faces 40b of the light-diffusion portions 40 form a plane (level face) that is approximately parallel to the face of the substrate 39 on which the light-blocking layer 41 is formed. Therefore, the distance $T_1$ is determined assuming that the distance $T_1$ is equal to a vertical distance from the face of the substrate 39 on which the light-blocking layer 41 is formed to a corner 40d where the light-incident end face 40b and the side face 40c of the light-diffusion portion 40 meet.

On the other hand, the surface of the adhesive layer 42 inside the spaces 43 (the plane formed collectively by the encroachment portions 42a) is not always a plane (level face) that is parallel to the face of the substrate 39 on which the light-blocking layer 41 is formed. Therefore, the distance $T_2$ is determined assuming that the distance $T_2$ is equal to a vertical distance from the face of the substrate 39 on which the light-blocking layer 41 is formed to a location where the encroachment portion 42a is in contact with the side face 40c of the light-diffusion portion 40, using as a reference a location where the adhesive layer 42 inside the space 43 (the encroachment portions 42a) is in contact with the side face 40c of the light-diffusion portion 40.

In the liquid crystal display device 1 of the present embodiment, the adhesive layer 42 has a thickness D that is smaller than a height T of the space 43 formed between the light-diffusion portions 40 and the light-blocking layer 41 from the light-blocking layer 41 to the light-incident end face 40b (T>D). This configuration restrains the light diffusion capability of the light-diffusion member 7 from deteriorating when the light-diffusion member 7 is attached to the liquid crystal display medium 6.

Specifically, in the light-diffusion member 7, since incident light needs to undergo total reflection at the side face 40c of the light-diffusion portion 40, it is desirable to increase a refractive index difference at the side face 40c, which is an interface of the interior and exterior of the light-diffusion portions 40.

In the light-diffusion member 7, the spaces 43 formed between the light-diffusion portions 40 and the light-blocking layer 41 include an air layer. The inclusion of the air layer can maximize a refractive index difference at the side face 40c between the light-diffusion portions 40 (higher refractive index side) and the air layer (lower refractive index side).

On the other hand, in the encroachment portions 42a where the adhesive layer 42 encroaches into the spaces 43, the refractive index difference decreases between the side faces 40c of the light-diffusion portions 40 and the adhesive layer 42, and the light diffusion capability of the light-diffusion member 7 decreases in the encroachment portions 42a. In addition, the corners 40d of the light-diffusion portions 40 are covered by the adhesive layer 42. The light diffusion capability is hence lowered at the corners 40d. The lowered light diffusion capability can suppress unnecessary scattering of light by the corners 40d, thereby preventing degradation of display characteristics.

Figure 14:
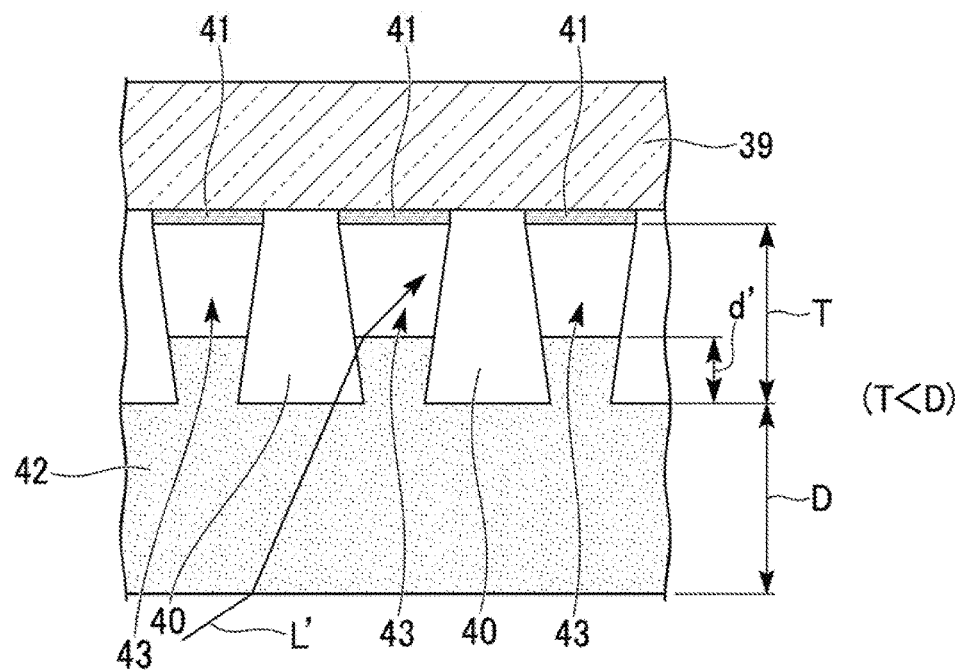
FIG. 14 is a cross-sectional view of optical paths of light incident to side faces of light-diffusion portions when the thickness of an adhesive layer exceeds the height of a space.

FIG. 14 illustrates optical paths of incident light L' on the side face 40c of the light-diffusion portion 40 in a case where the thickness D of the adhesive layer 42 is larger than the height T of the space 43 (T<D). On the other hand, FIG. 15 illustrates optical paths of incident light L on the side face 40c of the light-diffusion portion 40 in a case where the thickness D of the adhesive layer 42 is smaller than the height T of the space 43 (T>D) as in the present embodiment.

Figure 15:
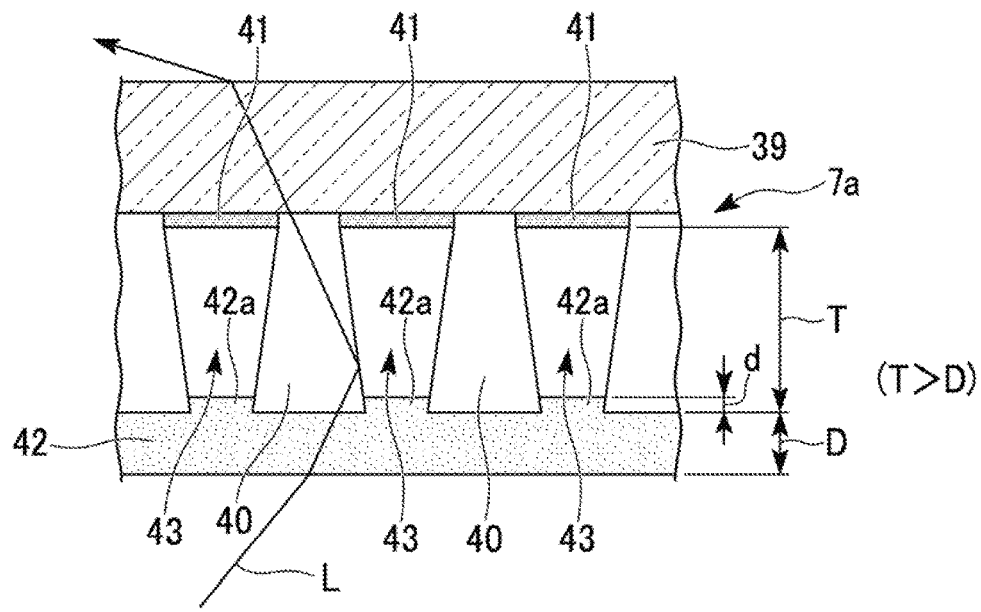
FIG. 15 is a cross-sectional view of optical paths of light incident to the side faces of the light-diffusion portions when the thickness of the adhesive layer is less than the height of the space.

Referring to FIGS. 14 and 15, if the modulus of elasticity of the adhesive layer 42 remains unchanged, the amount of the adhesive layer 42 that encroaches into the spaces 43 between the light-diffusion portions 40 (the thickness of the encroachment portions 42a) when the light-diffusion member 7 and the liquid crystal display medium 6 are compressed can be reduced with a decrease in the thickness D of the adhesive layer 42.

Additionally, if the thickness D of the adhesive layer 42 is smaller than the height T of the space 43, the adhesive layer 42 does not completely fill up the spaces 43.

The modulus of elasticity of the adhesive layer 42 upon the compression is preferably lower than the modulus of elasticity of the light-diffusion member 7. This preferred configuration, when the liquid crystal display medium 6 and the light-diffusion member 7 are compressed, causes the adhesive layer 42 to encroach into the spaces 43 between the light-diffusion portions 40, while suppressing deformation of the light-diffusion member 7. That can in turn restrain the light-diffusion capability of the light-diffusion member 7 from deteriorating.

Therefore, the thickness d' of the part of the adhesive layer 42 that encroaches into the space 43 (the encroachment portion 42a) in the case shown in FIG. 14 where the thickness D of the adhesive layer 42 is larger than the height T of the space 43 (T<D) is larger than the thickness d ($=T_1-T_2$) of the part of the adhesive layer 42 that encroaches into the space 43 (the encroachment portion 42a) in the case shown in FIG. 15 where the thickness D of the adhesive layer 42 is smaller than the height T of the space 43 (T>D) (d'>d).

Therefore, in the case shown in FIG. 14 where the thickness D of the adhesive layer 42 is larger than the height T of the space 43 (T<D), the incident light L' incident on the side face 40c of the light-diffusion portion 40 does not undergo total reflection at the encroachment portion of the adhesive layer 42, passes through the side face 40c, and is absorbed by the light-blocking layer 41. In this case, since it is impossible to pick up the incident light L through the light-emitting end face 40a, display brightness decreases accordingly.

On the other hand, in the case shown in FIG. 15 where the thickness D of the adhesive layer 42 is smaller than the height T of the space 43 (T>D), the incident light L incident on the side face 40c of the light-diffusion portion 40 undergoes total reflection at the interface with the air layer (space 43). Light use efficiency can be thus increased, and good viewing angle properties can be achieved.

Based on these findings, the thickness D of the adhesive layer 42 is specified to be smaller than the height T of the space 43 in the liquid crystal display device 1 of the present embodiment. This configuration can restrain the light diffusion capability of the light-diffusion member 7 from deteriorating while restraining the adhesive layer 42 from encroaching into the spaces 43 when the light-diffusion member 7 is attached to the liquid crystal display medium 6.

The adhesive used as the adhesive layer 42 in the liquid crystal display device 1 of the present embodiment preferably cures under radiation of activation energy. Specifically, the adhesive is preferably, for example, photocuring or thermosetting. In the present embodiment, such an adhesive is applied to a face of the second polarizing plate 5 in the liquid crystal display medium 6 and thereafter irradiated with light such as ultraviolet (UV) light or heated, to form the adhesive layer 42 in half-solid state. The light-diffusion member 7 is then attached to the second polarizing plate 5 via the half-solid adhesive layer 42, after which the half-solid adhesive layer 42 is further irradiated with light or heated for curing.

In the liquid crystal display device 1 of the present embodiment, use of such an adhesive that cures under radiation of activation energy to form the adhesive layer 42 can restrain the light diffusion capability of the light-diffusion member 7 from deteriorating while restraining the adhesive layer 42 from encroaching into the spaces 43 when the light-diffusion member 7 is attached to the liquid crystal display medium 6. Therefore, according to the liquid crystal display device 1 of the present embodiment, light use efficiency can be increased, and simultaneously good viewing angle properties can be achieved.

In addition, if an adhesive that cures under radiation of activation energy to form the adhesive layer 42 is used, it is ensured not only in the above-described case where the thickness D of the adhesive layer 42 is smaller than the height T of the space 43 (T>D), but also in other cases, that the adhesive layer 42 has such a sufficient thickness that the light-diffusion member 7 can be attached to the second polarizing plate 5.

The adhesive layer 42 is preferably made of a material that has low affinity with the material constituting the light-diffusion portions 40 in order to restrain the adhesive layer 42 from encroaching into the spaces 43.

Second Embodiment

Next, a liquid crystal display device 1A shown in FIG. 16 will be described as a second embodiment of the present invention.

Elements that are the same as those of the liquid crystal display device 1 described above will be given no description in the following and denoted in drawings by the same reference numerals as those of the liquid crystal display device 1. FIG. 16 is a cross-sectional view of the liquid crystal display device 1A in which a light-diffusion member 7A is attached to the liquid crystal display medium 6 via an adhesive sheet 49.

Figure 16:
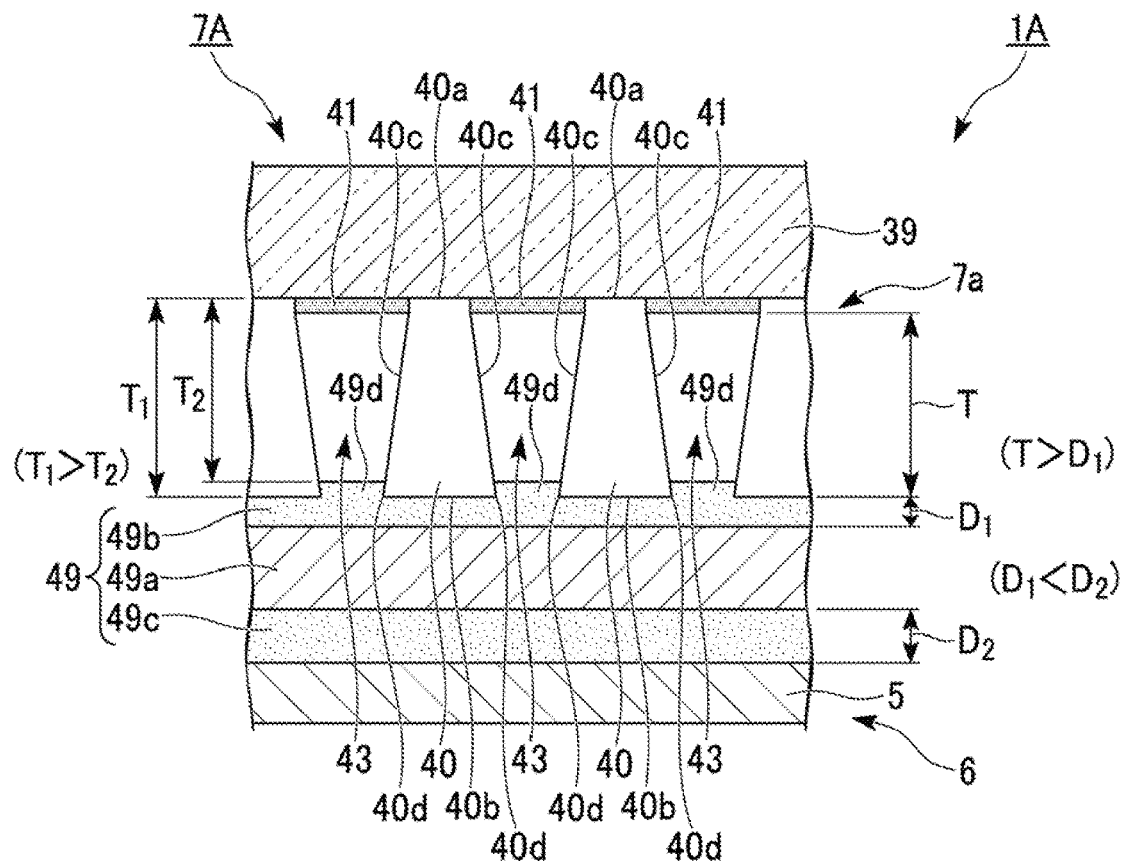
FIG. 16 is a cross-sectional view of a liquid crystal display device in accordance with a second embodiment of the present invention.

In the liquid crystal display device 1A shown in FIG. 16, the adhesive sheet 49 is used in place of the adhesive layer 42. Specifically, the adhesive sheet 49 includes an adhesive sheet substrate 49a having light-transmitting properties and adhesive layers 49b and 49c formed respectively on the two faces of the adhesive sheet substrate 49a. The adhesive sheet substrate 49a may be made of the same material as the substrate 39. The adhesive layers 49b and 49c may be made of the same material as the adhesive layer 42. Except these points, the liquid crystal display device 1A has basically the same structure as the liquid crystal display device 1.

In the adhesive sheet 49, it is preferable that the adhesive sheet substrate 49a and the adhesive layers 49b and 49c have equal refractive indices, and it is more preferable that the adhesive sheet substrate 49a and the adhesive layers 49b and 49c have refractive indices of 0.15 or less. If the adhesive sheet substrate 49a and the adhesive layers 49b and 49c have equal refractive indices, unnecessary reflection at each interface can be suppressed, which in turn restrains decrease in the transmittance of the adhesive sheet 49.

In the liquid crystal display device 1A of the present embodiment, the light-diffusion member 7A and the second polarizing plate 5 are attached via the adhesive sheet 49. This configuration can reduce both the thickness $D_1$ of one of the adhesive layers (adhesive layer 49b) in the adhesive sheet 49 that adheres to the light-diffusion portions 40 (light-diffusion member 7A) and the thickness $D_2$ of the other adhesive layer (adhesive layer 49c) in the adhesive sheet 49 that adheres to the second polarizing plate 5 (liquid crystal display medium 6). Additionally, the adhesive sheet substrate 49a, which has a higher modulus of elasticity than the adhesive layers 49b and 49c, ensures rigidity of the adhesive sheet 49 upon the compression of the light-diffusion member 7A.

In the liquid crystal display device 1A, the adhesive layer 49b partly encroaches into the spaces 43 similarly to the adhesive layer 42. Each encroaching part of the adhesive layer 49b will be hereinafter referred to as an encroachment portion 49d. This configuration renders a distance $T_2$ from the face of the substrate 39 facing the liquid crystal display medium 6 to the surface of the adhesive layer 49b inside the space 43 shorter than a distance $T_1$ from the face of the substrate 39 facing the liquid crystal display medium 6 to the light-incident end face 40b ($T_1 > T_2$).

The configuration can increase adhesion strength between the adhesive layer 42 and the light-diffusion portions 40 in the liquid crystal display device 1A as in the liquid crystal display device 1 described above. Therefore, in the liquid crystal display device 1A, the adhesion strength of the light-diffusion member 7A to the liquid crystal display medium 6 is enhanced when the light-diffusion member 7A is attached to the liquid crystal display medium 6 via the adhesive sheet 49. This enhanced adhesion strength allows for further improvement in display quality and reliability.

The distance $T_1$ is, as in the case of the liquid crystal display device 1, determined assuming that the distance $T_1$ is equal to a vertical distance from the face of the substrate 39 on which the light-blocking layer 41 is formed to the corner 40d of the light-diffusion portion 40. Meanwhile, the distance $T_2$ is, as in the case of the liquid crystal display device 1, determined assuming that the distance $T_2$ is equal to a vertical distance from the face of the substrate 39 on which the light-blocking layer 41 is formed to a location where the encroachment portion 49d is in contact with the side face 40c of the light-diffusion portion 40, using as a reference a location where one of the adhesive layers (adhesive layer 49) inside the space 43 (the encroachment portion 49d) is in contact with the side face 40c of the light-diffusion portion 40.

In addition, in the liquid crystal display device 1A, the thickness $D_2$ of the adhesive layer 49c is preferably larger than the thickness $D_1$ of the adhesive layer 49b ($D_2 > D_1$). In general, an adhesive layer loses its adhesion strength when it is decreased in thickness. Therefore, by specifying the thickness $D_2$ of the adhesive layer 49c to be larger than the thickness $D_1$ of the adhesive layer 49b in the adhesive sheet 49, it is ensured that the adhesive sheet 49 has a sufficient adhesion strength to the second polarizing plate 5 (liquid crystal display medium 6). This specification of the thickness $D_2$ of the adhesive layer 49c to be larger than the thickness $D_1$ of the adhesive layer 49b in the present embodiment ($D_2 > D_1$) is a mere example. If a sufficient adhesion strength is guaranteed, the thicknesses $D_1$ and $D_2$ do not need to have any difference. For example, the thicknesses $D_1$ and $D_2$ may be equal ($D_2 = D_1$).

As described in the foregoing, in the liquid crystal display device 1A of the present embodiment, the adhesion strength of the light-diffusion member 7A to the liquid crystal display medium 6 is enhanced when the light-diffusion member 7A is attached to the liquid crystal display medium 6 via the adhesive sheet 49. This enhanced adhesion strength allows for further improvement in display quality and reliability as in the case of the liquid crystal display device 1.

Additionally, in the liquid crystal display device 1A of the present embodiment, the corners 40d of the light-diffusion portions 40 are covered by the adhesive layer 49b. The light diffusion capability is hence lowered at the corners 40d. The lowered light diffusion capability can suppress unnecessary scattering of light by the corners 40d, thereby preventing degradation of display characteristics.

Also in the liquid crystal display device 1A of the present embodiment, the thickness $D_1$ of the adhesive layer 49b is smaller than a height T of the space 43 formed between the light-diffusion portions 40 and the light-blocking layer 41 from the light-blocking layer 41 to the light-incident end face 40b ($T > D_1$). This configuration restrains the light diffusion capability of the light-diffusion member 7A from deteriorating when the light-diffusion member 7A is attached to the liquid crystal display medium 6.

Variation Examples of Liquid Crystal Display Device

Next, variation examples of the liquid crystal display devices 1 and 1A will be described.

First to fourth variation examples described below are applicable to both the liquid crystal display devices 1 and 1A. The liquid crystal display devices 1 and 1A, if any of the variation examples is applied thereto, can achieve similar function and effect. Therefore, the present embodiment will be described by focusing on the variation examples being applied to the liquid crystal display device 1 as an example. Elements that are the same as those of the liquid crystal display device 1 described above will be given no description in the following and denoted in drawings by the same reference numerals as those of the liquid crystal display device 1.

First Variation Example

First, a liquid crystal display device 1B shown in FIG. 17 will be described as a first variation example.

Figure 17:
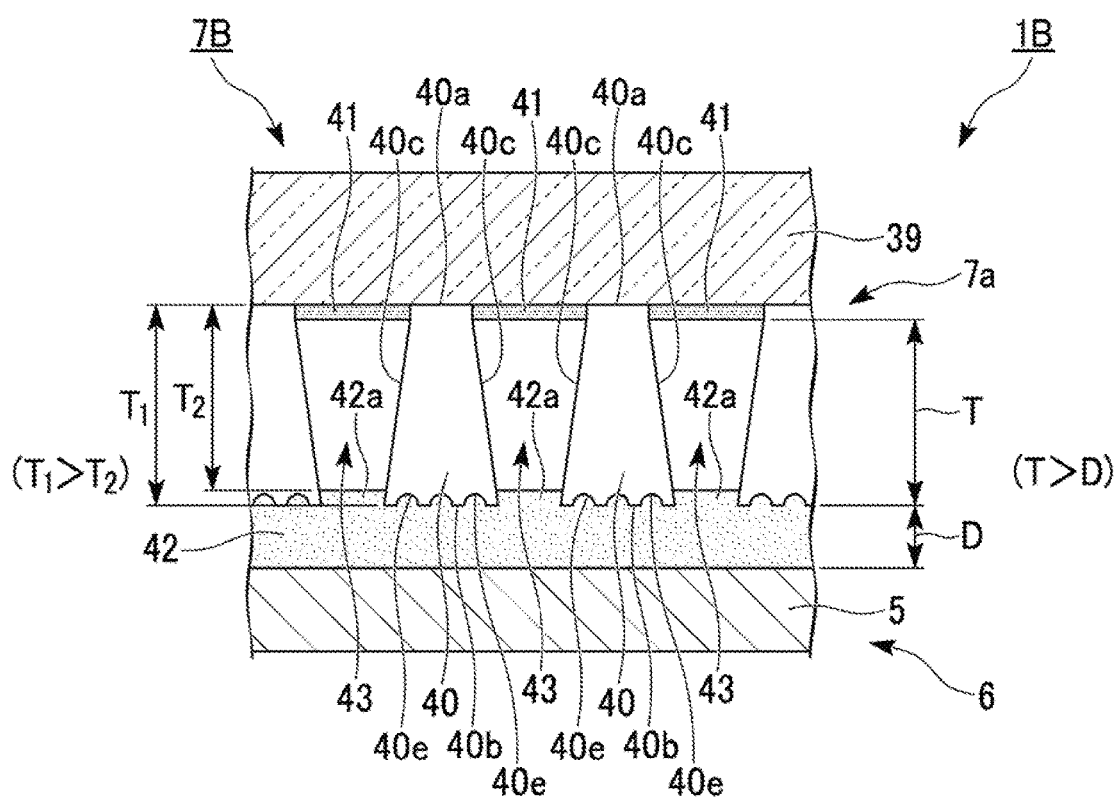
FIG. 17 is a cross-sectional view of a liquid crystal display device in accordance with a first variation example of the present invention.

FIG. 17 is a cross-sectional view of the liquid crystal display device 1B as the first variation example.

The liquid crystal display device 1B includes a light-diffusion member 7B shown in FIG. 17 in place of the light-diffusion member 7. The light-diffusion member 7B has a plurality of concave portions or convex portions (concave portions in this example) 40e on the light-incident end faces 40b of the light-diffusion portions 40.

In this configuration, the concave portions 40e (or convex portions), provided on the light-incident end faces 40b, increase the area of adhesion of the adhesive layer 42 to the light-diffusion portions 40. As a result, the light-diffusion member 7B exhibits increased adhesion strength between the adhesive layer 42 and the light-diffusion portions 40.

Now, steps of manufacturing the light-diffusion member 7B will be described in reference to FIGS. 18A to 18D, which are cross-sectional views sequentially illustrating the steps of manufacturing the light-diffusion member 7B.

Figure 18A:
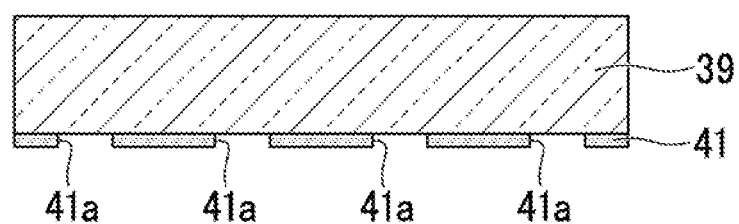
FIG. 18A is a first cross-sectional view illustrating one of sequential steps of manufacturing a light-diffusion member in the liquid crystal display device shown in FIG. 17.

The steps of manufacturing the light-diffusion member 7B start off with steps S1 to S3 (see FIGS. 8A and 8B) described above in reference to FIG. 7 by which the light-blocking layer 41 is formed that has a plurality of openings 41a on a face of the substrate 39 as shown in FIG. 18A.

Figure 18B:
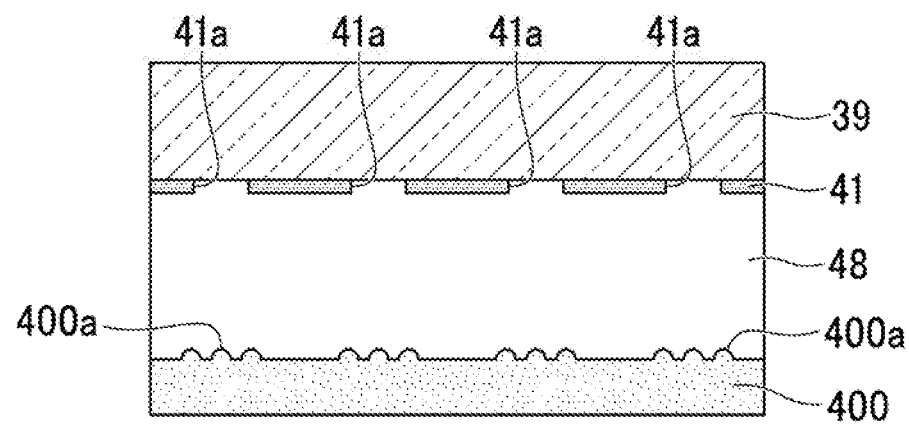
FIG. 18B is a second cross-sectional view illustrating one of sequential steps of manufacturing the light-diffusion member in the liquid crystal display device shown in FIG. 17.

Next, step S4 (see FIG. 8C) described above in reference to FIG. 7 is implemented by which a transparent negative resist is applied onto the light-blocking layer 41 as shown in FIG. 18B to form the coating film 48, which will become the light-diffusion portions 40, and thereafter a die member 400 having formed thereon a plurality of convex portions 400a is pressed to the surface of the coating film 48. The coating film 48 in this condition is subjected to prebaking. Alternatively, a multilayer film (not shown) may be laminated onto the light-blocking layer 41, the multilayer film including: a separable film on which a plurality of convex portions are formed; and a dry film resist (corresponding to the coating film 48) provided on a surface of the separable film.

Figure 18C:
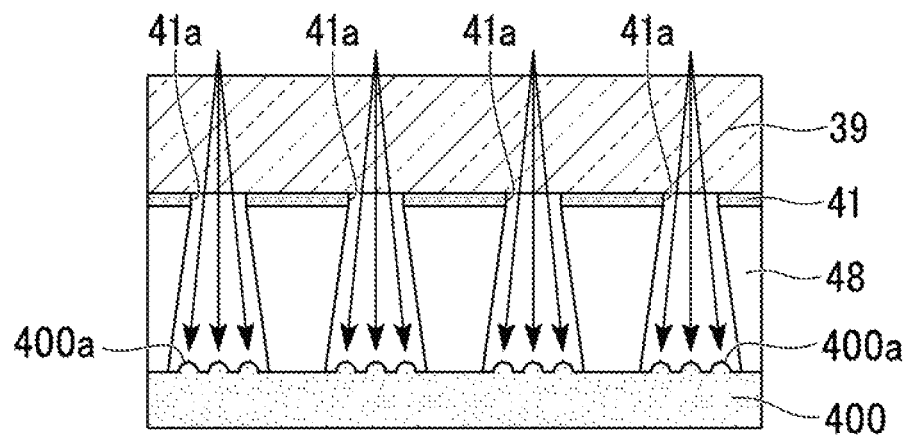
FIG. 18C is a third cross-sectional view illustrating one of sequential steps of manufacturing the light-diffusion member in the liquid crystal display device shown in FIG. 17.
Figure 18D:
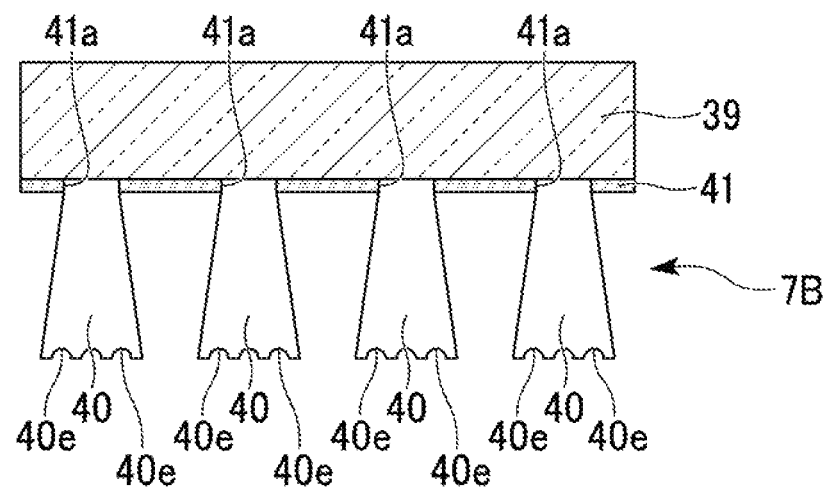
FIG. 18D is a fourth cross-sectional view illustrating one of sequential steps of manufacturing the light-diffusion member in the liquid crystal display device shown in FIG. 17.

Next, steps S5 and S6 (see FIGS. 8D and 8E) described above in reference to FIG. 7 are implemented by which the coating film 48 (or dry film resist) is exposed from the backside thereof and then developed, and the die member 400 (or separable film) is removed as shown in FIG. 18C. The light-diffusion member 7B, carrying the concave portions 40e on a face of the light-incident end face 40b as shown in FIG. 18D, can be manufactured by these steps.

Apart from the above-described method, the light-diffusion member 7B may alternatively be manufactured by the following method as an example. A substrate having a plurality of convex portions formed on a surface thereof is laminated with a dry film resist. The substrate with a dry film resist thereon is then wound with a strong force to press the convex portions against a surface of the dry film resist via a protection film of the dry film resist. A plurality of concave portions is hence formed on the surface of the dry film resist. Another alternative method of manufacturing the light-diffusion member 7B is, for example, to apply a liquid resist to a substrate having a plurality of convex portions formed on a surface thereof, dry unnecessary solvent to remove the unnecessary solvent, and thereafter wind the substrate with a strong force to press the plurality of convex portions against a surface of the resist, thereby forming a plurality of concave portions on the surface of the resist.

If the first variation example is applied to the liquid crystal display devices 1 and 1A, the light-incident end faces 40b of the light-diffusion portions 40 do not form a plane (level face) that is parallel to the face of the substrate 39 on which the light-blocking layer 41 is formed. Therefore, the distance $T_1$ is determined assuming that the distance $T_1$ is equal to a vertical distance from the face of the substrate 39 on which the light-blocking layer 41 is formed to the corner 40d of the light-diffusion portion 40. Meanwhile, the distance $T_2$ is determined assuming that the distance $T_2$ is equal to a vertical distance from the face of the substrate 39 on which the light-blocking layer 41 is formed to a location where the encroachment portion 42a or 49d is in contact with the side face 40c of the light-diffusion portion 40, using as a reference a location where the adhesive layer 42 or one of the adhesive layers (adhesive layer 49) inside the space 43 (the encroachment portion 42a or 49d) is in contact with the side face 40c of the light-diffusion portion 40.

Second Variation Example

Next, a liquid crystal display device 1C shown in FIG. 19 will be described as a second variation example.

Figure 19:
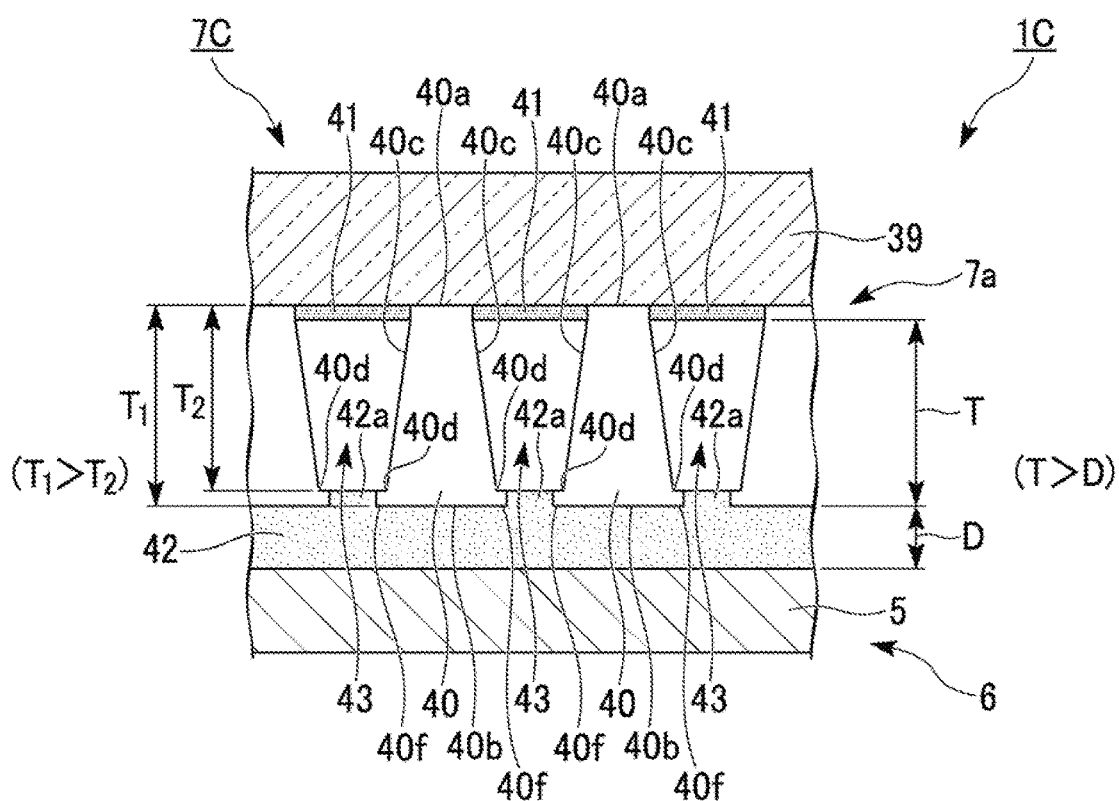
FIG. 19 is a cross-sectional view of a liquid crystal display device in accordance with a second variation example of the present invention.

FIG. 19 is a cross-sectional view of the liquid crystal display device 1C as the second variation example.

The liquid crystal display device 1C includes a light-diffusion member 7C shown in FIG. 19 in place of the light-diffusion member 7. The light-diffusion member 7C has a flange portion 40f jutting radially outward from the corner 40d of the light-diffusion portion 40.

In this configuration, the flange portion 40f, provided on the corner 40d of the light-diffusion portion 40, increases the area of adhesion of the adhesive layer 42 to the light-diffusion portion 40 and anchors the encroachment portion 42a of the adhesive layer 42 that encroaches into the space 43. That can in turn increase adhesion strength between the adhesive layer 42 and the light-diffusion portions 40 in the light-diffusion member 7C.

If the second variation example is applied to the liquid crystal display devices 1 and 1A, the flange portion 40f is formed contiguous with the light-incident end face 40b of the light-diffusion portion 40. Therefore, the distance $T_1$ is determined assuming that the distance $T_1$ is equal to a vertical distance from the face of the substrate 39 on which the light-blocking layer 41 is formed to the tip of the flange portion 40f of the light-diffusion portion 40. Meanwhile, the distance $T_2$ is determined assuming that the distance $T_2$ is equal to a vertical distance from the face of the substrate 39 on which the light-blocking layer 41 is formed to a location where the encroachment portion 40 or 49d is in contact with the side face 40c (encompassing the flange portion 40f) of the light-diffusion portion 40, using as a reference a location where the adhesive layer 42 or one of the adhesive layers (adhesive layer 49) inside the space 43 (the encroachment portion 42a or 49d) is in contact with the side face 40c (encompassing the flange portion 40f) of the light-diffusion portion 40.

Third Variation Example

Next, a liquid crystal display device 1D shown in FIG. 20 will be described as a third variation example.

Figure 20:
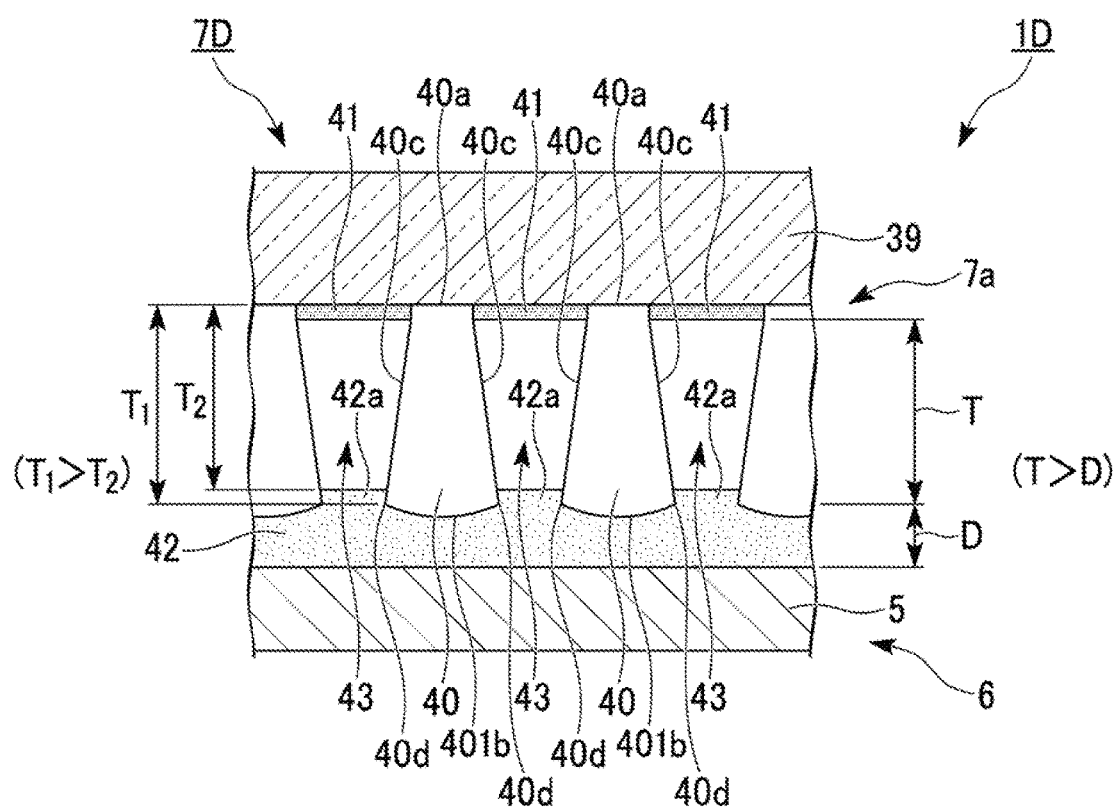
FIG. 20 is a cross-sectional view of a liquid crystal display device in accordance with a third variation example of the present invention.

FIG. 20 is a cross-sectional view of the liquid crystal display device 1D as the third variation example.

The liquid crystal display device 1D includes a light-diffusion member 7D shown in FIG. 20 in place of the light-diffusion member 7. Each light-diffusion portion 40 in the light-diffusion member 7D has a convexly curved light-incident end face 40b (hereinafter, a "light-incident end face 401b").

In this configuration, the convexly curved light-incident end face 401b of the light-diffusion portion 40 increases the area of adhesion of the adhesive layer 42 to the light-diffusion portion 40. That can in turn increase adhesion strength between the adhesive layer 42 and the light-diffusion portions 40 in the light-diffusion member 7D.

Furthermore, the configuration places the light-incident faces 401b of the light-diffusion portions 40 deeper into the adhesive layer 42 while suppressing the amount of the adhesive layer 42 that encroaches into the spaces 43 between the light-diffusion portions 40 (the thickness of the encroachment portions 42a). In the light-diffusion member 7D, that can in turn increase adhesion strength between the adhesive layer 42 and the light-diffusion portions 40 while restraining the light diffusion capability of the light-diffusion portions 40 from deteriorating.

If the third variation example is applied to the liquid crystal display devices 1 and 1A, the light-incident end faces 401b of the light-diffusion portions 40 do not form a plane (level face) that is parallel to the face of the substrate 39 on which the light-blocking layer 41 is formed. Therefore, the distance $T_1$ is determined assuming that the distance $T_1$ is equal to a vertical distance from the face of the substrate 39 on which the light-blocking layer 41 is formed to the corner 40d of the light-diffusion portion 40. Meanwhile, the distance $T_2$ is determined assuming that the distance $T_2$ is equal to a vertical distance from the face of the substrate 39 on which the light-blocking layer 41 is formed to a location where the encroachment portion 42a or 49d is in contact with the side face 40c of the light-diffusion portion 40, using as a reference a location where the adhesive layer 42 or one of the adhesive layers (adhesive layer 49) inside the space 43 (the encroachment portion 42a or 49d) is in contact with the side face 40c of the light-diffusion portion 40.

Fourth Variation Example

Next, a liquid crystal display device 1E shown in FIG. 21 will be described as a fourth variation example.

Figure 21:
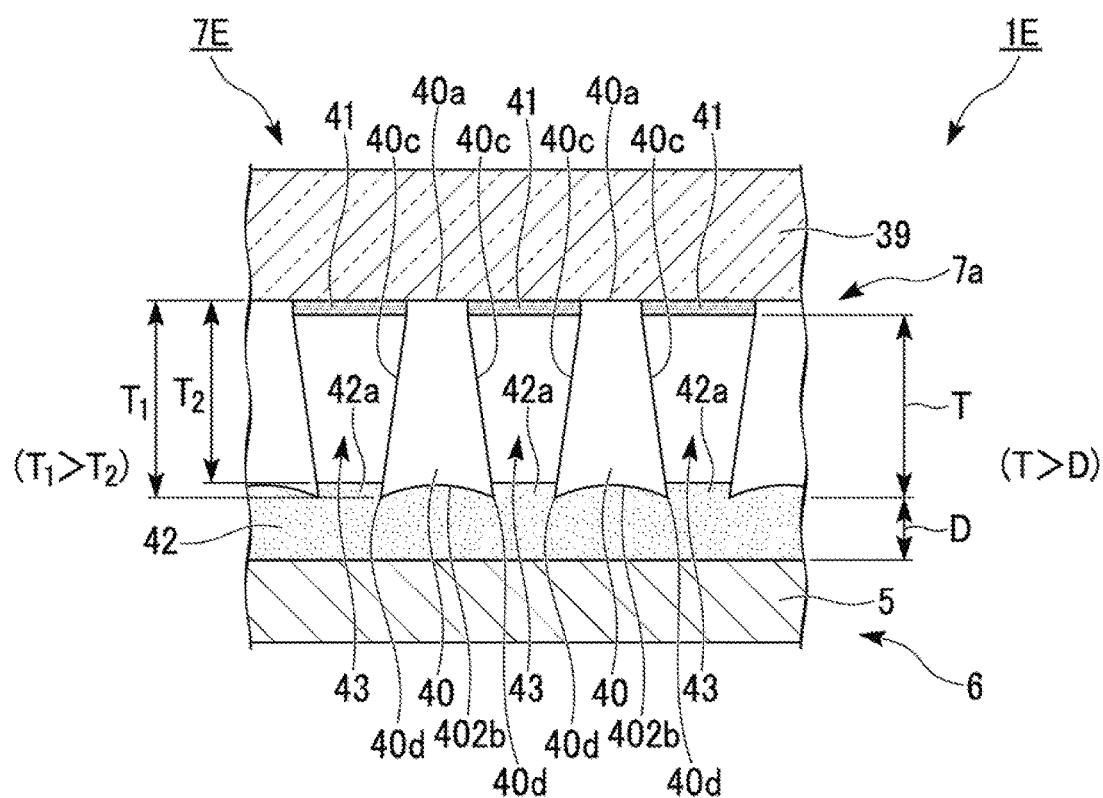
FIG. 21 is a cross-sectional view of a liquid crystal display device in accordance with a fourth variation example of the present invention.

FIG. 21 is a cross-sectional view of the liquid crystal display device 1E as the fourth variation example.

The liquid crystal display device 1E includes a light-diffusion member 7E shown in FIG. 21 in place of the light-diffusion member 7. Each light-diffusion portion 40 in the light-diffusion member 7E has a concavely curved light-incident end face 40b (hereinafter, a "light-incident end face 402b").

In this configuration, the concavely curved light-incident end face 402b of the light-diffusion portion 40 increases the area of adhesion of the adhesive layer 42 to the light-diffusion portion 40. That can in turn increase adhesion strength between the adhesive layer 42 and the light-diffusion portions 40 in the light-diffusion member 7E.

The configuration places the corners 40d of the light-diffusion portions 40 into the light-diffusion portions 40. However, since the light diffusion capability decreases at the corners 40d, the configuration suppresses unnecessary scattering of light at the corners 40d, thereby preventing degradation of display characteristics.

If the fourth variation example is applied to the liquid crystal display devices 1 and 1A, the light-incident end faces 402b of the light-diffusion portions 40 do not form a plane (level face) that is parallel to the face of the substrate 39 on which the light-blocking layer 41 is formed. Therefore, the distance $T_1$ is determined assuming that the distance $T_1$ is equal to a vertical distance from the face of the substrate 39 on which the light-blocking layer 41 is formed to the corner 40d of the light-diffusion portion 40. Meanwhile, the distance $T_2$ is determined assuming that the distance $T_2$ is equal to a vertical distance from the face of the substrate 39 on which the light-blocking layer 41 is formed to a location where the encroachment portion 42a or 49d is in contact with the side face 40c of the light-diffusion portion 40, using as a reference a location where the adhesive layer 42 or one of the adhesive layers (adhesive layer 49) inside the space 43 (the encroachment portion 42a or 49d) is in contact with the side face 40c of the light-diffusion portion 40.

Other Configuration Examples of Light-Diffusion Member

Next will be described other configuration examples of the light-diffusion members 7 and 7A to 7E in the liquid crystal display devices 1 and 1A to 1E. First to third configuration examples described below are applicable to any of the liquid crystal display devices 1 and 1A to 1F. The liquid crystal display devices 1 and 1A to 1F, if any of the configuration examples is applied thereto, can achieve similar function and effect. Therefore, the present embodiment will be described by focusing on the configuration examples being applied to the liquid crystal display device 1 as an example. Elements that are the same as those of the liquid crystal display device 1 described above will be given no description in the following and denoted in drawings by the same reference numerals as those of the liquid crystal display device 1.

First Configuration Example

First, a light-diffusion member 107 shown in FIGS. 22 and 23 will be described as a first configuration example.

Figure 22:
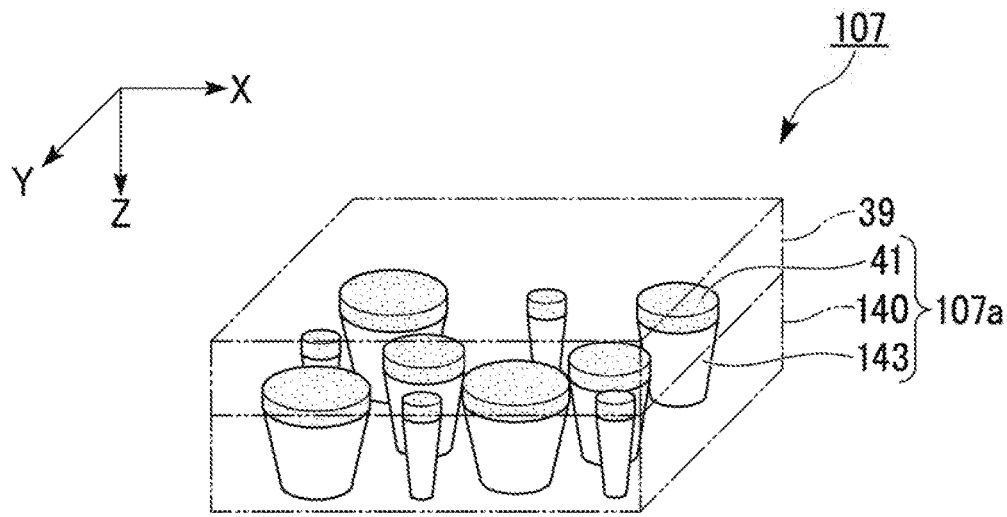
FIG. 22 is a perspective view of a light-diffusion member as a first configuration example.
Figure 23:
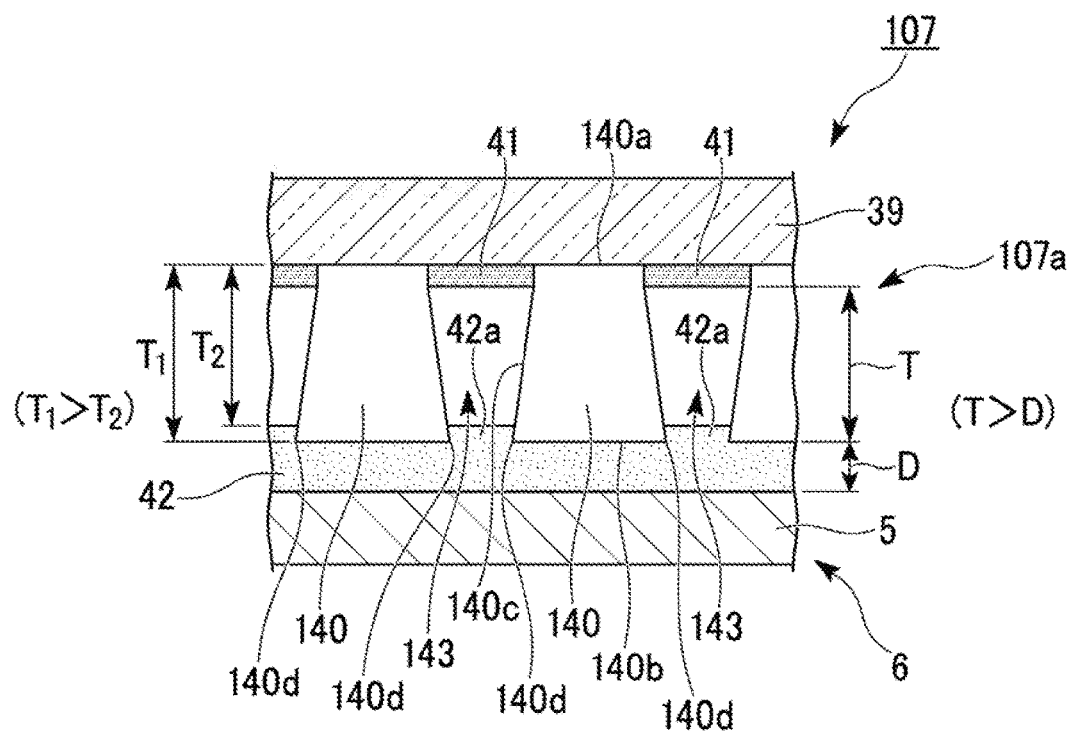
FIG. 23 is a cross-sectional view of the light-diffusion member.

FIG. 22 is a perspective view of a configuration of the light-diffusion member 107. FIG. 23 is a cross-sectional view of the configuration of the light-diffusion member 107.

In the light-diffusion member 107, the light-diffusion portions 40 and the light-blocking layer 41 are transposed in the light-diffusion member 7. Specifically, as shown in FIGS. 22 and 23, the light-diffusion member 107 includes among others a substrate 39 and a light-control layer 107a formed on a face of the substrate 39 (a face opposite from the viewing side). The light-control layer 107a controls the direction of light emitted from the liquid crystal panel 4 by diffusing that light and includes a plurality of light-blocking layers 41, light-diffusion portions 140, and hollow portions 143. The light-blocking layers 41 are formed on a face of the substrate 39. The light-diffusion portions 140 are formed on parts of that face of the substrate 39 to the exclusion of those parts where the light-blocking layers 41 are formed. The hollow portions 143 are formed on parts of that face of the substrate 39 where the light-blocking layers 41 are formed.

The language that the light-diffusion portions 140 are formed on parts of the face to the exclusion of those parts where the light-blocking portions 41 are formed encompasses the light-diffusion portions 140 formed practically on parts of the face to the exclusion of those parts where the light-blocking portions 41 are formed. The language that the light-diffusion portions 140 are formed practically on parts of the face to the exclusion of those parts where the light-blocking portions 41 are formed encompasses the light-diffusion portions 140 formed partially overlapping the light-blocking portions 41. In other words, the latter language encompasses those cases where parts of the light-diffusion portions 140 are formed slightly overlapping the light-blocking layers 41 on the edges of the light-blocking layers 41.

The light-blocking layers 41 are interspersed as viewed normal to a face of the substrate 39. The light-diffusion portions 140 are formed contiguously on that face to the exclusion of those parts of the face where the light-blocking layers 41 are formed. The light-blocking layers 41 are arranged randomly (non-periodically) as viewed normal to a primary face of the substrate 39. The hollow portions 143, formed at positions corresponding to the light-blocking layers 41, are also arranged randomly on the substrate 39.

The distance (pitch) between the light-blocking layers 41 and the size (dimensions) of the light-blocking layers 41 are preferably smaller than the distance between the pixels in the liquid crystal panel 4. In this preferred configuration, each pixel contains at least one of the light-blocking layers 41. Therefore, wide viewing angles can be achieved when this configuration is combined with liquid crystal panels with small pixel pitches used in, for example, mobile devices.

Each hollow portion 143 has a circular horizontal cross-section (xy cross-section). The horizontal cross-section is largest in area on a face facing the substrate 39 and smallest in area on a face opposite from the substrate 39, gradually decreasing in area from the face facing the substrate 39 to the face opposite from the substrate 39. In other words, the hollow portion 143 has a frustum shape with an inclining (tapered) side face as viewed from the face facing the substrate 39.

The inside of the hollow portion 143 is a space containing an air layer. The light-diffusion portion 140 is composed of those portions that do not constitute any part of the hollow portion 143. The light-diffusion portions 140 contribute to light transmission and are formed by a contiguously present transparent resin.

One of the two opposite faces of each light-diffusion portion 140 that is smaller in area (the face in contact with the substrate 39) is a light-emitting end face 140a. The other face, which is larger in area (the face opposite from the substrate 39), is a light-incident end face 140b.

Since there exists the air layer (hollow portions 143) intervening between the adjacent light-diffusion portions 140 in the light-diffusion member 107, if the light-diffusion portions 140 are made of, for example, an acrylic resin, each light-diffusion portion 140 has a side face 140c that is an interface between the acrylic resin and the air layer. According to this configuration, the light entering the light-diffusion portion 140 undergoes total reflection at the interface between the light-diffusion portion 140 and the hollow portion 143, thereby being guided to be confined in the light-diffusion portion 140, and exits through the substrate 39.

Snell's law dictates that in the light-diffusion member 107, the critical angle becomes a minimum and also that the range of angles of incidence at which light undergoes total reflection at the side face 140c of the light-diffusion portion 140 is broad. As a result, the loss of light is reduced, and a high luminance can be obtained.

The substrate 39 and the light-diffusion portions 140 preferably have practically equal refractive indices. If these refractive indices differ significantly, for example, the light entering through the light-incident end face 140b undergoes unnecessary refraction and reflection at the interface of the light-diffusion portion 140 and the substrate 39 when the light is to enter the substrate 39 from the light-diffusion portion 140. That could in turn lead to inconveniences such as a failure to obtain a desired light diffusion angle or a decrease in the amount of exiting light. The specification of the refractive indices to substantially equal values as above can prevent these inconveniences from occurring.

Meanwhile, if the substrate 39 and the adhesive layer 42 have different refractive indices, the refractive index of the light-diffusion portion 140 located in a light path between the substrate 39 and the adhesive layer 42 is specified to a value between the refractive index of the substrate 39 and the refractive index of the adhesive layer 42. This specification can suppress unnecessary reflection at the interface.

Since the light-diffusion member 107 totally reflects light, the light-diffusion portion 140 may be surrounded by a material with a low refractive index. Nitrogen or a like inert gas may fill the hollow portion 143, replacing the air layer therein. Alternatively, the hollow portion 143 may be a vacuum or have reduced pressure lower than atmospheric pressure.

The light-diffusion member 107, configured as above, is disposed on the viewing side of the liquid crystal display medium 6 similarly to the light-diffusion members 7 and 7A to 7E. More specifically, the light-diffusion portions 140 are attached to the second polarizing plate 5 via the adhesive layer 42 or the adhesive sheet 49 with the other face of the substrate 39 facing the viewing side.

The configuration of any of the light-diffusion members 7 and 7A to 7E is applicable to the light-diffusion member 107. By applying the configuration of any of the light-diffusion members 7 and 7A to 7E to the light-diffusion member 107, the light-diffusion member 107 can achieve similar effects. More specifically, in the light-diffusion member 107, the adhesive layer 42 adheres to the light-incident end face 140*b*, and parts of the adhesive layer 42 (encroachment portions 42*a*) encroach into the hollow portions 143 formed between the light-diffusion portions 140 and the light-blocking layer 41. This configuration renders a distance $T_2$ from the face of the substrate 39 facing the liquid crystal display medium 6 to the surface of the adhesive layer 42 inside the hollow portion 143 shorter than a distance $T_1$ from the face of the substrate 39 facing the liquid crystal display medium 6 to the light-incident end face 140*b* ($T_1 > T_2$).

In this configuration, each encroachment portion 42*a* of the adhesive layer 42 that encroaches into the hollow portion 143 is anchored between the inclining (reverse-tapered) side faces 140*c* of the adjacent light-diffusion portions 140. In addition, the encroachment portion 42*a* of the adhesive layer 42 that encroaches into the hollow portion 143 adds to the area of adhesion of the adhesive layer 42 to the light-diffusion portion 140. The configuration can hence increase adhesion strength between the adhesive layer 42 and the light-diffusion portion 140.

Second Configuration Example

Next, a light-diffusion member 207 shown in FIGS. 24 and 25 will be described as a second configuration example.

Figure 24:
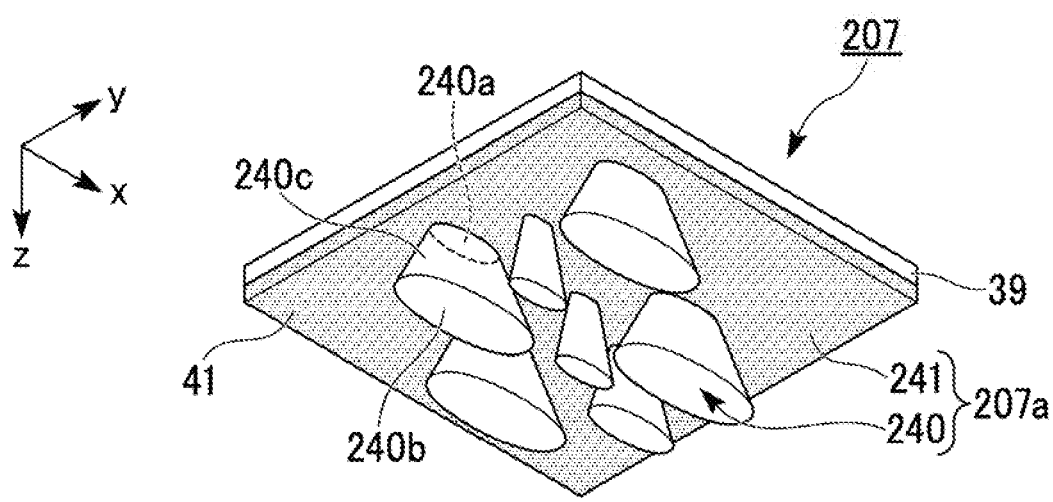
FIG. 24 is a perspective view of a light-diffusion member as a second configuration example.
Figure 25:
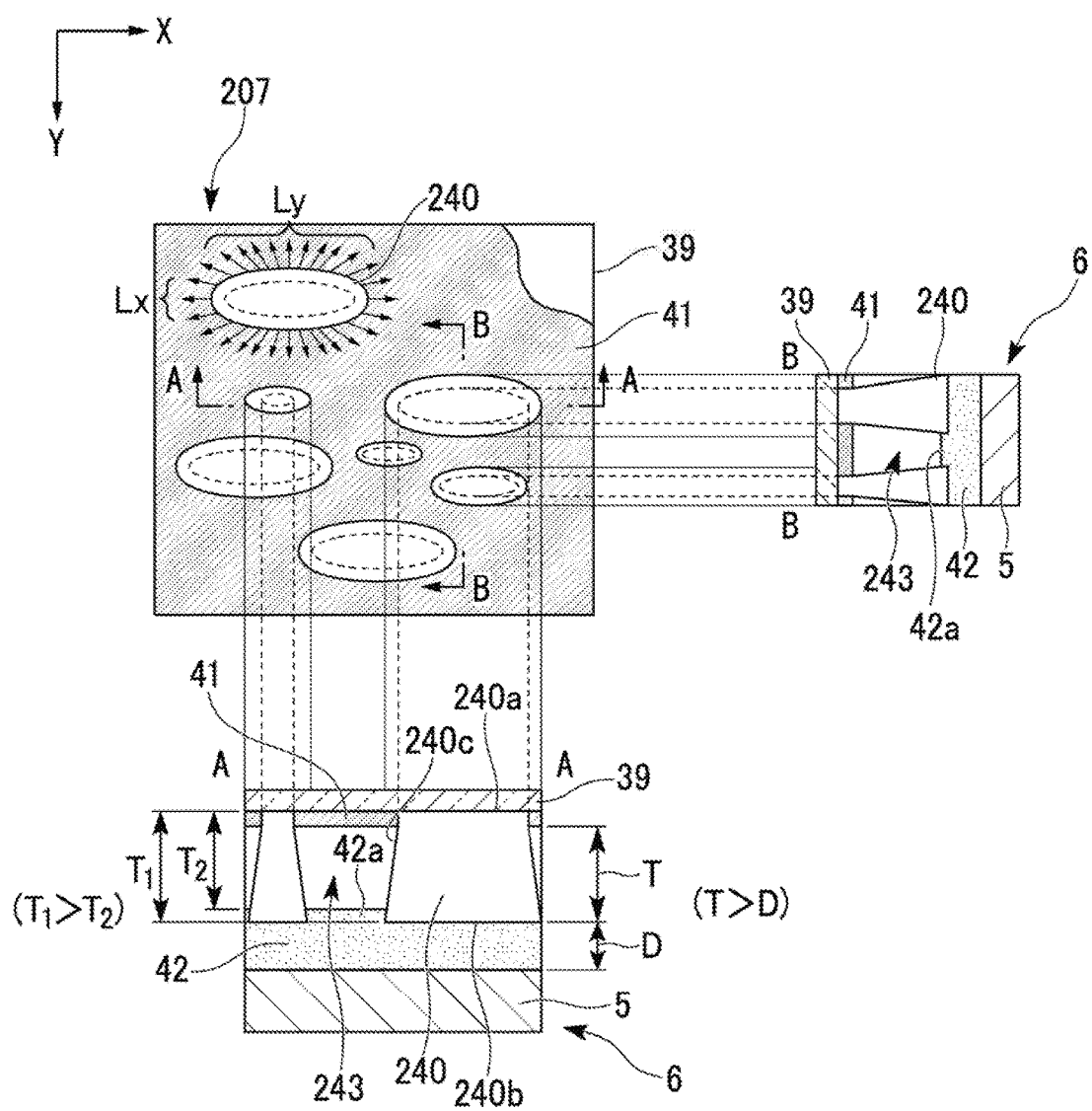
FIG. 25 is a cross-sectional view of the light-diffusion member.

FIG. 24 is a perspective view of a configuration of the light-diffusion member 207. FIG. 25 is a schematic view of the configuration of the light-diffusion member 207. FIG. 25 shows a plan view of the light-diffusion member 207 in the upper left, a cross-sectional view, taken along line A-A, of the light-diffusion member 207 in the lower left, and a cross-sectional view, taken along line B-B, of the light-diffusion member 207 in the upper right.

In the light-diffusion member 207, the shape of the light-diffusion portion 40 in the light-diffusion member 7 described above is changed from the frustum shape with no azimuthal anisotropy to elliptical frustum shape with azimuthal anisotropy. Specifically, as shown in FIGS. 24 and 25, the light-diffusion member 207 includes among others a substrate 39 and a light-control layer 207*a* formed on a face of the substrate 39 (a face opposite from the viewing side). The light-control layer 207*a* controls the direction of light emitted from the liquid crystal panel 4 by diffusing that light and includes: a plurality of light-diffusion portions 240 formed on that face of the substrate 39; and a light-blocking layer 41.

The light-diffusion portions 240 are interspersed on the face of the substrate 39. Each light-diffusion portion 240 has an elongated elliptical shape with a major axis and a minor axis in a plan view as viewed normal to the substrate 39. In the present embodiment, the interspersed light-diffusion portions 240 have different sizes, but have substantially equal minor-axis-length/major-axis-length ratios. The light-diffusion portions 240 do not necessarily have different sizes and may have the same size.

In each light-diffusion portion 240, the horizontal cross-section is smallest in area on a light-emitting end face 240*a* facing the substrate 39 and largest in area on a light-incident end face 240*b* opposite from the substrate 39, gradually growing in area from the face facing the substrate 39 to the face opposite from the substrate 39. Therefore, the light-diffusion portion 240 has an elliptical frustum shape with a side face 240*c* inclining (reverse-tapered) from the face facing the substrate 39 to the face opposite from the substrate 39. The light-blocking layer 41 is formed contiguously on parts of the face of the substrate 39 where no light-diffusion portions 240 are formed. Therefore, there are formed spaces 43 between the light-diffusion portions 240 and the light-blocking layer 41. The spaces 43 include an air layer.

In the light-diffusion member 207, the major axes of the elliptical shapes in plan view of the light-diffusion portions 240 are aligned substantially to the X-direction. In contrast, the minor axes of the elliptical shapes in plan view of the light-diffusion portions 240 are aligned substantially to the Y-direction. Investigating the orientation of the side face 240*c* of the light-diffusion portion 240 based on these alignments, the area of a part of the side face 240*c* of the light-diffusion portion 240 that lies in the X-direction accounts for a greater proportion than does the area of a part of the side face 240*c* that lies in the Y-direction. Therefore, there is more light Ly reflected by the part of the side face 240*c* that lies in the X-direction and diffused in the Y-direction than light Lx reflected by the part of the side face 240*c* that lies in the Y-direction and diffused in the X-direction.

Therefore, the light-diffusion member 207 exhibits such azimuthal anisotropy that light is diffused anisotropically so that more light is diffused in a direction in which the side face 240*c* between the light-emitting end face 240*a* and the light-incident end face 240*b* decreases in area than in a direction in which the side face 240*c* increases in area, In other words, the light-diffusion member 207 has a strong azimuthal anisotropy in the Y-direction. Throughout the following, the direction in which the azimuthal anisotropy is stronger will be referred to as the "azimuthal direction."

The light-diffusion member 207, configured as above, is disposed on the viewing side of the liquid crystal display medium 6 similarly to the light-diffusion members 7 and 7A to 7E. More specifically, the light-diffusion portions 240 are attached to the second polarizing plate 5 via the adhesive layer 42 or the adhesive sheet 49 with the other face of the substrate 39 facing the viewing side.

The configuration of any of the light-diffusion members 7 and 7A to 7E is applicable to the light-diffusion member 207. By applying the configuration of any of the light-diffusion members 7 and 7A to 7E to the light-diffusion member 207, the light-diffusion member 207 can achieve similar effects. More specifically, in the light-diffusion member 207, the adhesive layer 42 adheres to the light-incident end face 240*b*, and parts of the adhesive layer 42 (encroachment portions 42*a*) encroach into the spaces 243 formed between the light-diffusion portions 240 and the light-blocking layer 41. This configuration renders a distance $T_2$ from the face of the substrate 39 facing the liquid crystal display medium 6 to the surface of the adhesive layer 42 inside the space 243 shorter than a distance $T_1$ from the face of the substrate 39 facing the liquid crystal display medium 6 to the light-incident end face 240*b* ($T_1 > T_2$).

In this configuration, each encroachment portion 42*a* of the adhesive layer 42 that encroaches into the space 243 is anchored between the inclining (reverse-tapered) side faces 240*c* of the adjacent light-diffusion portions 240. In addition, the encroachment portion 42*a* of the adhesive layer 42 that encroaches into the space 243 adds to the area of adhesion of the adhesive layer 42 to the light-diffusion portion 240. This configuration can hence increase adhesion strength between the adhesive layer 42 and the light-diffusion portion 240.

Additionally, in the light-diffusion member 207, the light-diffusion portions 240 have azimuthal directions thereof matched with a direction in which the viewing angle properties of the liquid crystal panel 4 need to be improved. Since the viewing angle properties of the liquid crystal panel 4 are to be improved in the Y-direction in the present embodiment, the azimuthal direction of the light-diffusion member 207 is matched with the Y-direction. This configuration causes light to be well diffused in the direction in which the viewing angle properties of the liquid crystal panel 4 are to be improved, thereby displaying bright images with excellent visibility.

In other words, the direction in which the director of liquid crystal molecules points in the thickness-wise middle part of the liquid crystal layer 11 in the liquid crystal display medium 6 when voltage is being applied to the liquid crystal layer 11 is matched with the azimuthal direction in which the light-diffusion member 207 diffuses more light. This configuration allows for preferential improvement of the viewing angle properties in the direction in which the director of the liquid crystal molecules points in the thickness-wise middle part of the liquid crystal layer 11 under voltage application and also in which the display performance of the liquid crystal display medium 6 changes significantly depending on the angle.

The azimuthal direction of the light-diffusion member 207 is by no means limited to the Y-direction described above and may be altered appropriately in accordance with the direction in which the viewing angle properties of the liquid crystal panel 4 need to be improved.

Figure 26:
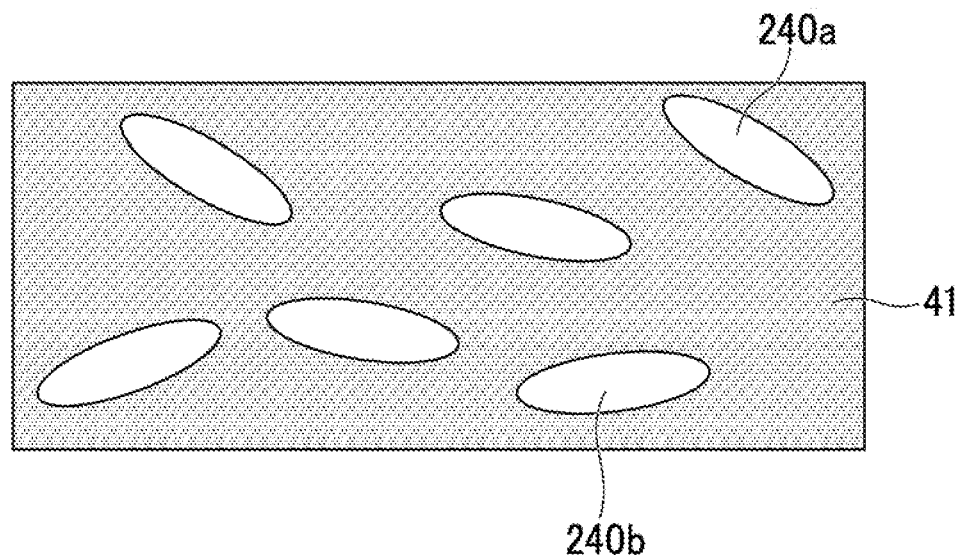
FIG. 26 is a variation example of the light-diffusion member.

The light-diffusion member 207 is by no means limited to the above-described configuration in which the light-diffusion portions 240 have azimuthal directions thereof all aligned to a single direction. For example, as shown in FIG. 26, the light-diffusion member 207 may include light-diffusion portions 240*a* and 240*b* that have different azimuthal directions in azimuthal anisotropy. In this configuration, the different azimuthal directions in azimuthal anisotropy allow for improvement of the viewing angle properties of the liquid crystal panel 4 in more than one direction.

Figure 27:
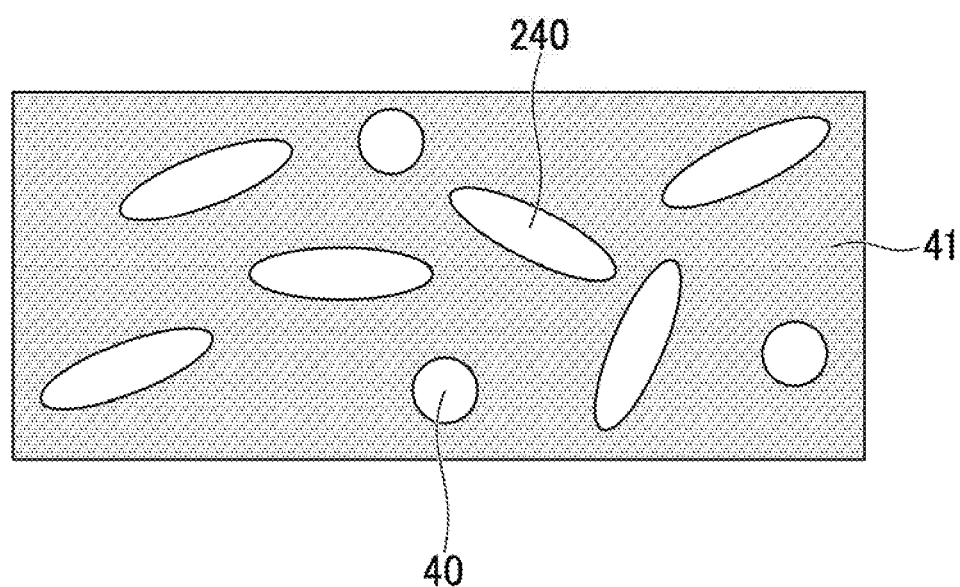
FIG. 27 is a plan view of another exemplary configuration of the light-diffusion member.

The liquid crystal display device 1 is by no means limited to the above-described configuration that includes the light-diffusion member 7 or 207. For example, as shown in FIG. 27, the liquid crystal display device 1 may alternatively include a light-diffusion member that has both the circular light-diffusion portions 40 and the elliptical light-diffusion portions 240. Furthermore, the light-diffusion portions 40 and 240 are not necessarily circular or elliptical and may have a symmetrical or asymmetrical polygonal shape.

Third Configuration Example

Next, a light-diffusion member 307 shown in FIGS. 28 and 29 will be described as a third configuration example.

Figure 28:
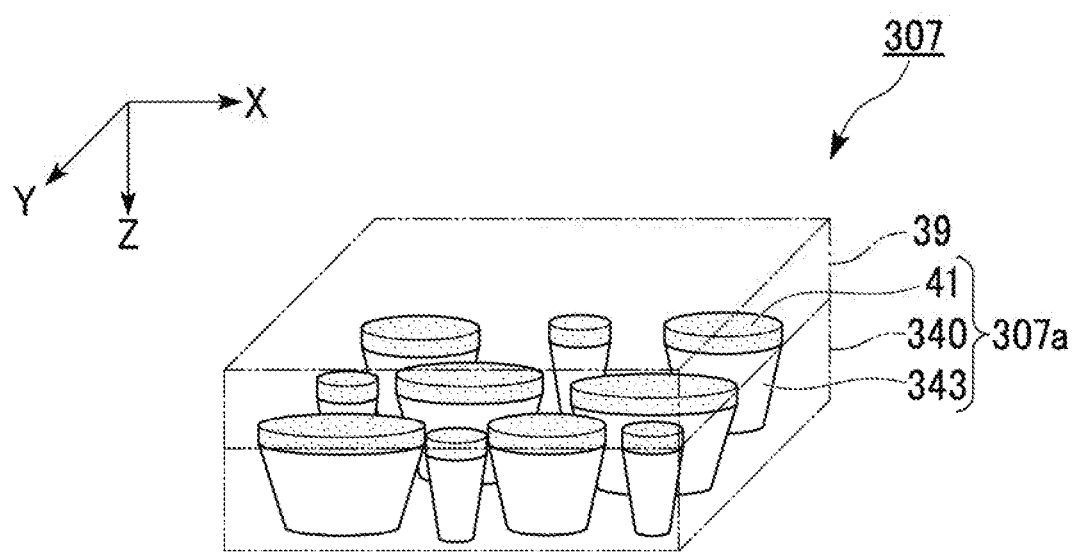
FIG. 28 is a perspective view of a light-diffusion member as a third configuration example.
Figure 29:
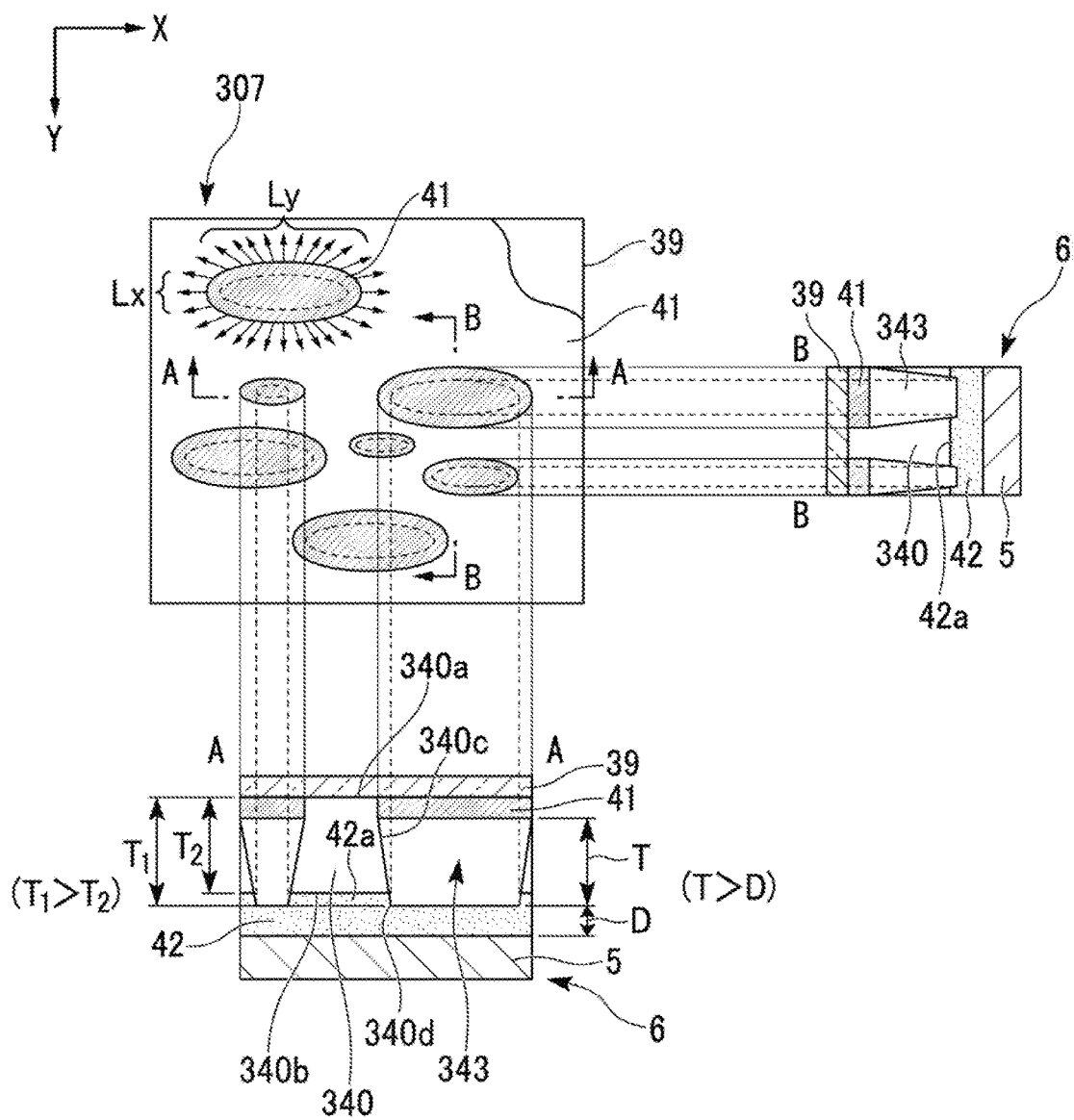
FIG. 29 is a cross-sectional view of the light-diffusion member.

FIG. 28 is a perspective view of a configuration of the light-diffusion member 307. FIG. 29 is a schematic view of the configuration of the light-diffusion member 307. FIG. 29 shows a plan view of the light-diffusion member 307 in the upper left, a cross-sectional view, taken along line A-A, of the light-diffusion member 307 in the lower left, and a cross-sectional view, taken along line B-B, of the light-diffusion member 307 in the upper right.

In the light-diffusion member 307, the light-diffusion portions 240 and the light-blocking layer 41 are transposed in the light-diffusion member 207. Specifically, as shown in FIGS. 28 and 29, the light-diffusion member 307 includes among others a substrate 39 and a light-control layer 307*a* formed on a face of the substrate 39 (a face opposite from the viewing side). The light-control layer 307*a* controls the direction of light emitted from the liquid crystal panel 4 by diffusing that light and includes a plurality of light-blocking layers 41, light-diffusion portions 340, and hollow portions 343. The light-blocking layers 41 are formed on a face of the substrate 39. The light-diffusion portions 340 are formed on parts of that face of the substrate 39 to the exclusion of those parts where the light-blocking layers 41 are formed. The hollow portions 343 are formed on parts of that face of the substrate 39 where the light-blocking layers 41 are formed.

The light-blocking layers 41 are interspersed as viewed normal to a face of the substrate 39. The light-diffusion portions 140 are formed contiguously on that face to the exclusion of those parts of the face where the light-blocking layers 41 are formed. The light-blocking layers 41 are arranged randomly (non-periodically) as viewed normal to a primary face of the substrate 39. The hollow portions 343, formed at positions corresponding to the light-blocking layers 41, are also arranged randomly on the substrate 39.

The distance (pitch) between the light-blocking layers 41 and the size (dimensions) of the light-blocking layers 41 are preferably smaller than the distance between the pixels in the liquid crystal panel 4. In this preferred configuration, each pixel contains at least one of the light-blocking layers 41. Therefore, wide viewing angles can be achieved when this configuration is combined with liquid crystal panels with small pixel pitches used in, for example, mobile devices.

Each hollow portion 343 has an elliptical horizontal cross-section (xy cross-section). The horizontal cross-section is largest in area on a face facing the substrate 39 and smallest in area on a face opposite from the substrate 39, gradually decreasing in area from the face facing the substrate 39 to the face opposite from the substrate 39. In other words, the hollow portion 343 has an elliptical frustum shape with an inclining (tapered) side face as viewed from the face facing the substrate 39. In the present embodiment, the interspersed hollow portions 343 have different sizes, but have substantially equal minor-axis-length/major-axis-length ratios. The hollow portions 343 do not necessarily have different sizes and may have the same size.

The inside of the hollow portion 343 is a space containing an air layer. The light-diffusion portion 340 is composed of those portions that do not constitute any part of the hollow portions 343. The light-diffusion portions 340 contribute to light transmission and are formed by a contiguously present transparent resin.

One of the two opposite faces of each light-diffusion portion 340 that is smaller in area (the face in contact with the substrate 39) is a light-emitting end face 340*a*. The other face, which is larger in area (the face opposite from the substrate 39), is a light-incident end face 340*b*.

Since there exists the air layer (hollow portions 343) intervening between the adjacent light-diffusion portions 340 in the light-diffusion member 307, if the light-diffusion portions 340 are made of, for example, an acrylic resin, each light-diffusion portion 340 has a side face 340*c* that is an interface between the acrylic resin and the air layer. According to this configuration, the light entering the light-diffusion portion 340 undergoes total reflection at the interface between the light-diffusion portion 340 and the hollow portion 343, thereby being guided to be confined in the light-diffusion portion 340, and exits through the substrate 39.

Snell's law dictates that in the light-diffusion member 307, the critical angle becomes a minimum and that the range of angles of incidence at which light undergoes total reflection at the side face 140*c* of the light-diffusion portion 340 is broad. As a result, the loss of light is reduced, and a high luminance can be obtained.

The substrate 39 and the light-diffusion portions 340 preferably have practically equal refractive indices. If these refractive indices differ significantly, for example, the light entering through the light-incident end face 340b undergoes unnecessary refraction and reflection at the interface of the light-diffusion portion 340 and the substrate 39 when the light is to enter the substrate 39 from the light-diffusion portion 340. That could in turn lead to inconveniences such as a failure to obtain a desired light diffusion angle or a decrease in the amount of exiting light. The specification of the refractive indices to substantially equal values as above can prevent these inconveniences from occurring.

Meanwhile, if the substrate 39 and the adhesive layer 42 have different refractive indices, the refractive index of the light-diffusion portion 340 located in a light path between the substrate 39 and the adhesive layer 42 is specified to a value between the refractive index of the substrate 39 and the refractive index of the adhesive layer 42. This specification can suppress unnecessary reflection at the interface.

Since the light-diffusion member 307 totally reflects light, the light-diffusion portion 340 may be surrounded by a material with a low refractive index. Nitrogen or a like inert gas may fill the hollow portion 343, replacing the air layer therein. Alternatively, the hollow portion 343 may be a vacuum or have reduced pressure lower than atmospheric pressure.

In the light-diffusion member 307, the major axes of the elliptical shapes in plan view of the hollow portions 343 are aligned substantially to the X-direction. In contrast, the minor axes of the elliptical shapes in plan view of the hollow portions 343 are aligned substantially to the Y-direction. Investigating the orientation of the side face 340c of the light-diffusion portion 340 based on these alignments, a part of the side face 340c of the light-diffusion portion 340 that lies in the X-direction accounts for a greater proportion than does a part of the side face 340c that lies in the Y-direction. Therefore, there is more light Ly reflected by the part of the side face 340c that lies in the X-direction and diffused in the Y-direction than light Lx reflected by the part of the side face 340c that lies in the Y-direction and diffused in the X-direction.

Therefore, the light-diffusion member 307 exhibits such azimuthal anisotropy that light is diffused anisotropically so that more light is diffused in a direction in which the side face 340c between the light-emitting end face 340a and the light-incident end face 340b decreases in area than in a direction in which the side face 340c increases in area. In other words, the light-diffusion member 307 has a strong azimuthal anisotropy in the Y-direction.

The light-diffusion member 307, configured as above, is disposed on the viewing side of the liquid crystal display medium 6 similarly to the light-diffusion members 7 and 7A to 7E. More specifically, the light-diffusion portions 340 are attached to the second polarizing plate 5 via the adhesive layer 42 or the adhesive sheet 49 with the other face of the substrate 39 facing the viewing side.

The configuration of any of the light-diffusion members 7 and 7A to 7E is applicable to the light-diffusion member 307. By applying the configuration of any of the light-diffusion members 7 and 7A to 7E to the light-diffusion member 307, the light-diffusion member 307 can achieve similar effects. More specifically, in the light-diffusion member 307, the adhesive layer 42 adheres to the light-incident end face 340b, and parts of the adhesive layer 42 (encroachment portions 42a) encroach into the hollow portions 343 formed between the light-diffusion portions 340 and the light-blocking layer 41. This configuration renders a distance $T_2$ from the face of the substrate 39 facing the liquid crystal display medium 6 to the surface of the adhesive layer 42 inside the hollow portion 343 shorter than a distance $T_1$ from the face of the substrate 39 facing the liquid crystal display medium 6 to the light-incident end face 340b ($T_1 > T_2$).

In this configuration, each encroachment portion 42a of the adhesive layer 42 that encroaches into the hollow portion 343 is anchored between the inclining (reverse-tapered) side faces 340c of the adjacent light-diffusion portions 340. In addition, the encroachment portion 42a of the adhesive layer 42 that encroaches into the hollow portion 343 adds to the area of adhesion of the adhesive layer 42 to the light-diffusion portion 340. This configuration can hence increase adhesion strength between the adhesive layer 42 and the light-diffusion portion 340.

Additionally, in the light-diffusion member 307, the light-diffusion portions 340 have azimuthal directions thereof matched with a direction in which the viewing angle properties of the liquid crystal panel 4 need to be improved. Since the viewing angle properties of the liquid crystal panel 4 are to be improved in the Y-direction in the present embodiment, the azimuthal direction of the light-diffusion member 307 is matched with the Y-direction. This configuration causes light to be well diffused in the direction in which the viewing angle properties of the liquid crystal panel 4 are to be improved, thereby displaying bright images with excellent visibility.

In other words, the direction in which the director of liquid crystal molecules points in the thickness-wise middle pan of the liquid crystal layer 11 in the liquid crystal display medium 6 when voltage is being applied to the liquid crystal layer 11 is matched with the azimuthal direction in which the light-diffusion member 307 diffuses more light. This configuration allows for preferential improvement of the viewing angle properties in the direction in which the director of the liquid crystal molecules points in the thickness-wise middle part of the liquid crystal layer 11 under voltage application and also in which the display performance of the liquid crystal display medium 6 changes significantly depending on the angle.

The azimuthal direction of the light-diffusion member 307 is by no means limited to the Y-direction described above and may be altered appropriately in accordance with the direction in which the viewing angle properties of the liquid crystal panel 4 need to be improved.

Figure 30:
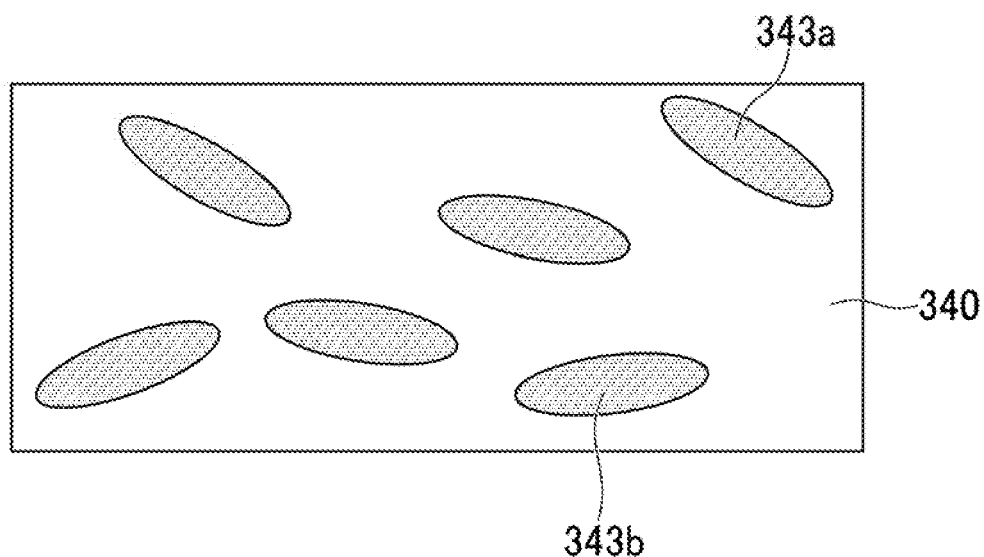
FIG. 30 is a variation example of the light-diffusion member.

The light-diffusion member 307 is by no means limited to the above-described configuration in which the hollow portions 343 have azimuthal directions thereof all aligned to a single direction. For example, as shown in FIG. 30, the light-diffusion member 307 may include hollow portions 343a and 343b that have different azimuthal directions in azimuthal anisotropy. In this configuration, the different azimuthal directions in azimuthal anisotropy allow for improvement of the viewing angle properties of the liquid crystal panel 4 in more than one direction.

Figure 31:
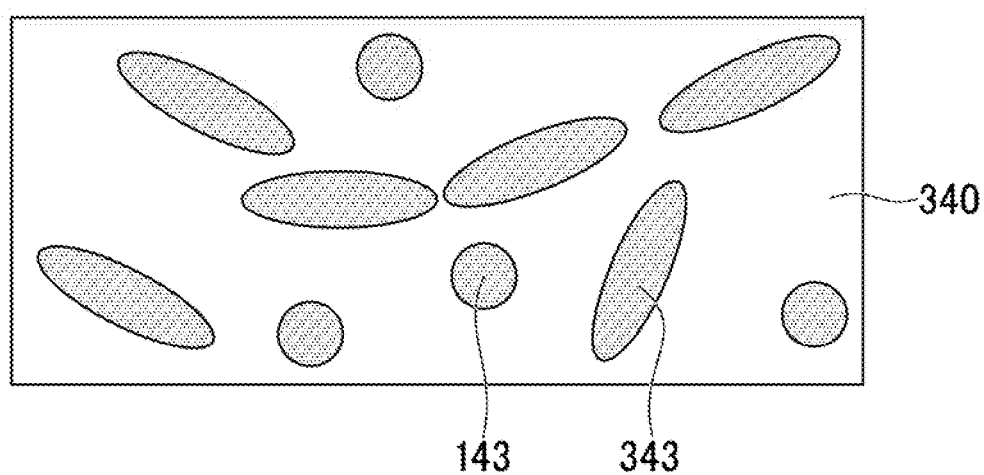
FIG. 31 is a plan view of another exemplary configuration of the light-diffusion member.

The liquid crystal display device 1 is by no means limited to the above-described configuration that includes the light-diffusion member 107 or 307. For example, as shown in FIG. 31, the liquid crystal display device 1 may alternatively include a light-diffusion member that has both the circular hollow portions 143 and the elliptical hollow portions 340. Furthermore, the hollow portions 143 and 343 are not necessarily circular or elliptical and may have a symmetrical or asymmetrical polygonal shape.

Adhesive-Layer-Including Light-Diffusion Member

Figure 32:
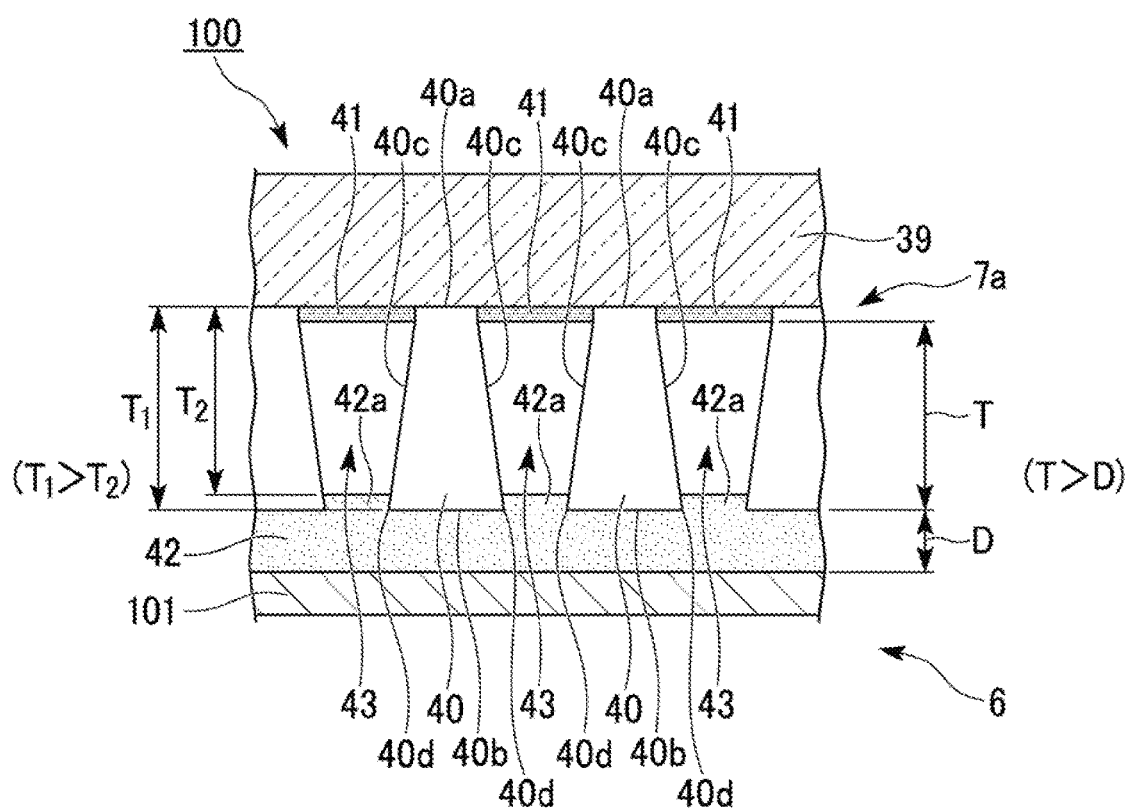
FIG. 32 is a cross-sectional view of an adhesive-layer-including light-diffusion member in accordance with an embodiment of the present invention.

Next, an adhesive-layer-including light-diffusion member 100 shown in FIG. 32 will be described as an embodiment of the present invention. FIG. 32 is a cross-sectional view of a configuration of the adhesive-layer-including light-diffusion member 100.

The adhesive-layer-including light-diffusion member 100 includes: the adhesive layer 42 or the adhesive sheet 49; and the light-diffusion member 7, 7A to 7E, 107, 207, or 307 that is yet to be attached to the liquid crystal display medium 6 via the adhesive layer 42 or the adhesive sheet 49. In the present embodiment, FIG. 32 shows as an example the light-diffusion member 7 that is yet to be attached to the liquid crystal display medium 6 via the adhesive layer 42.

The adhesive-layer-including light-diffusion member 100, before being attached to the liquid crystal display medium 6, includes a surface protection sheet 101 detachably attached to a face of the adhesive layer 42 (or the other adhesive layer 49c) that is to be adhered to the liquid crystal display medium 6. The surface protection sheet 101 has a higher modulus of elasticity than the adhesive layer 42 (or the other adhesive layer 49c). The surface protection sheet 101 protects the adhesive layer 42 (or the other adhesive layer 49c) until the surface protection sheet 101 is removed from the adhesive layer 42 (or the other adhesive layer 49c).

The surface protection sheet 101, even under a point load exerted by, for example, a sharp protrusion via the adhesive layer 42 (or the other adhesive layer 49c), can suppress deformation of the light-diffusion portions 40 (140, 240, and 340) and the adhesive layer 42 (or the adhesive sheet 49), prevent deformation of the spaces 43 in the light-diffusion member 7 (7A to 7E, 107, 207, and 307) and excess encroachment into the spaces 43 by the adhesive layer 42 (or the adhesive layer 49b), and suppress light diffusion capability degradation.

Additionally, as a result of the adhesion of the adhesive sheet 49 to the light-diffusion member 7 (7A to 7E, 107, 207, and 307), even if the surface protection sheet 101 is placed under a point load exerted by, for example, a sharp protrusion via the adhesive sheet 49, the adhesive sheet substrate 49a, having a higher modulus of elasticity than the adhesive layers 49b and 49c, can suppress deformation of the light-diffusion portions 40 (140, 240, and 340) and the adhesive layer 49b, prevent deformation of the spaces 43 in the light-diffusion member 7 and excess encroachment into the spaces 43 by the adhesive layer 49b, and suppress light diffusion capability degradation.

Another example of the adhesive-layer-including light-diffusion member 100 before being attached to the liquid crystal display medium 6 may further include a polarizing-layer-containing film (second polarizing plate 5) adhering to a face of the adhesive layer 42 (or the other adhesive layer 49c) that is to be adhered to the liquid crystal display medium 6. In this configuration, there is provided an adhesive layer (not shown) formed on a face of the second polarizing plate 5 that is to be adhered to the liquid crystal display medium 6, and the surface protection sheet 101 is detachably attached to the surface of this adhesive layer. In this configuration, the surface protection sheet 101 protects the adhesive layer until the surface protection sheet 101 is removed from the adhesive layer.

To attach the adhesive-layer-including light-diffusion member 100 to the viewing side of the liquid crystal display medium 6, the surface protection sheet 101 is removed, and the light-diffusion member 7 (7A to 7E, 107, 207, and 307) is then attached to the liquid crystal display medium 6 via the adhesive layer 42 (or the adhesive sheet 49).

The adhesive-layer-including light-diffusion member 100, if integrated with the second polarizing plate 5, is attached to the viewing side of the liquid crystal display medium 6 to which the second polarizing plate 5 is yet to be attached. The liquid crystal display devices 1 and 1A to 1E can be thus obtained.

The adhesive-layer-including light-diffusion member in accordance with an embodiment of the present invention is not necessarily cut out to the size of the liquid crystal display medium 6 and may be provided in the form of an uncut, elongate mother roll.

Method of Manufacturing Adhesive-Layer-Including Light-Diffusion Member

Figure 33:
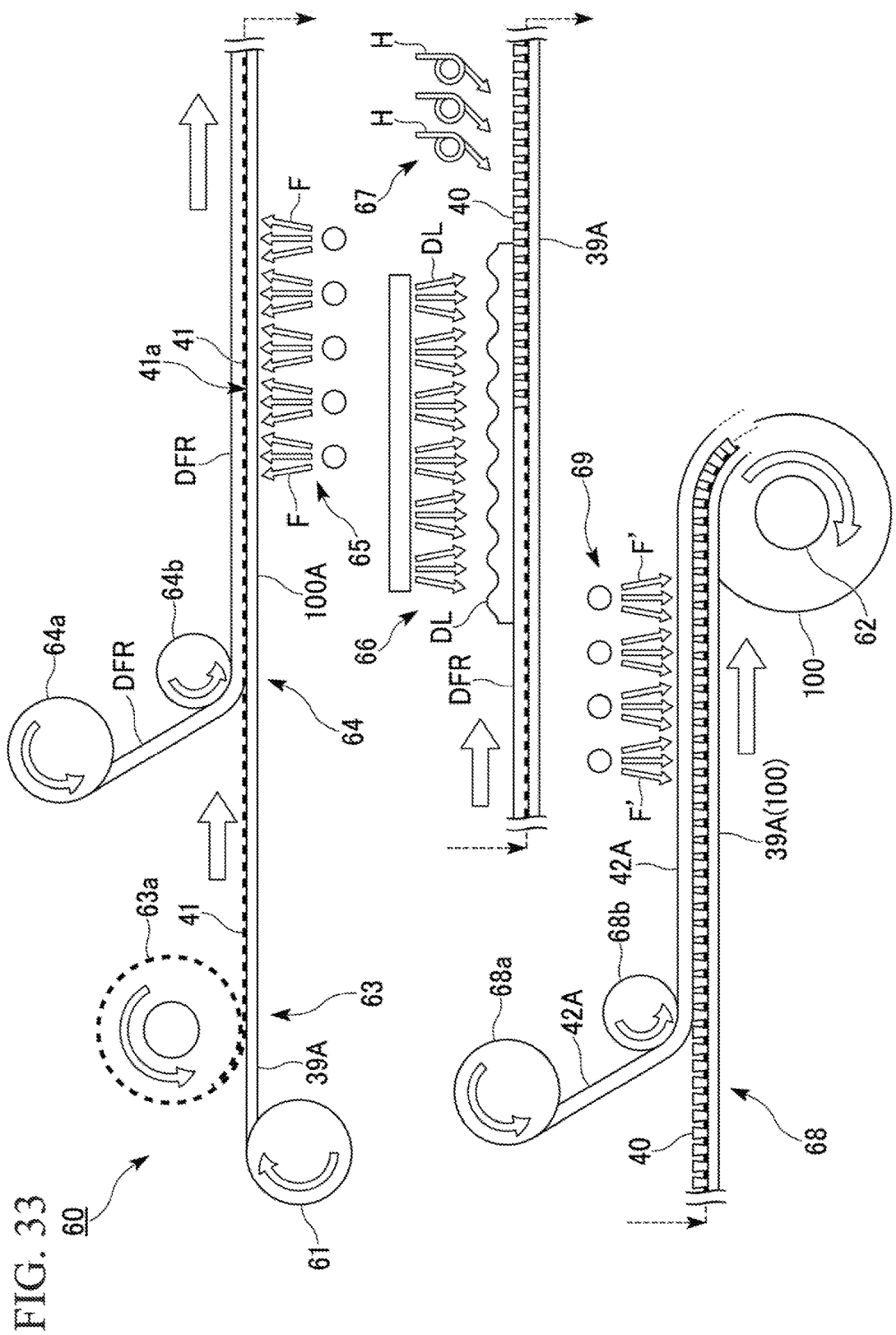
FIG. 33 is a side view of a configuration of manufacturing equipment for the adhesive-layer-including light-diffusion member shown in FIG. 32.
Figure 34:
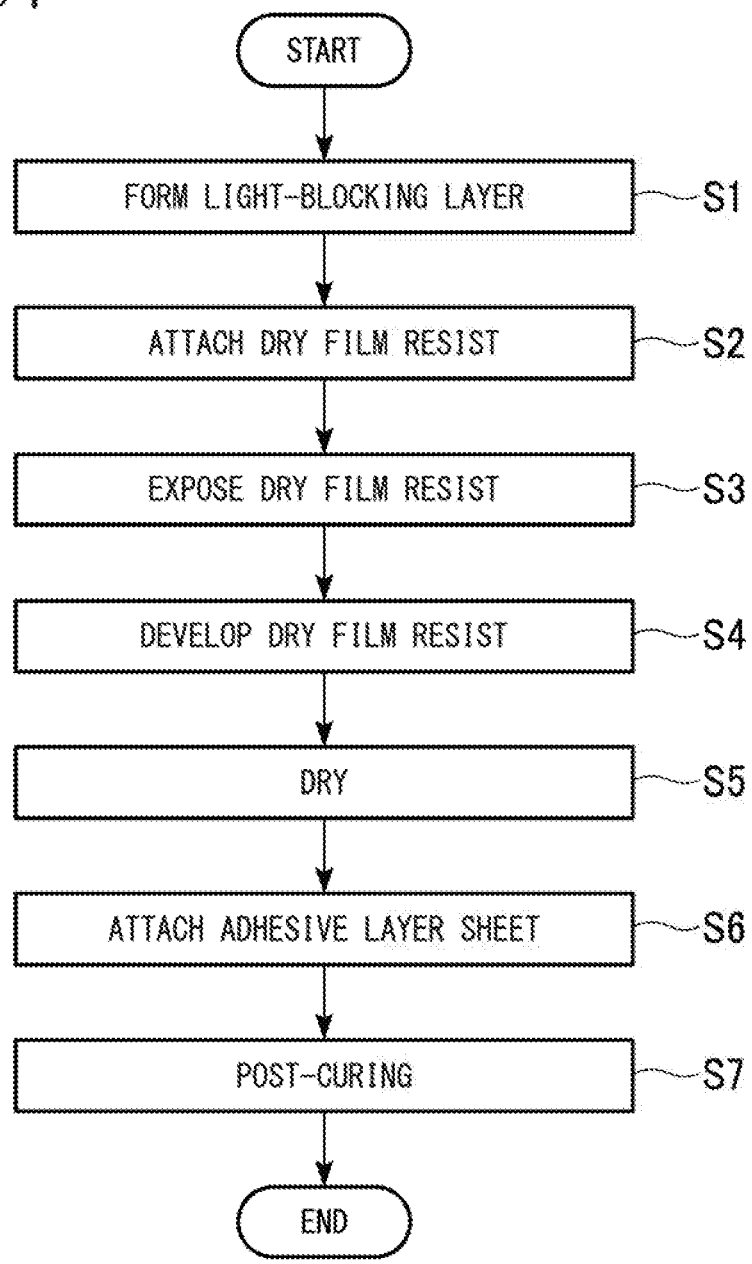
FIG. 34 is a flow chart depicting steps of manufacturing the adhesive-layer-including light-diffusion member shown in FIG. 32.

Next, a method of manufacturing the adhesive-layer-including light-diffusion member 100 will be described in reference to FIGS. 33 and 34. FIG. 33 is a side view of a configuration of manufacturing equipment 60 for the adhesive-layer-including light-diffusion member 100. FIG. 34 is a flow chart depicting steps of manufacturing the adhesive-layer-including light-diffusion member 100.

Referring to FIG. 33, the manufacturing equipment 60 performs various processing while transporting roll-to-roll (R to R) an elongate substrate sheet 39A that will become the substrate 39. The manufacturing equipment 60 fabricates a plurality of light-blocking layers 41 by printing.

The manufacturing equipment 60 includes a feed roller 61 on one end thereof and a winding roller 62 on the other end thereof. The feed roller 61 feeds the substrate sheet 39A. The winding roller 62 winds up the substrate sheet 39A. The manufacturing equipment 60 thereby transports (moves) the substrate sheet 39A from the end where the feed roller 61 is provided to the end where the winding roller 62 is provided.

Along the transport path of the substrate sheet 39A are there provided a printing unit 63, a first attaching unit 64, an exposure unit 65, a developing unit 66, a drying unit 67, a second attaching unit 68, and a curing unit 69 in this sequence from the end where the feed roller 61 is provided toward the end where the winding roller 62 is provided.

The printing unit 63 fabricates the light-blocking layers 41 on the substrate sheet 39A by gravure printing. The first attaching unit 64 attaches a negative dry film resist (photosensitive resin layer) DFR onto the substrate sheet 39A having formed thereon the light-blocking layers 41. The exposure unit 65 shines exposure light F from the side of the substrate sheet 39A to expose the dry film resist DFR to light. The developing unit 66 develops the exposed dry film resist DFR with a developer DL. The drying unit 67 dries the substrate sheet 39A having formed thereon the light-diffusion portions 40 composed of the developed dry film resist DFR. The second attaching unit 68 attaches an adhesive-layer-including sheet 42A that will become the adhesive layer 42 (or the adhesive sheet 49) onto the substrate sheet 39A having formed thereon the light-diffusion portions 40. The curing unit 69 shines ultraviolet light (UV light) F' onto the substrate sheet 39A having formed thereon the light-diffusion portions 40 to cure the light-diffusion portions 40 (post-curing).

To manufacture the adhesive-layer-including light-diffusion member 100 by the manufacturing equipment 60, first of all, the light-blocking layers 41 are formed on a face of the substrate sheet 39A by gravure printing in step S1 in FIG. 34. Specifically, as shown in FIG. 33, a light-blocking-layer material that will become the light-blocking layers 41 is transferred while a print roller 63a in the printing unit 63 is rotated on that face of the substrate sheet 39A in the same direction as the direction in which the substrate sheet 39A is transported. This step can collectively form the light-blocking layers 41 on the face of the substrate sheet 39A.

Each light-blocking layer 41 is elliptical in a plan view and has a thickness of 150 nm as an example. Where no light-blocking layers 41 are formed, the openings 41a are formed that correspond to the regions where the light-diffusion portions 40 are formed in the next step. The distance (pitch) between the adjacent light-blocking layers 41 is neither regular nor periodical. The distance (pitch) between the light-blocking layers 41 and the size (dimensions) of the light-blocking layers 41 are preferably smaller than the distance (pitch; for example, 150 µm) between the pixels in the liquid crystal panel 4. In this preferred configuration, each pixel contains at least one of the light-blocking layers 41. Therefore, wide viewing angles can be achieved uniformly on the screen when this configuration is combined with liquid crystal panels with small pixel pitches used in, for example, mobile devices.

The light-blocking layers 41 are formed by gravure printing in the present embodiment. Alternatively, the light-blocking layers 41 may be formed by gravure offset printing. As another alternative, the light-blocking layers 41 may be formed by photolithography using a black negative resist. In photolithography, if a photomask is used in which the opening pattern and the light-blocking pattern are reversed, a positive resist having light-absorbing properties may be used. As a further alternative, the light-blocking layers 41 may be fabricated directly by vapor deposition, inkjet, or like technology.

Next, in step S2 in FIG. 34, the dry film resist DFR is attached to the substrate sheet 39A having formed thereon the light-blocking layers 41. Specifically, as shown in FIG. 33, the dry film resist DFR with a thickness of, for example, approximately 20 µm is fed from a feed roller 64a in the first attaching unit 64 and attached to the face of the substrate sheet 39A while an attaching roller 64b is rotated in the same direction as the direction in which the substrate sheet 39A is transported.

The dry film resist DFR, before being attached, has a structure (not shown) in which a photosensitive resin layer is sandwiched between a protection film and a substrate film. To attach the dry film resist DFR to the substrate sheet 39A, the protection film is removed from the photosensitive resin layer, after which the dry film resist DFR is attached in such a manner that the photosensitive resin layer comes into contact with the substrate sheet 39A.

An intermediate body 100A can thus be obtained that has formed on the face of the substrate sheet 39A (substrate 39) the light-blocking layers 41 and the dry film resist (photosensitive resin layer) DFR covering the face on which the light-blocking layers 41 are formed.

Next, in step S3 in FIG. 34, the dry film resist DFR on the intermediate body 100A is exposed to light. Specifically, as shown in FIG. 33, the dry film resist DFR is irradiated with the exposure light F emitted by a plurality of light sources 65a in the exposure unit 65 from the side facing the substrate sheet 39A. This step uses the light-blocking layers 41 as a mask in the exposure of the dry film resist DFR. The step employs ultraviolet light (UV light) as the exposure light F. In the present embodiment, the exposure is done using combined light of 365 nm (i-line), 404 nm (h-line), and 436 nm (g-line). The exposure doze is specified to 500 mJ/cm$^2$.

The exposure light F in the present embodiment is preferably diffused light which is suited for the exposure of the dry film resist DFR. The dry film resist DFR is irradiated with the diffused exposure light F that travels in directions radiating from those regions where no light-blocking layers 41 are formed (the openings 41a). This technique can cause the side faces 40c of the light-diffusion portions 40 to incline (reverse tapered) from the face facing the substrate 39 to the face opposite from the substrate 39.

As the substrate sheet 39A is moved along, the exposure light F may decrease gradually, or vary otherwise, in intensity. The exposure light F may also gradually change in emission angle as the substrate sheet 39A is moved along. In addition, the exposure light F may be obtained by diffusing parallel light using a diffusion plate. Use of these techniques enables control of the taper angles of the side faces 40c of the light-diffusion portions 40 to a desired angle.

Next, in step S4 in FIG. 34, the exposed dry film resist DFR is developed. Specifically, the developing unit 66 applies the developer DL to the exposed the dry film resist DFR as shown in FIG. 33. The application of the developer DL removes unexposed parts of the dry film resist DFR, thereby forming the light-diffusion portions 40 on the face of the substrate sheet 39A. Before applying the developer, the substrate film for the dry film resist DFR is removed (not shown) from the top face of the photosensitive resin layer in the dry film resist DFR.

Next, the substrate sheet 39A having formed thereon the light-diffusion portions 40 is dried in step S5 in FIG. 34. Specifically, as shown in FIG. 33, the drying unit 67 blows hot air H (50° C.) onto the face of the substrate sheet 39A on which the light-diffusion portions 40 are provided, to dry the light-diffusion portions 40. This drying step may be done on a hotplate or under infrared light.

Next, in step S6 in FIG. 34, the adhesive-layer-including sheet 42A is attached onto the substrate sheet 39A having formed thereon the light-diffusion portions 40. Specifically, as shown in FIG. 33, the adhesive-layer-including sheet 42A with a thickness of, for example, approximately 15 µm is fed from a feed roller 58a in the second attaching unit 58 and attached to the face of the substrate sheet 39A while an attaching roller 68b is rotated in the same direction as the direction in which the substrate sheet 39A is transported.

The adhesive-layer-including sheet 42A, before being attached, has a structure (not shown) in which the adhesive layer 42 (or the adhesive sheet 49) is sandwiched by a pair of surface protection sheets 101. To attach the adhesive-layer-including sheet 42A to the substrate sheet 39A, one of the surface protection sheets 101 is removed from the adhesive layer 42, after which the adhesive-layer-including sheet 42A is attached in such a manner that the adhesive layer 42 comes into contact with the light-diffusion portions 40.

Next, in step S7 in FIG. 34, the light-diffusion portions 40 are cured (post-curing). Specifically, as shown in FIG. 33, the light-diffusion portions 40 are irradiated and cured with the ultraviolet light (UV light) F' emitted by a plurality of light sources 69a in the curing unit 69 from the side of the substrate sheet 39A facing the light-diffusion portions 40.

The elongate adhesive-layer-including light-diffusion member 100 can be obtained by these steps. The adhesive-layer-including light-diffusion member 100 is wound by the winding roller 52 by a predetermined amount before a next step.

After being cut to a predetermined size suitable to the liquid crystal panel 4, the fabricated adhesive-layer-including light-diffusion member 100 is attached to the liquid crystal display medium 6. More specifically, the adhesive-layer-including light-diffusion member 100 is attached to the second polarizing plate 5 with the substrate 39 facing the viewing side and the adhesive layer 42 facing the second polarizing plate 5. The liquid crystal display device 1 can be fabricated by these steps.

In the present embodiment, the exposure light F is shone using the light-blocking layer(s) 41 as a mask in the step of forming the light-diffusion portions 40. Therefore, the light-diffusion portions 40 are formed self-aligned at the positions of the openings 41a in the light-blocking layer 41. As a result, the light-diffusion portions 40 and the light-blocking layer 41 are in intimate contact with no gap therebetween, which reliably preserves optical transmittance. In addition, no precise alignment is needed, which can cut manufacturing time.

Furthermore, in the present embodiment, ultraviolet light (UV light) is shone from the side facing the light-incident end face 40b to avoid placing the light-diffusion portions 40 in the shadow of the light-blocking layer 41, with the light-diffusion portions 40 protected by the adhesive-layer-including sheet 42A attached to the dry film resist DFR (light-diffusion portions 40). Therefore, the light-diffusion portions 40 can be uniformly post-cured.

The present embodiment may include a step of further attaching an optical sheet that will become the second polarizing plate 5 to the fabricated elongate adhesive-layer-including light-diffusion member 100. The inclusion of this extra step enables the adhesive-layer-including light-diffusion member 100 and the second polarizing plate 5 to be formed as a single piece.

The present invention is by no means limited to the embodiments and examples above. Variations and combinations of the embodiments and examples are encompassed in the scope of the present invention.

For example, the liquid crystal display devices described in the embodiments above include the liquid crystal panel 4 as a display medium as an example. Alternatively, the present invention may be applied to display devices that include, for example, organic electroluminescent elements (OLED's) or a plasma display as a display medium.

In addition, the embodiments above describe, as an example, the light-diffusion members 7 and 7A to 7E, 107, 207, and 307 being attached onto the second polarizing plate 5 of the liquid crystal display medium 6. Alternatively, the light-diffusion members 7, 107, 207, and 307 are not necessarily in contact with the liquid crystal display medium 6. For example, other optical films or optical components may be interposed between the light-diffusion members 7 and 7A to 7E, 107, 207, and 307 and the liquid crystal display medium 6. Alternatively, the light-diffusion members 7 and 7A to 7E, 107, 207, and 307 and the liquid crystal display medium 6 may be separated by a distance. In the organic electroluminescent display device and the plasma display, the light-diffusion members 7 and 7A to 7E, 107, 207, and 307 are never in contact with a polarizing plate because these devices do not need a polarizing plate.

Furthermore, in the embodiments above, at least one layer from an anti-reflection layer, a polarizing filter layer, an antistatic layer, an antiglare-treated layer, and an antifouling-treated layer may be provided on the viewing side of the substrate 39 in the light-diffusion members 7 and 7A to 7E, 107, 207, and 307. The provision of the layer(s) can prevent degradation of viewing angle properties over time, for example, by adding a function to reduce reflection of external light, a function to prevent dust and dirt from sticking, or a function to prevent scratching, depending on the type of layer provided on the viewing side of the substrate 39.

Additionally, in the embodiments above, the light-diffusion portions 40, 140, 240, and 340 have a frustum or elliptical frustum shape. The angle of inclination of the side faces 40c, 140c, 240c, and 340c of the light-diffusion portions 40, 140, 240, and 340 is not necessarily symmetric with respect to the optical axis. When the light-diffusion portions 40, 140, 240, and 340 have a frustum or elliptical frustum shape as in the embodiments, the angle of inclination has a symmetric angular distribution with respect to the optical axis because the angle of inclination of the side faces 40c, 140c, 240c, and 340c of the light-diffusion portions 40, 140, 240, and 340 is symmetric with respect to the optical axis. The angle of inclination of the side faces of the light-diffusion portions 40, 140, 240, and 340 may be asymmetric if an asymmetric angular distribution needs to be deliberately introduced depending on the need of a particular use or purpose of the display device, for example, if there is a need to expand the viewing angle only upward or rightward on the screen.

The dimensions, material, and manufacturing conditions in the manufacture of each element in the light-diffusion member are by no means limited to the specific embodiments above and may be altered in a suitable manner.

INDUSTRIAL APPLICABILITY

Some aspects of the present invention are applicable to liquid crystal display devices, organic electroluminescent display devices, plasma displays, and various other like display devices.

REFERENCE SIGNS LIST

1, 1A to 1E Liquid Crystal Display Device (Display Device)
6 Liquid Crystal Display Medium (Display Medium)
7, 7A to 7E, 107, 207, and 307 Light-diffusion Member
39 Substrate
40, 140, 240, and 340 Light-diffusion Portions
40a, 140a, 240a, 340a Light-emitting End Face
40b, 140b, 240b, 340b Light-incident End Face
40c, 140c, 240c, 340c Side Face
40d Corner
40e Concave Portion (or Convex Portion)
401b Convexly Curved Light-emitting End Face
402b Concavely Curved Light-emitting End Face
40f Flange Portion
41 Light-blocking Layer
42 Adhesive Layer
42a Encroachment Portion
43 Space
143, 343 Hollow Portion
49 Adhesive Sheet
49a Adhesive Sheet Substrate
49b One of Adhesive Layers
49c Other Adhesive Layer
49d Encroachment Portion

The invention claimed is:

1. An adhesive-layer-including light-diffusion member comprising:
   a light-diffusion member on a viewing side of a display medium, the light-diffusion member receiving first light entering from the display medium and emitting second light that exhibits a wider angular distribution than the first light; and
   an adhesive layer between the display medium and the light-diffusion member, wherein
   the light-diffusion member comprises:
      a substrate having light-transmitting properties;
      at least one light-diffusion portion on a face of the substrate facing the display medium, the at least one light-diffusion portion having a predetermined height;
at least one light-blocking layer on a part of the face of the substrate other than where the at least one light-diffusion portion is provided, the at least one light-blocking layer having a thickness smaller than the predetermined height; and
a first space between the adhesive layer and the at least one light-blocking layer,
the at least one light-diffusion portion comprises:
a light-emitting end face in contact with the substrate; and
a light-incident end face facing, and being larger in area than, the light-emitting end face,
the at least one light-diffusion portion is surrounded by the first space as viewed normal to the face of the substrate,
the adhesive layer adheres to the light-incident end face and partly encroaches into the first space,
the face of the substrate is separated by a shorter distance from a surface of the adhesive layer inside the first space than from the light-incident end face, and
the first space is in contact with the adhesive layer and the at least one light-blocking layer.

2. The adhesive-layer-including light-diffusion member according to claim 1, the adhesive-layer-including light-diffusion member further comprising one of
a surface protection sheet detachably attached to another surface of the adhesive layer, and
a polarizing plate attached to the another surface of the adhesive layer.

3. The adhesive-layer-including light-diffusion member according to claim 1, wherein:
the at least one light-diffusion portion is a plurality of light-diffusion portions arranged randomly as viewed normal to the face of the substrate; and
the at least one light-blocking layer is contiguous where none of the plurality of light-diffusion portions are provided.

4. The adhesive-layer-including light-diffusion member according to claim 1, wherein:
the at least one light-blocking layer is a plurality of light-blocking layers arranged randomly as viewed normal to the face of the substrate; and
the at least one light-diffusion portion is contiguous where none of the plurality of light-blocking layers are provided.

5. The adhesive-layer-including light-diffusion member according to claim 1, wherein the adhesive layer adhering to the light-incident end face has a thickness smaller than a distance from the at least one light-blocking layer inside the space to the light-incident end face.

6. The adhesive-layer-including light-diffusion member according to claim 1, wherein the light-incident end face has one of a plurality of concave portions and a plurality of convex portions.

7. The adhesive-layer-including light-diffusion member according to claim 1, wherein the light-incident end face is convexly curved.

8. The adhesive-layer-including light-diffusion member according to claim 1, wherein the light-incident end face is concavely curved.

9. The adhesive-layer-including light-diffusion member according to claim 1, wherein the adhesive layer comprises an adhesive that cures under radiation of activation energy.

10. The adhesive-layer-including light-diffusion member according to claim 1, wherein:
the at least one light-diffusion portion has a side face between the light-emitting end face and the light-incident end face; and
the light-diffusion member exhibits such azimuthal anisotropy that the light-diffusion member diffuse more light in a first direction in which the side face decreases in area than in a second direction in which the side face increases in area.

11. The adhesive-layer-including light-diffusion member according to claim 10, wherein the at least one light-diffusion portion comprises first and second light-diffusion portions, the first light-diffusion portion exhibiting a first azimuthal anisotropy having a first azimuthal direction, the second light-diffusion portion exhibiting a second azimuthal anisotropy having a second azimuthal direction, the first azimuthal direction being different from the second azimuthal direction.

12. The adhesive-layer-including light-diffusion member according to claim 1, wherein the at least one light-diffusion portion does not comprise a second space between the adhesive layer and the at least one light-blocking layer, the second space being only in contact with one of the adhesive layer and the at least one light-blocking layer.

13. An adhesive-layer-including light-diffusion member comprising:
a light-diffusion member on a viewing side of a display medium, the light-diffusion member receiving first light entering from the display medium and emitting second light that exhibits a wider angular distribution than the first light; and
an adhesive sheet between the display medium and the light-diffusion member,
wherein
the light-diffusion member comprises:
a first substrate having light-transmitting properties;
a light-diffusion portion on a face of the first substrate facing the display medium, the light-diffusion portion having a predetermined height; and
a light-blocking layer on a part of the face of the first substrate other than where the light-diffusion portion is provided, the light-blocking layer having a thickness smaller than the predetermined height,
the light-diffusion portion comprises:
a light-emitting end face in contact with the first substrate; and
a light-incident end face facing, and being larger in area than, the light-emitting end face,
the adhesive sheet comprises:
a second substrate having light-transmitting properties; and
first and second adhesive layers, the first adhesive layer being provided on one face of the second substrate, the second adhesive layer being provided on another face of the second substrate,
the first adhesive layer adheres to the light-incident end face and partly encroaches into a space between the light-diffusion portion and the light-blocking layer, and
the face of the first substrate is separated by a shorter distance from a surface of the first adhesive layer inside the space than from the light-incident end face.

14. The adhesive-layer-including light-diffusion member according to claim 13, wherein the one of the first and second adhesive layers has a smaller thickness than the other one of the first and second adhesive layers.

15. A method of manufacturing an adhesive-layer-including light-diffusion member comprising: a first substrate having light-transmitting properties; a light-diffusion portion on a face of the first substrate, the light-diffusion portion having a predetermined height; a light-blocking layer on a part of the face of the first substrate other than where the light-diffusion portion is provided, the light-blocking layer having a thickness smaller than the predetermined height; one of a first adhesive layer on a face of the light-diffusion portion opposite from the first substrate and an adhesive sheet comprising a second substrate having light-transmitting properties and second and third adhesive layers; a space between one of the first and second adhesive layers and the one light-blocking layer, the second adhesive layer being provided on one face of the second substrate, the third adhesive layer being provided on another face of the second substrate, the light-diffusion portion being surrounded by the space as viewed normal to the face of the first substrate, the space being in contact with the one of the first and second adhesive layers and the light-blocking layer, the method comprising:
forming the light-blocking layer on an elongate substrate sheet that will become the first substrate;
forming the light-diffusion portion on the elongate substrate sheet having formed thereon the light-blocking layer;
attaching one of the adhesive layer and an elongate adhesive-layer-including sheet that will become the adhesive sheet onto the elongate substrate sheet having formed thereon the light-diffusion portion; and
winding the elongate substrate sheet having attached thereonto the adhesive-layer-including sheet.

* * * * *